(12) United States Patent  
Shinohara

(10) Patent No.: US 8,885,269 B2  
(45) Date of Patent: Nov. 11, 2014

(54) IMAGING LENS AND IMAGING APPARATUS INCLUDING THE IMAGING LENS

(71) Applicant: FUJIFILM Corporation, Tokyo (JP)

(72) Inventor: Yoshikazu Shinohara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/088,669

(22) Filed: Nov. 25, 2013

(65) Prior Publication Data

US 2014/0078600 A1 Mar. 20, 2014

Related U.S. Application Data

(63) Continuation of application No. PCT/JP2012/003421, filed on May 25, 2012.

(30) Foreign Application Priority Data

May 26, 2011 (JP) .................. 2011-117822  
May 24, 2012 (JP) .................. 2012-118369

(51) Int. Cl.
*G02B 13/18* (2006.01)  
*G02B 13/00* (2006.01)

(52) U.S. Cl.  
CPC .............. *G02B 13/18* (2013.01); *G02B 13/006* (2013.01); *G02B 13/0045* (2013.01)  
USPC ........................................ 359/714; 359/763

(58) Field of Classification Search  
CPC ... G02B 13/18; G02B 13/0045; G02B 13/006  
USPC ........................................ 359/714, 763, 764  
See application file for complete search history.

(56) References Cited

U.S. PATENT DOCUMENTS

| 5,267,086 A | 11/1993 | Hirano |
| 7,075,736 B1 | 7/2006 | Lundgren |

(Continued)

FOREIGN PATENT DOCUMENTS

| EP | 2317360 | 5/2011 |
| EP | 2357505 | 8/2011 |

(Continued)

OTHER PUBLICATIONS

International Search Report PCT/JP2012/003421 dated Aug. 14, 2012, with English Translation.

(Continued)

*Primary Examiner* — David N Spector  
(74) *Attorney, Agent, or Firm* — Young & Thompson

(57) ABSTRACT

An imaging lens substantially consists of five lenses of a first lens having positive-power and a meniscus shape with its convex surface facing an object side, and at least one of the surfaces of which is aspherical, a second lens having negative-power and a concave surface facing an image side, and at least one of the surfaces of which is aspherical, a third lens having negative-power and a convex surface facing the object side, and at least one of the surfaces of which is aspherical, a fourth lens having positive-power and a convex surface facing the object side, and at least one of the surfaces of which is aspherical, and a fifth lens having negative-power and a concave surface facing the image side, and at least one of the surfaces of which is aspherical, which are in this order from the object side. A predetermined formula is satisfied.

20 Claims, 21 Drawing Sheets

(56) References Cited

U.S. PATENT DOCUMENTS

| | | |
|---|---|---|
| 8,325,429 B2 | 12/2012 | Tang et al. |
| 8,411,376 B2 | 4/2013 | Kubota |
| 2010/0265355 A1 | 10/2010 | Sato et al. |
| 2012/0127359 A1 | 5/2012 | Chen et al. |
| 2012/0293704 A1 | 11/2012 | Sano et al. |

FOREIGN PATENT DOCUMENTS

| | | |
|---|---|---|
| JP | 03-138612 | 6/1991 |
| JP | 2008-542821 | 11/2008 |
| JP | 2010-237407 | 10/2010 |
| JP | 2010-271689 | 12/2010 |
| JP | 2010-282000 | 12/2010 |
| JP | 2011-164562 | 8/2011 |
| JP | 4858648 | 1/2012 |
| WO | 2010024198 | 3/2010 |
| WO | 2011086827 | 7/2011 |

OTHER PUBLICATIONS

International Search Report PCT/JP2012/003421 dated Aug. 14, 2012.

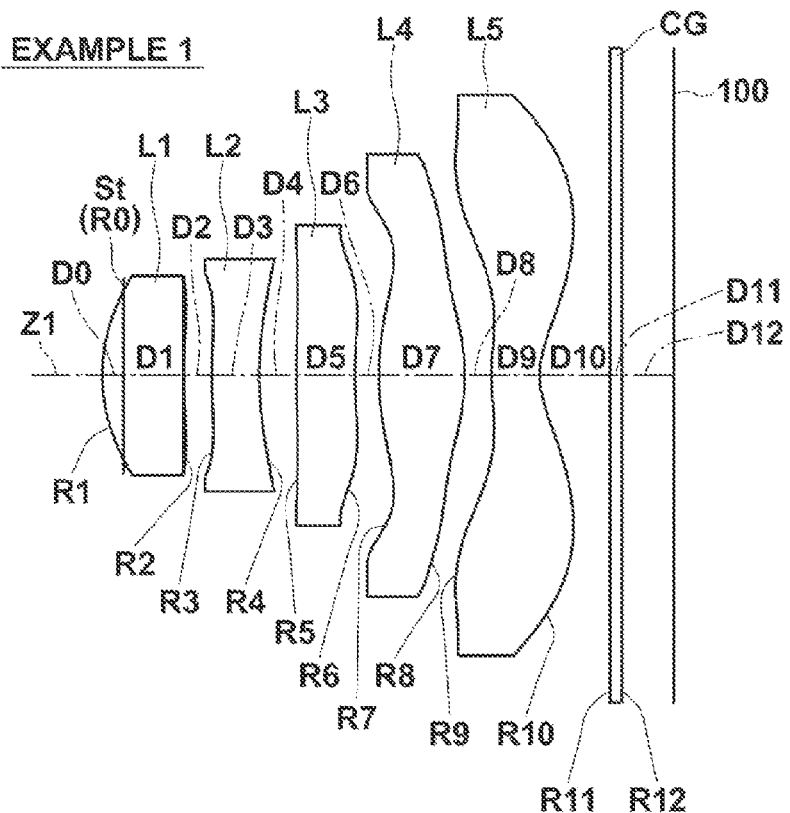
FIG.1 EXAMPLE 1
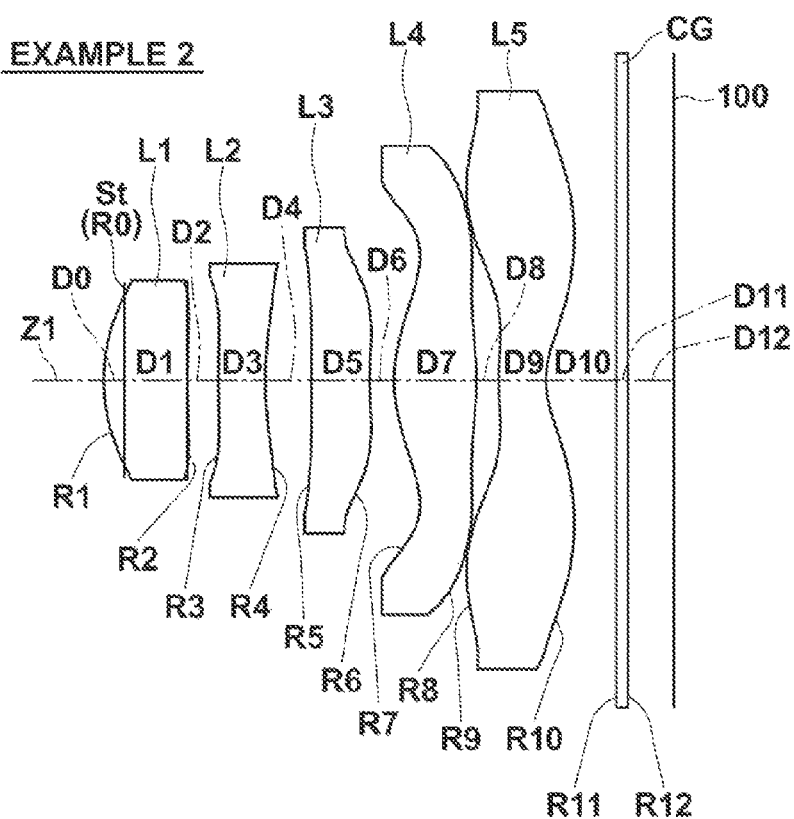
FIG.2 EXAMPLE 2

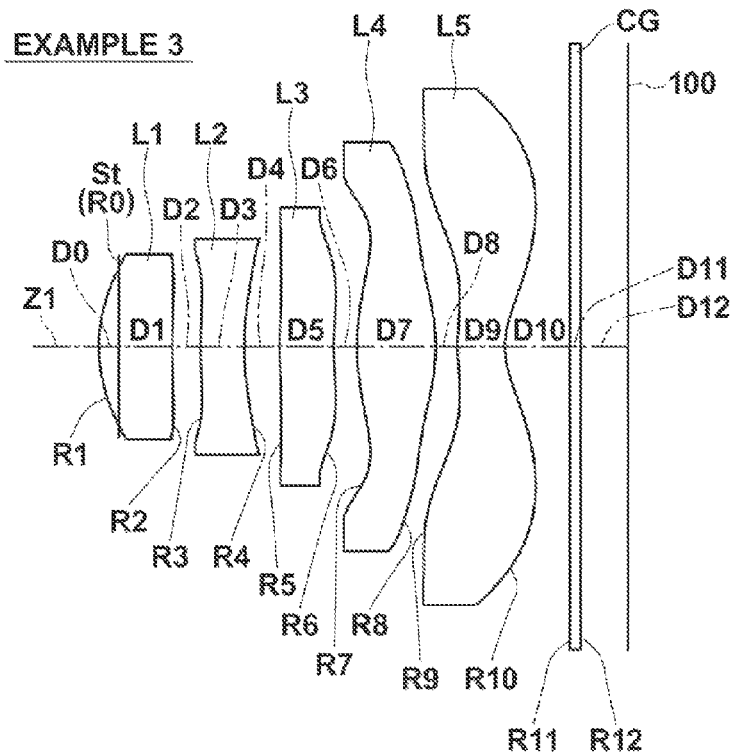
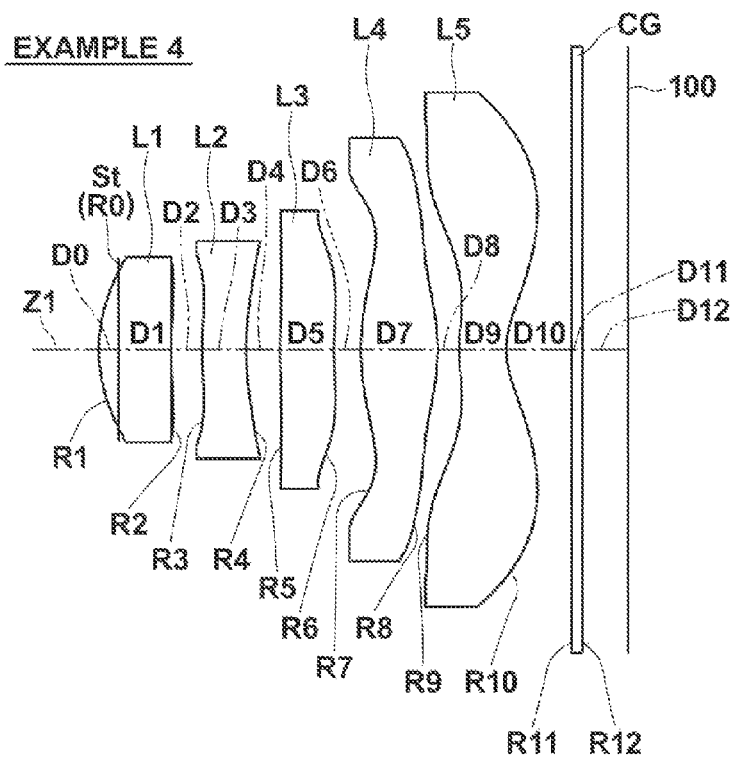

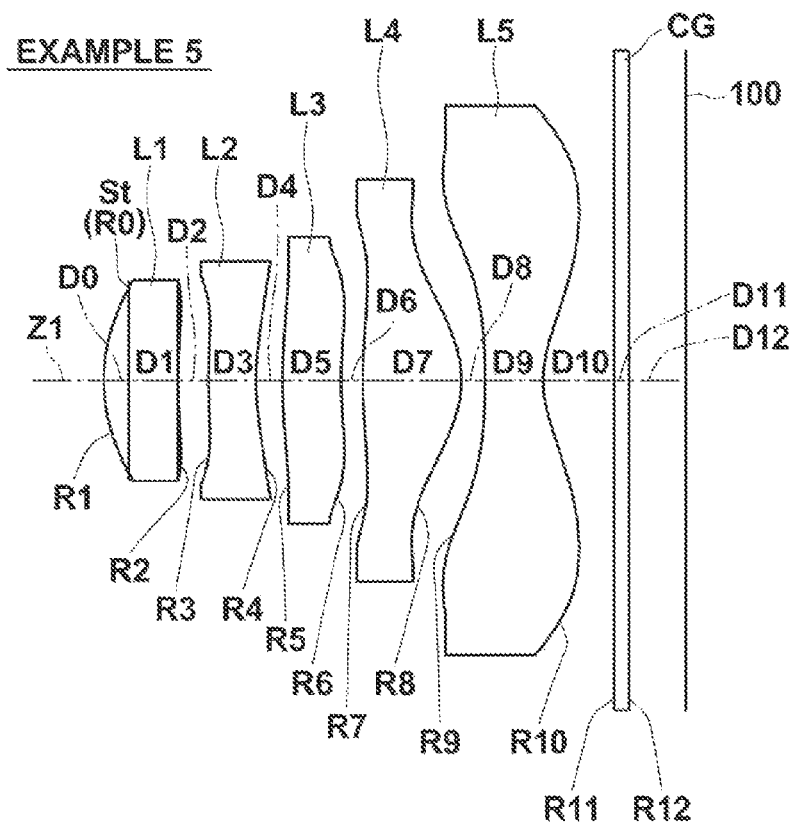
FIG.5 EXAMPLE 5
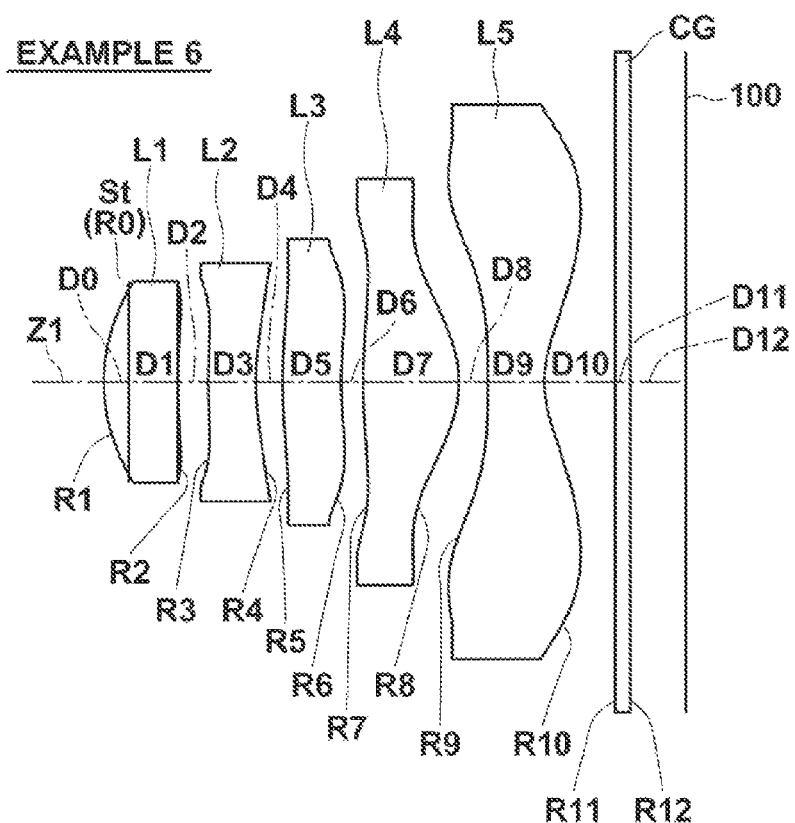
FIG.6 EXAMPLE 6

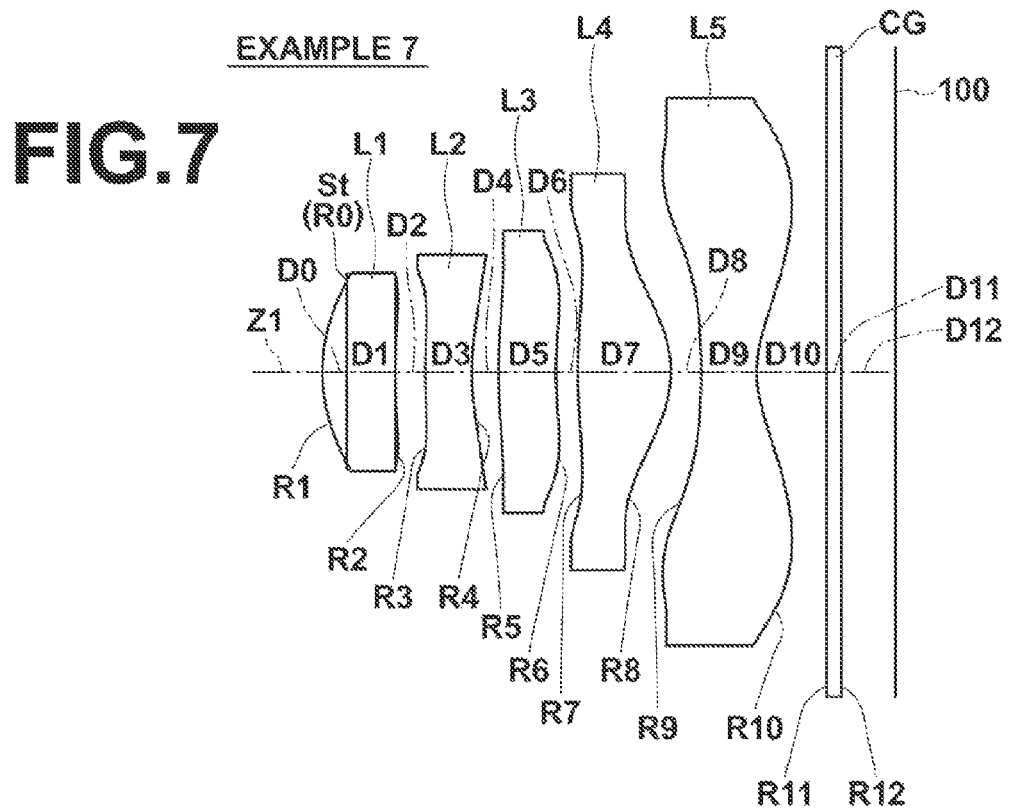
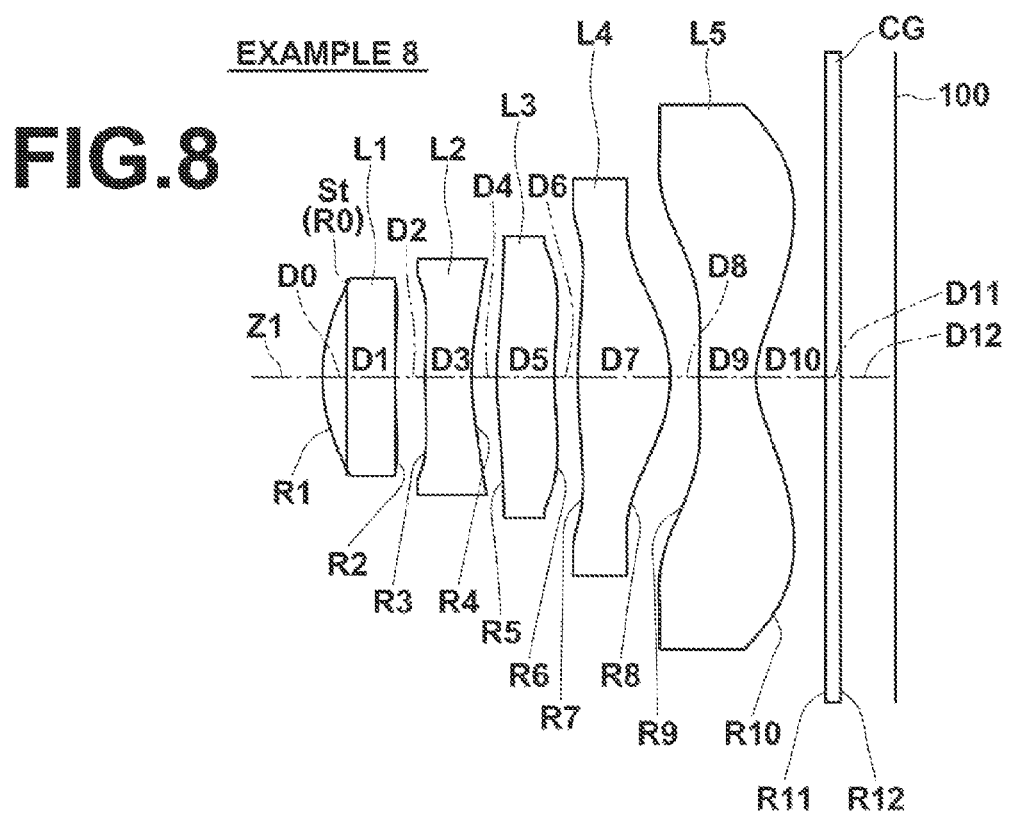

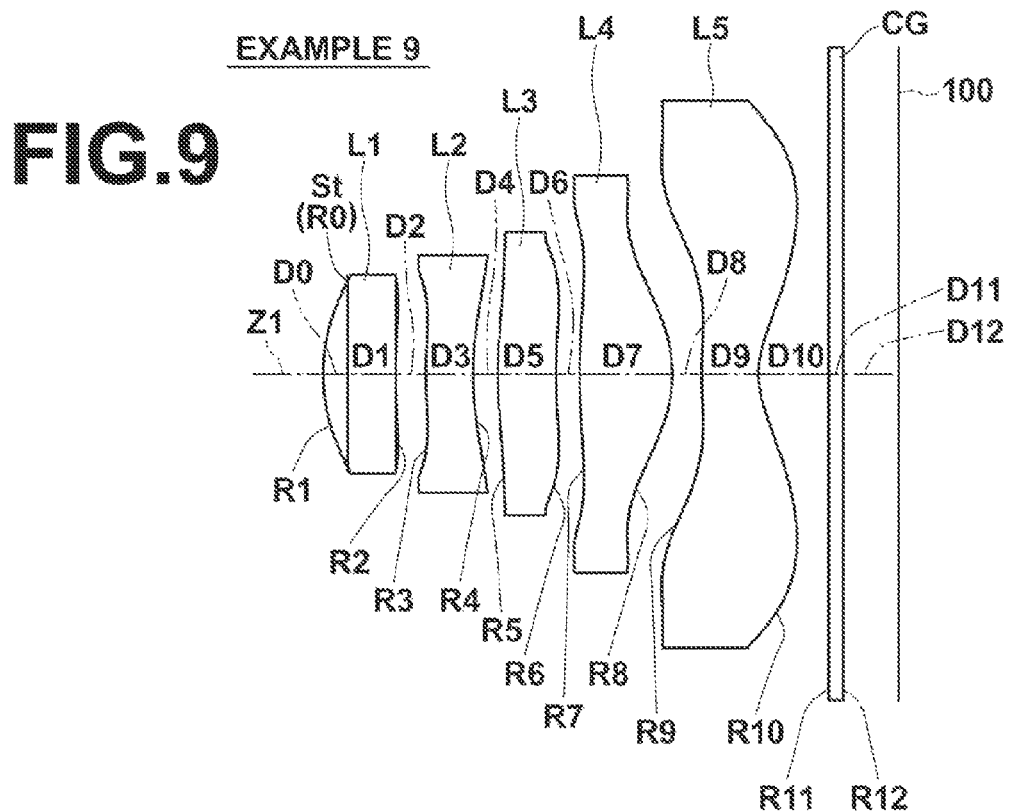
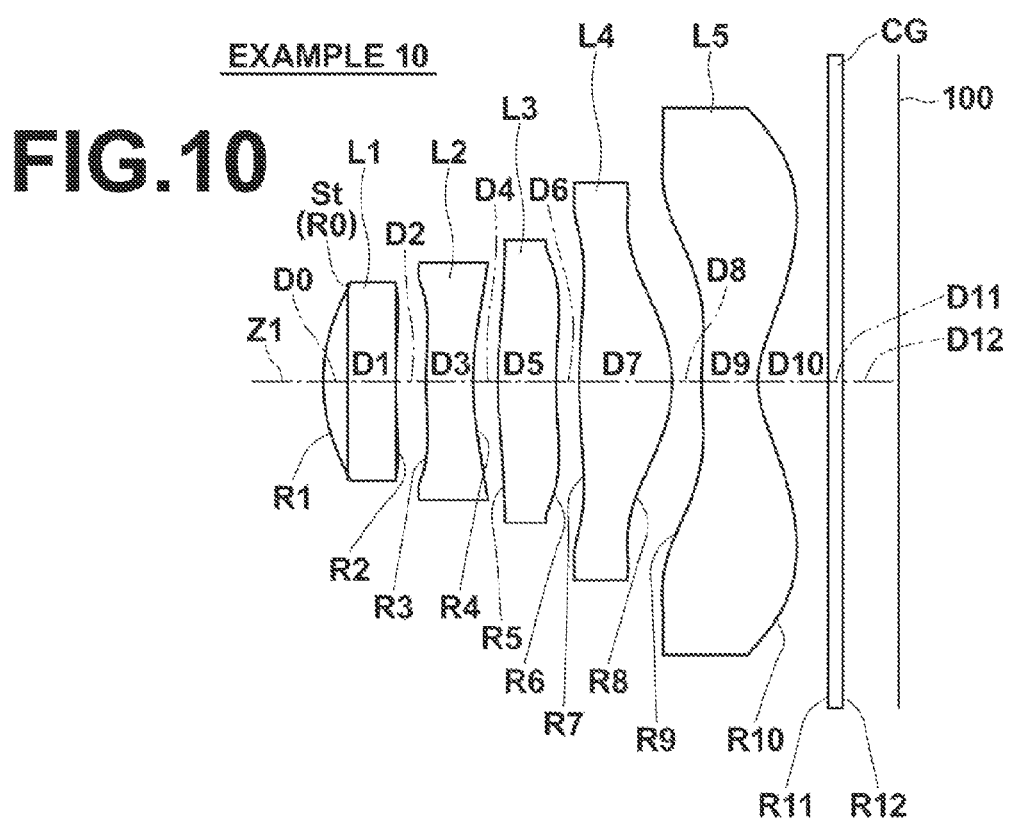

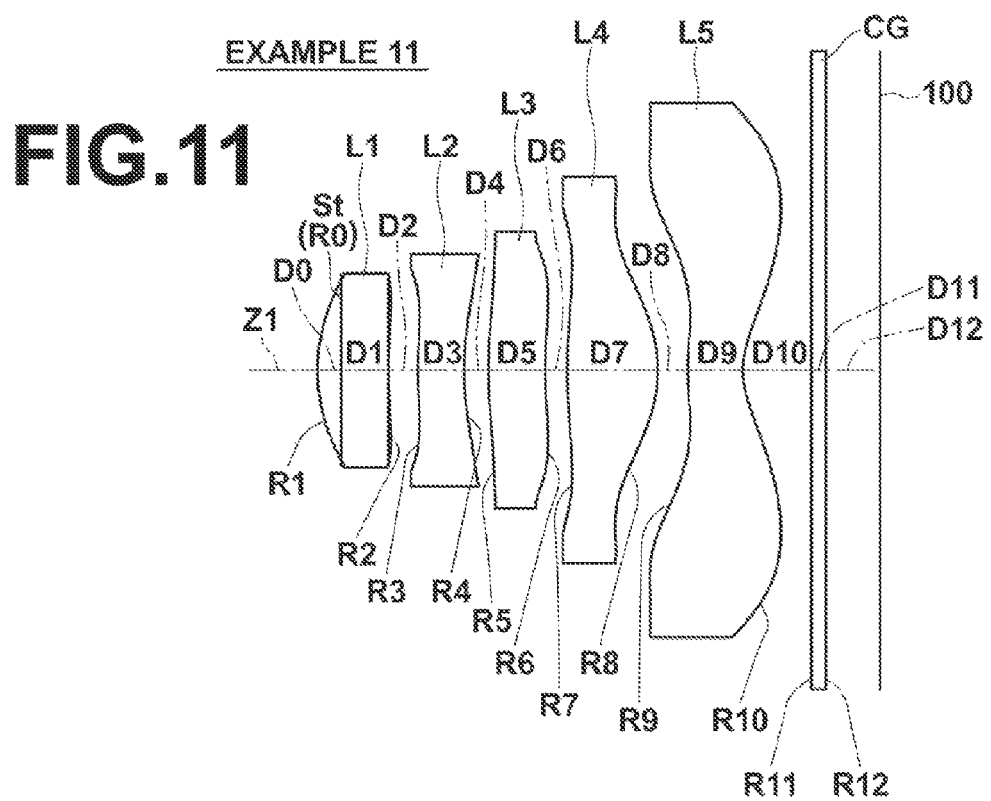
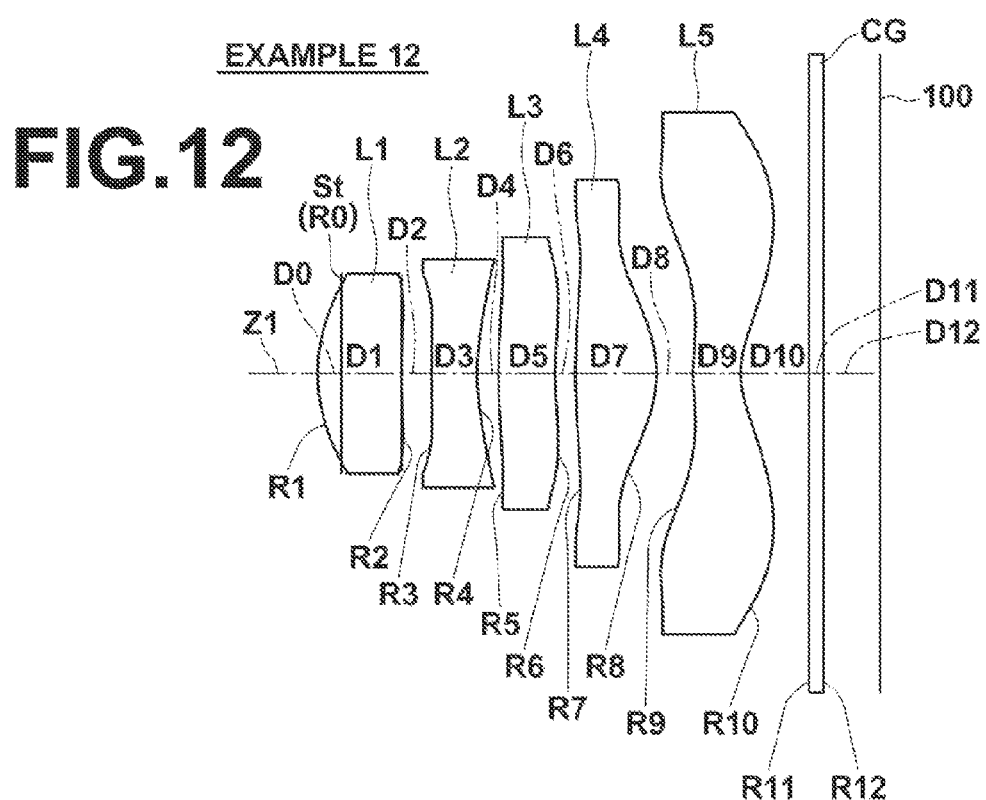

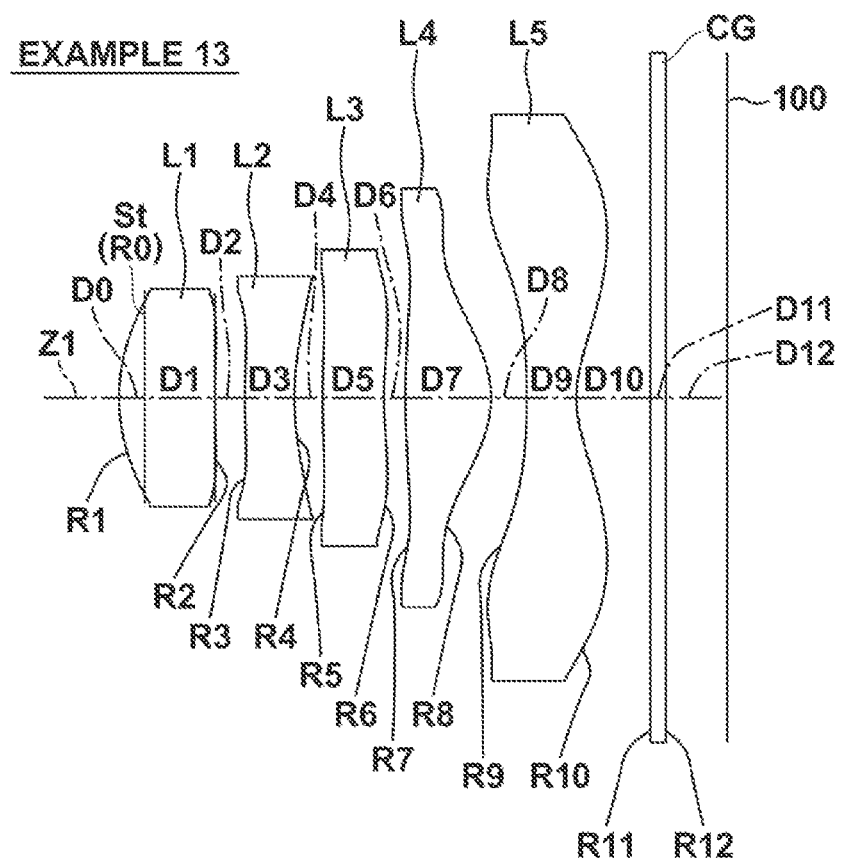

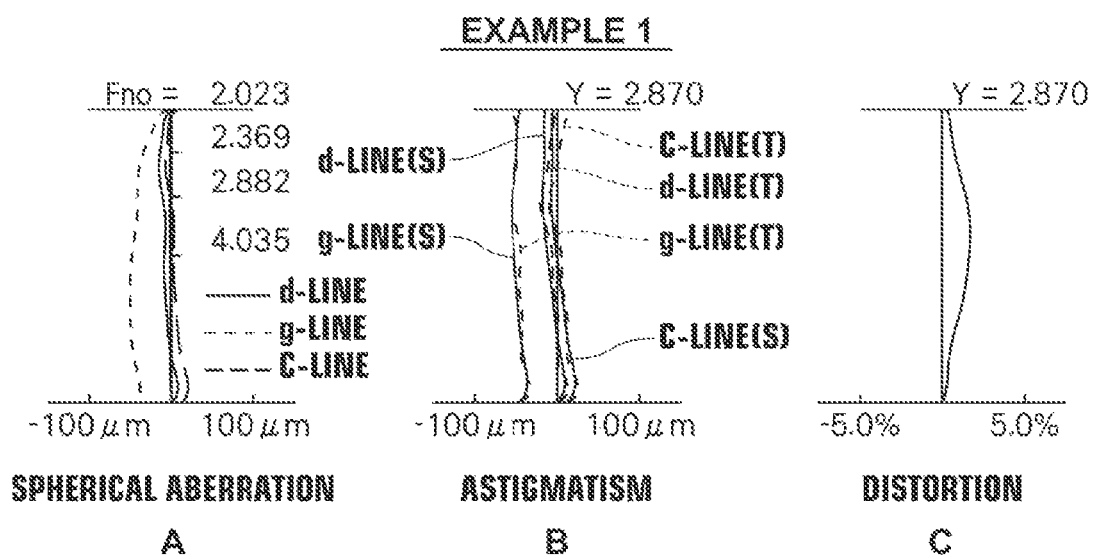
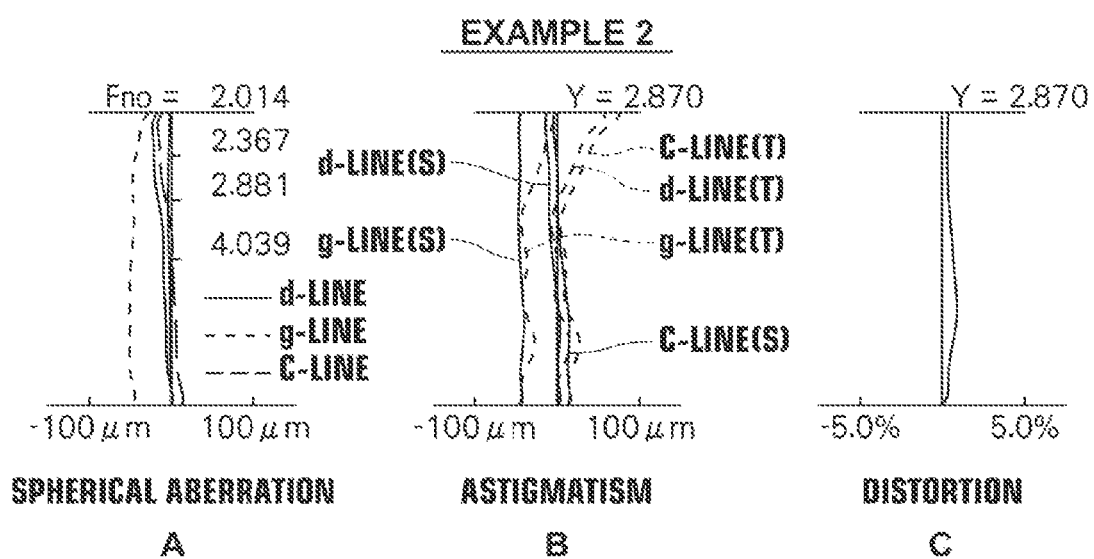

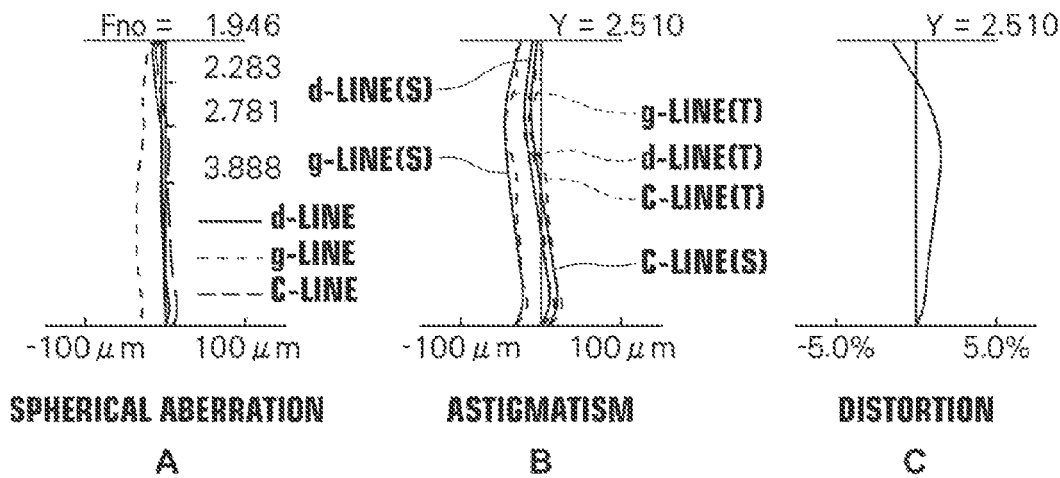
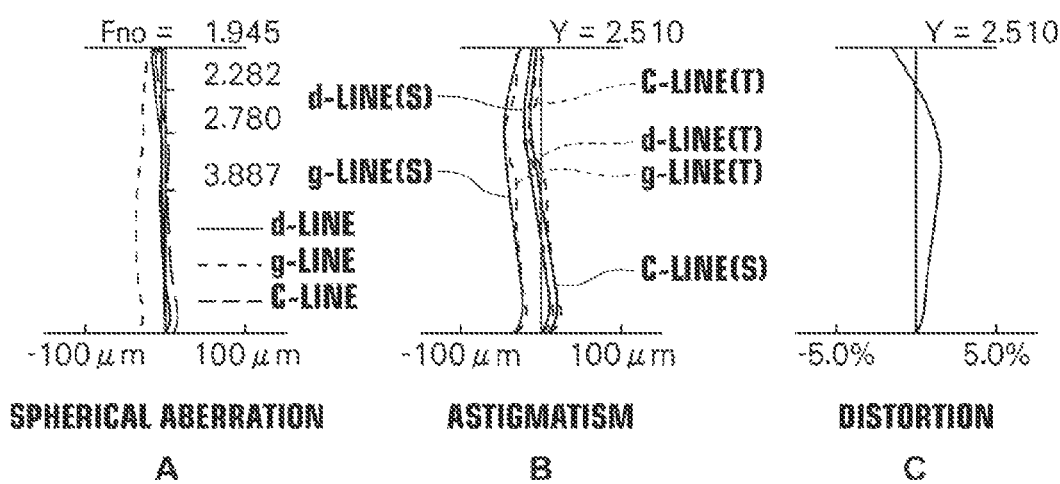

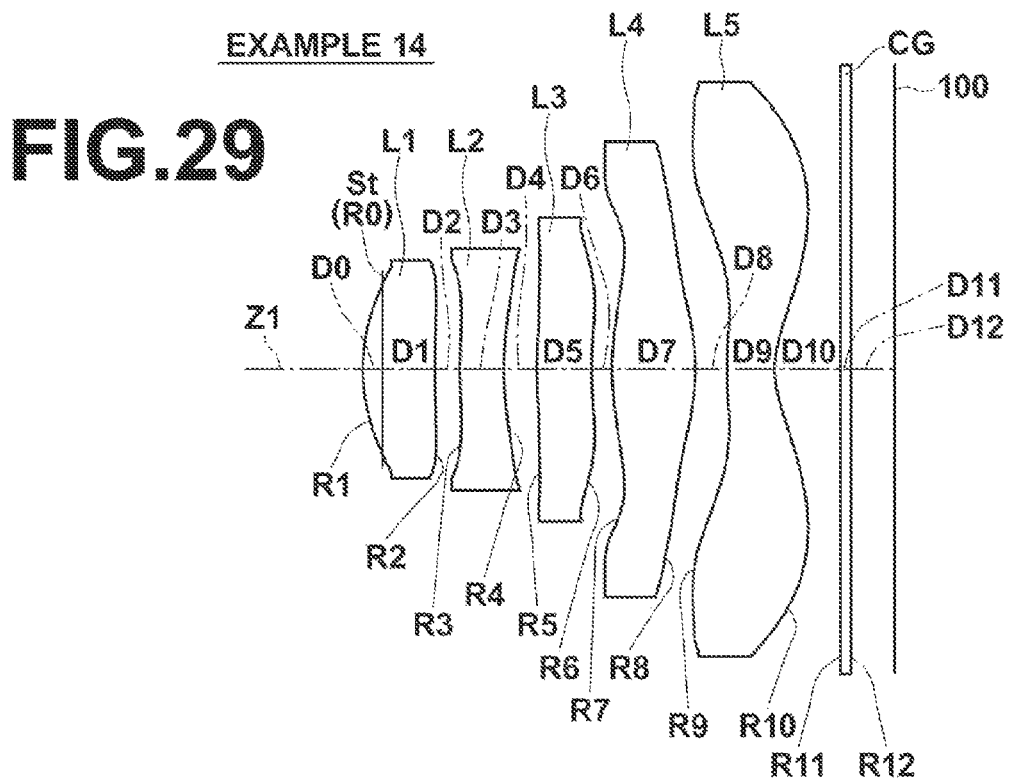
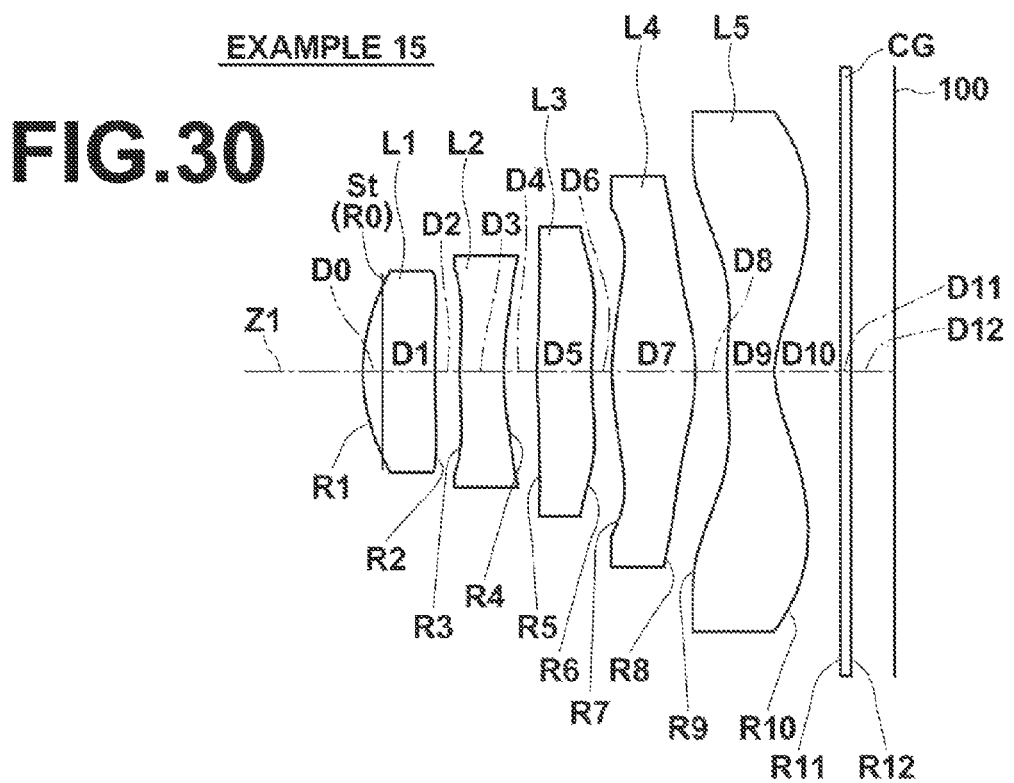

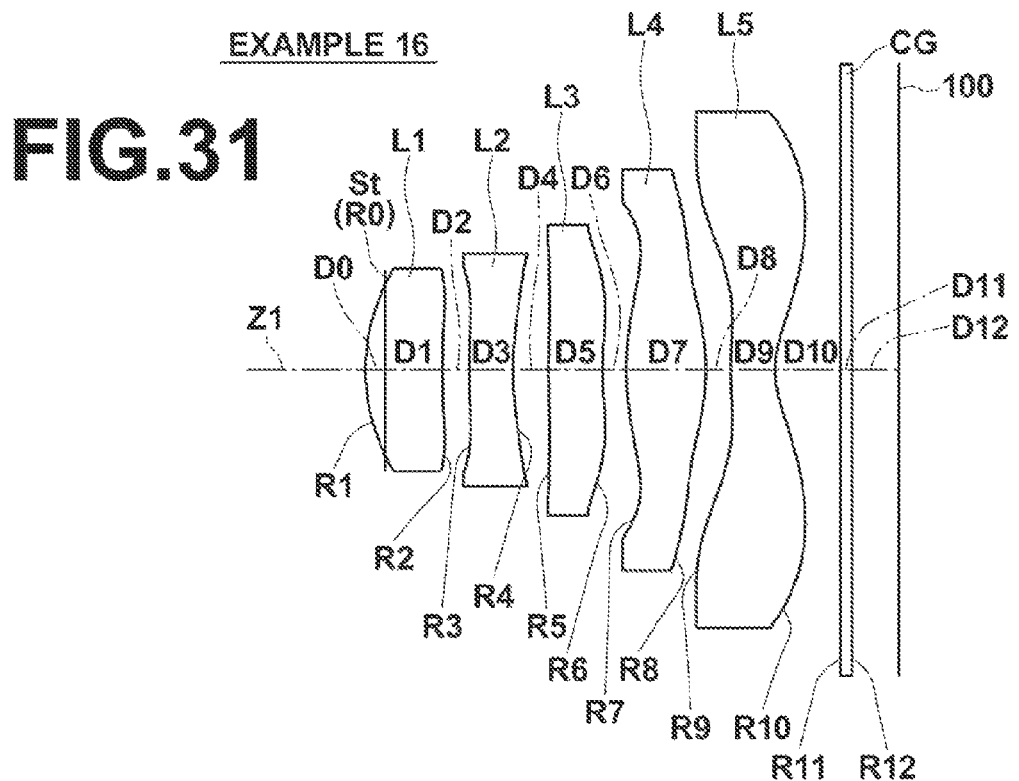
FIG.31 EXAMPLE 16
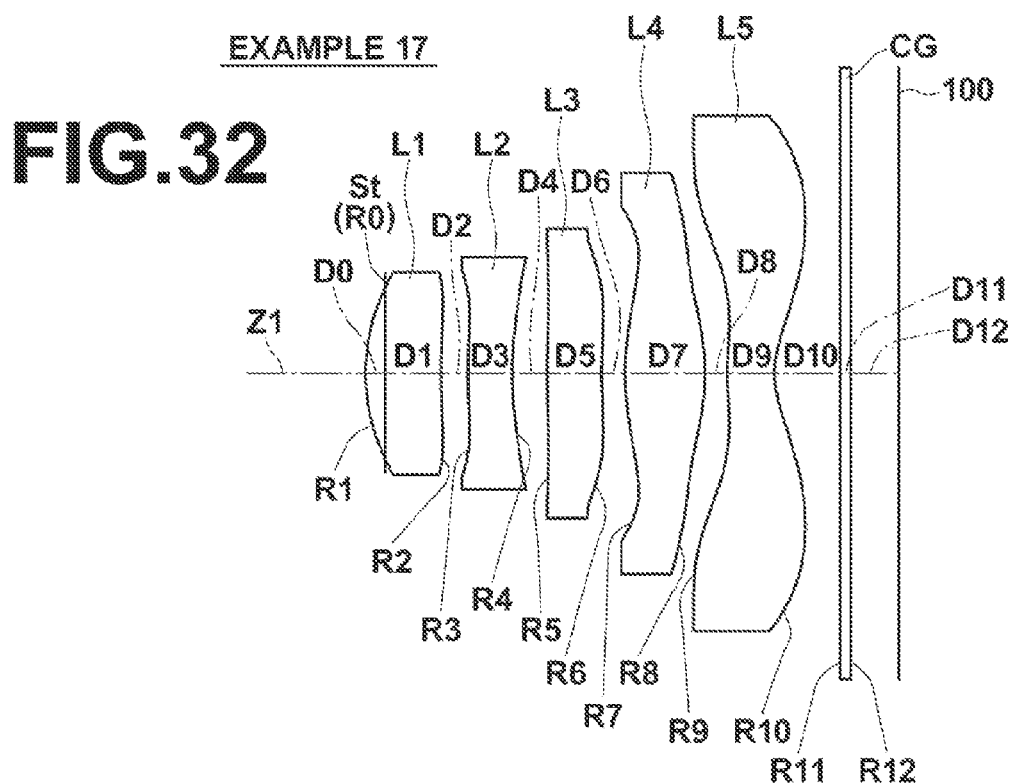
FIG.32 EXAMPLE 17

IMAGING LENS AND IMAGING APPARATUS INCLUDING THE IMAGING LENS

BACKGROUND OF THE INVENTION

1. Field of the Invention

This invention relates to an imaging lens that forms an optical image of a subject on an imaging device, such as a CCD (Charge Coupled Device) and a CMOS (Complementary Metal Oxide Semiconductor), and to an imaging apparatus, such as a digital still camera, a cellular phone with a camera, a smartphone, a tablet terminal, and an information mobile terminal (PDA: Personal Digital Assistance), on which the imaging lens is mounted to perform photography.

2. Description of the Related Art

As personal computers became owned by many families and the like in recent years, digital still cameras, which can input image data of a landscape, a portrait and the like obtained by photography into the personal computers, have rapidly spread. Further, camera modules for inputting images became often mounted on cellular phones. Such equipment having an imaging function uses an imaging device, such as a CCD and a CMOS. As the size of the imaging device became small in recent years, the total size of imaging equipment and the size of an imaging lens to be mounted on the imaging equipment also need to be reduced. Further, since the resolution of the imaging device has become higher at the same time, the imaging lens needs to have high resolution and high performance. For example, the imaging lens needs to have performance corresponding to high resolution of 2 megapixels or higher, and desirably performance corresponding to 5 megapixels or higher.

To satisfy such need, for example, a five lens structure, which consists of a relatively large number of lenses, may be adopted to reduce the total length and to increase resolution (please refer to U.S. Pat. No. 8,411,376 (Patent Document 1), Japanese Unexamined Patent Publication No. 2010-237407 (Patent Document 2), Japanese Unexamined Patent Publication No. 2010-282000 (Patent Document 3), Japanese Patent No. 4858648 (Patent Document 4), U.S. Pat. No. 8,325,429 (Patent Document 5, and U.S. Patent Application Publication No. 20120127359 (Patent Document 6)).

SUMMARY OF THE INVENTION

However, recently, an F-number often needs to be even smaller while the aforementioned need for reduction in total length and higher resolution is satisfied. Therefore, the lens disclosed in Patent Document 1, which consists of five lenses, needs to more excellently correct a lateral chromatic aberration in a peripheral portion of an image formation area. In the imaging lenses disclosed in Patent Documents 2 and 4, the total lengths of the imaging lenses need to be further reduced. The imaging lens disclosed in Patent Document 3 needs to more excellently correct a lateral chromatic aberration. The imaging lenses disclosed in Patent Documents 5 and 6 need to have smaller F-numbers.

In view of the foregoing circumstances, it is an object of the present invention to provide an imaging lens having a small F-number while the total length of the imaging lens is reduced, and which can achieve high image formation performance from a center of an angle of view through a peripheral portion of the angle of view in which especially a longitudinal chromatic aberration and a lateral chromatic aberration in a peripheral portion of an image formation area are excellently corrected. Further, it is another object of the present invention to provide an imaging apparatus on which the imaging lens is mounted, and which can obtain a high resolution imaging image.

An imaging lens of the present invention is an imaging lens substantially consisting of five lenses of:

a first lens having positive power and a meniscus shape with its convex surface facing an object side, and at least one of the surfaces of which is an aspherical surface;

a second lens having negative power and a concave surface facing an image side, and at least one of the surfaces of which is an aspherical surface;

a third lens having negative power and a convex surface facing the object side, and at least one of the surfaces of which is an aspherical surface;

a fourth lens having positive power and a convex surface facing the object side, and at least one of the surfaces of which is an aspherical surface; and a fifth lens having negative rower and a concave surface facing the image side, and at least one of the surfaces of which is an aspherical surface, which are in this order from the object side.

Here, the expression "substantially consisting of five lenses" means that the imaging lens of the present invention may include a lens substantially without power, an optical element, such as a stop and a cover glass, which is not a lens, a mechanism part, such as a lens flange, a lens barrel, an imaging device and a hand shake blur correction mechanism, and the like besides the five lenses.

According to the imaging lens of the present invention, the structure of each lens element is optimized in a lens structure of five lenses in total. Therefore, it is possible to achieve a lens system having a small F-number while the total length of the lens system is reduced. It is possible to achieve the lens system having excellent image formation performance from a center of an angle of view through a peripheral portion of the angle of view, in which especially a longitudinal chromatic aberration and a lateral chromatic aberration in a peripheral portion of an image formation area are excellently corrected.

In the imaging lens of the present invention, more excellent optical performance is achievable further by adopting and satisfying a desirable structure, as described next.

In the imaging lens of the present invention, it is desirable that a stop is arranged on the object side of the first lens. Then, it is possible to set a longer distance between an image formation surface and a pupil relative to the total length of the imaging lens. Therefore, it is possible to reduce an angle of incidence of rays entering an imaging device. Hence, it is possible to achieve higher optical performance.

Further, it is desirable that the imaging lens of the present satisfies at least one of the following conditional formulas (1) to (9-1). As a desirable mode, one of the conditional formulas (1) to (9-1) may be satisfied, or an arbitrary combination of them may be satisfied:

$$\nu d2 < 35 \qquad (1);$$

$$50 < \nu d5 \qquad (2);$$

$$f4/f1 < 1 \qquad (3);$$

$$0.50 < f3/f2 \qquad (4);$$

$$0.70 < f3/f2 \qquad (4\text{-}1);$$

$$0.5 < f/f1 < 1 \qquad (5);$$

$$0.6 < f/f1 < 0.95 \qquad (5\text{-}1);$$

$$-0.8 < f/f2 < -0.1 \qquad (6);$$

$$-0.65 < f/f2 < -0.15 \quad (6\text{-}1);$$

$$-0.6 < f/f3 < 0 \quad (7);$$

$$-0.5 < f/f3 < 0 \quad (7\text{-}1);$$

$$1 < f/f4 < 2.7 \quad (8);$$

$$1.2 < f/f4 < 2.3 \quad (8\text{-}1);$$

$$-2.2 < f/f5 < -0.8 \quad (9);$$

$$-2.1 < f/f5 < -0.8 \quad (9\text{-}1);$$

$$-0.1 < (R3-R4)/(R3+R4) < 0.6 \quad (10); \text{ and}$$

$$-0.1 < (R5-R6)/(R5+R6) < 0.7 \quad (11), \text{ where}$$

vd2: an Abbe number of a second lens for d-line,
vd5: an Abbe number of a fifth lens for d-line,
f: a focal length of an entire system,
f1: a focal length of a first lens,
f2: a focal length of a second lens,
f3: a focal length of a third lens,
f4: a focal length of a fourth lens,
S5: a focal length of a fifth lens,
R3: a paraxial curvature radius of an object-side surface of a second lens,
R4: a paraxial curvature radius of an image-side surface of a second lens,
R5: a paraxial curvature radius of an object-side surface of a third lens, and
R6: a paraxial curvature radius of an image-side surface of a third lens.

An imaging apparatus of the present invention includes an imaging lens of the present invention.

According to the imaging apparatus of the present invention, it is possible to obtain high resolution imaging signals based on a high resolution optical image obtained by the imaging lens of the present invention.

According to the imaging lens of the present invention, the structure of each lens element is optimized in a lens structure of five lenses in total. Therefore, it is possible to achieve a lens system having a small F-number while the total length of the lens system is reduced. It is possible to achieve the lens system having excellent image formation performance from a center of an angle of view through a peripheral portion of the angle of view, in which especially a longitudinal chromatic aberration and a lateral chromatic aberration in a peripheral portion of an image formation area are excellently corrected.

Further, according to the imaging apparatus of the present invention, imaging signals based on an optical image formed by the high performance imaging lens of the present invention are output. Therefore, a high resolution photography image is obtainable based on the imaging signals.

BRIEF DESCRIPTION OF THE DRAWINGS

FIG. 1 is a diagram illustrating a first structural example of an imaging lens according to an embodiment of the present invention, and which is a lens cross section corresponding to Example 1;

FIG. 2 is a diagram illustrating a second structural example of an imaging lens according to an embodiment of the present invention, and which is a lens cross section corresponding to Example 2;

FIG. 3 is a diagram illustrating a third structural example of an imaging lens according to an embodiment of the present invention, and which is a lens cross section corresponding to Example 3;

FIG. 4 is a diagram illustrating a fourth structural example of an imaging lens according to an embodiment of the present invention, and which is a lens cross section corresponding to Example 4;

FIG. 5 is a diagram illustrating a fifth structural example of an imaging lens according to an embodiment of the present invention, and which is a lens cross section corresponding to Example 5;

FIG. 6 is a diagram illustrating a sixth structural example of an imaging lens according to an embodiment of the present invention, and which is a lens cross section corresponding to Example 6;

FIG. 7 is a diagram illustrating a seventh structural example of an imaging lens according to an embodiment of the present invention, and which is a lens cross section corresponding to Example 7;

FIG. 8 is a diagram illustrating an eighth structural example of an imaging lens according to an embodiment of the present invention, and which is a lens cross section corresponding to Example 8;

FIG. 9 is a diagram illustrating a ninth structural example of an imaging lens according to an embodiment of the present invention, and which is a lens cross section corresponding to Example 9;

FIG. 10 is a diagram illustrating a tenth structural example of an imaging lens according to an embodiment of the present invention, and which is a lens cross section corresponding to Example 10;

FIG. 11 is a diagram illustrating an eleventh structural example of an imaging lens according to an embodiment of the present invention, and which is a lens cross section corresponding to Example 11;

FIG. 12 is a diagram illustrating a twelfth structural example of an imaging lens according to an embodiment of the present invention, and which is a lens cross section corresponding to Example 12;

FIG. 13 is a diagram illustrating a thirteenth structural example of an imaging lens according to an embodiment of the present invention, and which is a lens cross section corresponding to Example 13;

FIG. 14 is aberration diagrams illustrating various aberrations of an imaging lens in Example 1 of the present invention, and Section A illustrates a spherical aberration, and Section B illustrates astigmatism (curvature of field), and Section C illustrates distortion;

FIG. 15 is aberration diagrams illustrating various aberrations of an imaging lens in Example 2 of the present invention, and Section A illustrates a spherical aberration, and Section B illustrates astigmatism (curvature of field), and Section C illustrates distortion;

FIG. 22 is aberration diagrams illustrating various aberrations of an imaging lens in Example 9 of the present invention, and Section A illustrates a spherical aberration, and Section B illustrates astigmatism (curvature of field), and Section C illustrates distortion;

FIG. 23 is aberration diagrams illustrating various aberrations of an imaging lens in Example 10 of the present invention, and Section A illustrates a spherical aberration, and Section B illustrates astigmatism (curvature of field), and Section C illustrates distortion;

FIG. 29 is a diagram illustrating a fourteenth structural example of an imaging lens according to an embodiment of the present invention, and which is a lens cross section corresponding to Example 14;

FIG. 30 is a diagram illustrating a fifteenth structural example of an imaging lens according to an embodiment of the present invention, and which is a lens cross section corresponding to Example 15;

FIG. 31 is a diagram illustrating a sixteenth structural example of an imaging lens according to an embodiment of the present invention, and which is a lens cross section corresponding to Example 16;

FIG. 32 is a diagram illustrating a seventeenth structural example of an imaging lens according to an embodiment of the present invention, and which is a lens cross section corresponding to Example 17;

DESCRIPTION OF THE PREFERRED EMBODIMENTS

With reference to drawings, embodiments of the present invention will be described in detail.

FIG. 1 is a diagram illustrating a first structural example of an imaging lens according to a first embodiment of the present invention. This structural example corresponds to a lens structure of a first numerical value example (Table 1 and Table 14), which will be described later. Similarly, FIG. 2 through FIG. 13 and FIG. 29 through FIG. 33 illustrate cross sections of structural examples according to second through 18th embodiments, which correspond to lens structures of second through 18th numerical value examples (Table 2 through Table 13, Table 15 through Table 26 and Tables 28 through 37), which will be described later. In FIG. 1 through FIG. 13 and FIG. 29 through FIG. 33, sign Ri represents the curvature radius of an i-th surface when the most object-side surface of lens elements is the first surface, and signs are assigned in such a manner that the value of i sequentially increases toward the image side (image formation side). Sign Di represents a distance on optical axis Z1 between the i-th surface and (i+1)th surface. Here, the basic structure of each structural example is the same. Therefore, basically, the structural example of the imaging lens illustrated in FIG. 1 will be described, and structural examples illustrated in FIG. 2 through FIG. 13 and FIG. 29 through FIG. 33 will be also described, if necessary.

Imaging lens L according an embodiment of the present invention is appropriate to be used in various kinds of imaging equipment using an imaging device, such as a CCD and a CMOS. Especially, imaging lens L, is appropriate for a relatively small-sized mobile terminal equipment, for example, such as a digital still camera, a cellular phone with a camera, a smartphone, a tablet terminal and a PDA. This imaging lens L includes, along optical axis Z1, first lens L1, second lens L2, third lens L3, fourth lens L4 and fifth lens L5 in this order from the object side.

Figure 27:
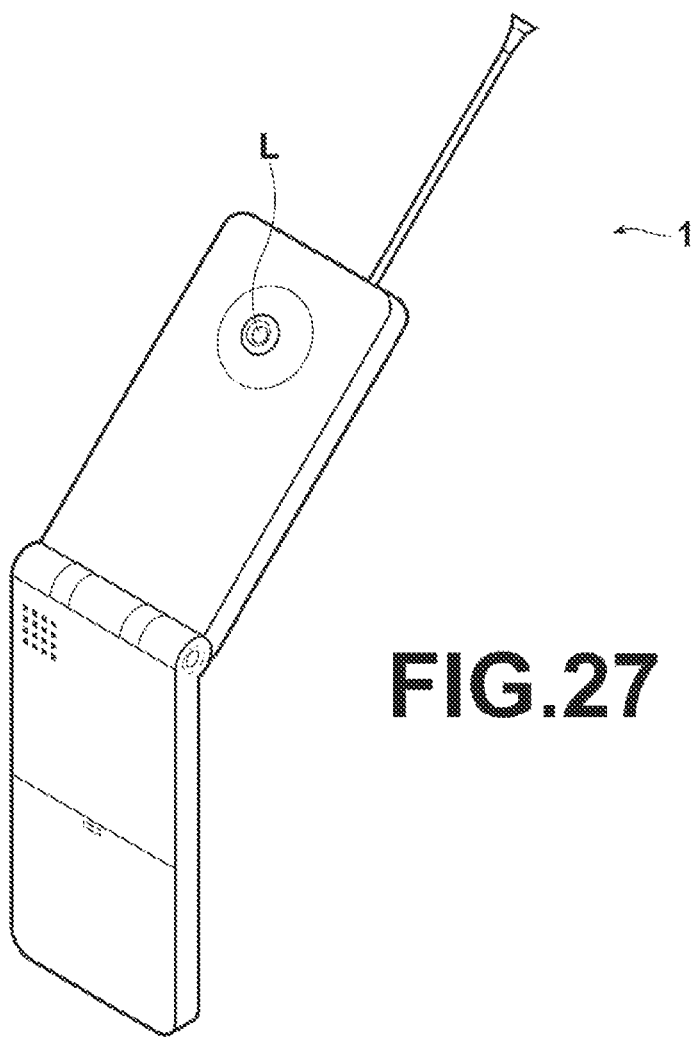
FIG. 27 is a diagram illustrating an imaging apparatus that is a cellular phone terminal including an imaging lens of the present invention.

FIG. 27 is a schematic diagram illustrating a cellular phone terminal, which is an imaging apparatus 1 according to an embodiment of the present invention. The imaging apparatus 1 according to the embodiment of the present invention includes imaging lens L according to an embodiment of the present invention and an imaging device 100, such as a CCD, which outputs imaging signals based on an optical image formed by imaging lens L (please refer to FIG. 1). The imaging device 100 is arranged at an image format ion surface of imaging lens L (imaging surface).

Figure 28:
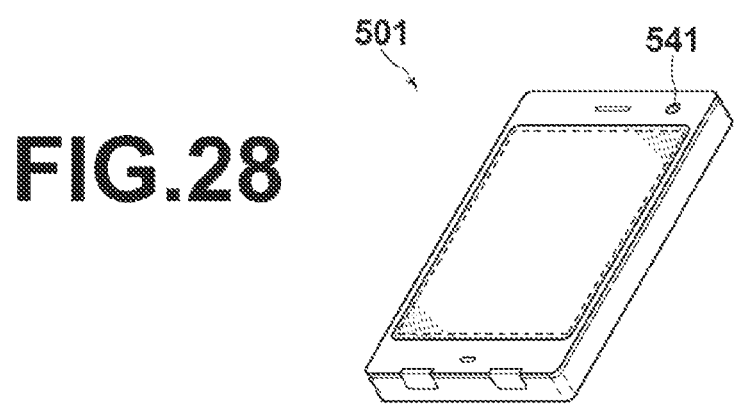
FIG. 28 is a diagram illustrating an imaging apparatus that is a smartphone including an imaging lens of the present invention.
Figure 33:
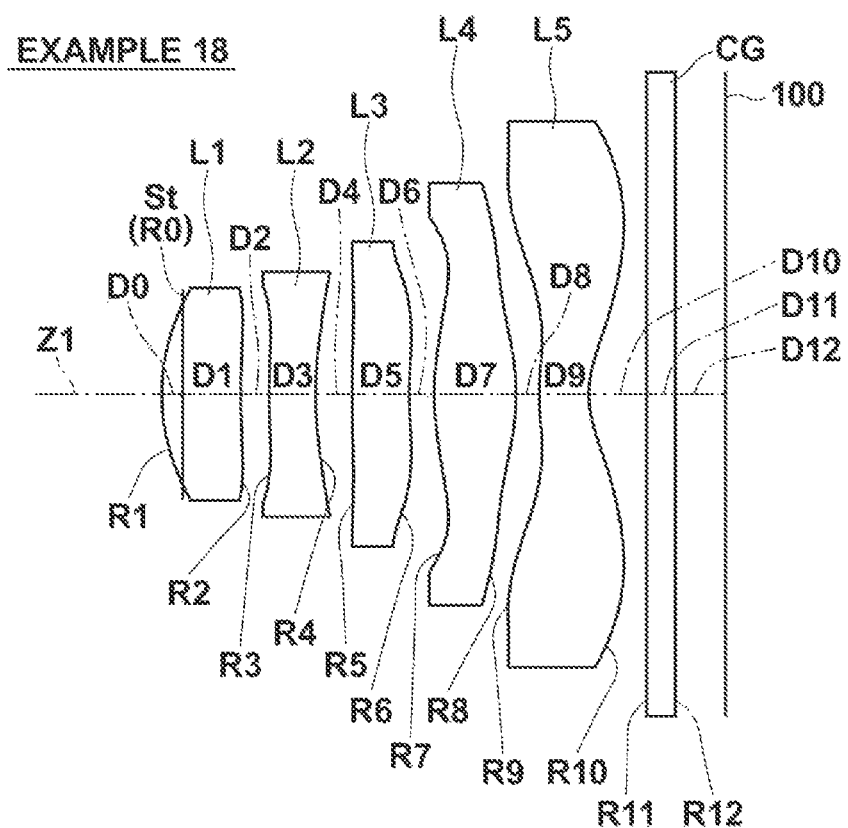
FIG. 33 is a diagram, illustrating an eighteenth structural example of an imaging lens according to an embodiment of the present invention, and which is a lens cross section corresponding to Example 18.

FIG. 28 is a schematic diagram illustrating a smartphone, which is an imaging apparatus 501 according to an embodiment of the present invention. The imaging apparatus 501 according to the embodiment of the present invention includes a camera unit 541 including imaging lens L according to an embodiment of the present invention and an imaging device 100, such as a CCD, which outputs imaging signals based on an optical image formed by imaging lens L (please refer to FIG. 1). The imaging device 100 is arranged at an image formation surface of imaging lens L (imaging surface).

Various kinds of optical member CG may be arranged between fifth lens L5 and the imaging device 100 based on the structure of a camera on which a lens is mounted. For example, a flat-plate-shaped optical member, such as a cover glass for protecting an imaging surface and an infrared-ray cut filter, may be arranged. In this case, for example, a flat-plate-shaped cover glass to which coating having an effect of a filter, such as an infrared-ray cut filter and an ND filter, has been applied may be used as optical member CG.

Alternatively, an effect similar to optical member CG may be given to fifth lens L5 or the like by applying coating to fifth lens L5 or the like without using optical member CG. Then, it is possible to reduce the number of parts, and to reduce the total length.

Further, this imaging lens L includes aperture stop St. Aperture stop St is an optical aperture stop. It is desirable that aperture stop St is arranged immediately on the front or rear side of first lens L1. For example, it is desirable that aperture stop St is a so-called "front stop", which is arranged on the most object side. Here, the term "front stop" means that the position of an aperture stop in the optical axis direction is the same as an intersection of an axial marginal ray and the object-side surface of first lens L1 or located on the object side of the intersection. In the embodiments of the present invention, lenses of the first through 18th structural examples (FIG. 1 through FIG. 13 and FIGS. 29 through 32) correspond to the front stop. When a front stop is adopted, it is possible to set a long distance between an image formation surface and a pupil relative to the total length. Therefore, it is possible to reduce the angle of incidence of rays entering the imaging device. Hence, it is possible to achieve higher optical performance.

This imaging lens L adopts an aspherical surface for at least one of the surfaces of each of first lens L1 through fifth lens L5 to achieve higher performance.

In this imaging lens L, first lens L has positive power in the vicinity of an optical axis. First lens L1 has a meniscus shape in which its object-side surface is a convex surface facing the object side in the vicinity of the optical axis. Therefore, it is possible to easily correct a spherical aberration, and to appropriately reduce the total length.

Second lens L2 has negative power in the vicinity of the of optical axis. Second lens L2 has a concave surface facing the image side in the vicinity of the optical axis. Therefore, it is possible to easily correct a longitudinal chromatic aberration.

Third lens L3 has negative power in the vicinity of the optical axis. It is desirable that third lens L3 has a shape having negative power around the center of the vicinity of the optical axis and positive power in a peripheral portion. In this case, for example, it is desirable that third lens L3 has a shape in which a concave surface faces the image side in the vicinity of the optical axis, and a curvature in the peripheral portion is different from a curvature in the vicinity of the optical axis. When such a shape is applied to third lens L3, it is possible to balance a longitudinal chromatic aberration and a lateral chromatic aberration. Therefore, it is possible to evenly maintain resolution from a central part of an image plane through a peripheral portion of the image plane, and that is desirable. Here, the peripheral portion of third lens L3 means a portion on the outside of about 40% of the maximum effective radius in the direction of a radius. Further, third lens L3 has a convex surface facing the object side in the vicinity of the optical axis. Therefore, it is possible to excellently reduce the total length. It is desirable that third lens L3 has a meniscus shape with a convex surface facing the object side to further enhance this effect.

Fourth lens L4 has positive power in the vicinity of the optical axis. Fourth lens L4 has a convex surface facing the object side in the vicinity of the optical axis. Therefore, it is possible to appropriately reduce the total length.

Fifth lens L5 has negative power in the vicinity of the optical axis. Fifth lens L5 has a concave surface facing the image side in the vicinity of the optical axis.

Next, the action and effect of imaging lens L, which is structured as described above, and especially the action and effect related to conditional formulas will be described in detail.

It is desirable that Abbe number vd2 of second lens L2 for d-line satisfies the following conditional formula (1):

$$vd2 < 35 \tag{1}.$$

If second lens L2 exceeds the upper limit of conditional formula (1), a longitudinal chromatic aberration increases. Therefore, when conditional formula (1) about second lens L2 is satisfied, and Abbe number vd2 is made smaller, and dispersion as the negative lens is made higher, it is possible to excellently correct a longitudinal chromatic aberration. It is more desirable that Abbe number vd2 of second lens L2 for d-line satisfies the following conditional formula (1-1) to further enhance this effect. It is even more desirable that the following conditional formula (1-2) is satisfied. Further, it is desirable that Abbe number vd2 of second lens L2 for d-line satisfies the following conditional formula (1-3) in addition to one of conditional formulas (1), (1-1) and (1-2). That is because if the value is lower than the lower limit of conditional formula (1-3), it becomes difficult to balance a longitudinal chromatic aberration and a lateral chromatic aberration:

$$vd2 < 30 \tag{1-1};$$

$$vd2 < 25 \tag{1-2}; \text{ and}$$

$$20 < vd2 \tag{1-3}.$$

Next, it is desirable that Abbe number vd5 of fifth lens L5 for d-line satisfies the following conditional formula (2):

$$50 < vd5 \tag{2}.$$

If fifth lens L5 is lower than the lower limit of conditional formula (2), a lateral chromatic aberration in a peripheral portion of an image formation area increases. Therefore, when conditional formula (2) about fifth lens L5 is satisfied, and Abbe number vd5 is made greater, and dispersion is made lower, it is possible to suppress deterioration of a lateral chromatic aberration in the peripheral portion of the image formation area. Hence, it is possible to excellently correct a lateral chromatic aberration. It is more desirable that Abbe number vd5 of fifth lens L5 for d-line satisfies the following conditional formula (2-1) to further enhance this effect. It is even more desirable that the following conditional formula (2-2) is satisfied:

$$53 < vd5 \quad (2\text{-}1); \text{ and}$$

$$55 < vd5 \quad (2\text{-}2).$$

Further, it is desirable that focal length f1 of first lens L1 and focal length f4 of fourth lens L4 satisfy the following conditional formula (3):

$$f4/f1 < 1 \quad (3).$$

If the value exceeds the upper limit of conditional formula (3), the total length becomes long, and it becomes difficult to reduce the total length. Therefore, when the focal lengths of first lens L1 and fourth lens L4 satisfy conditional formula (3), it is possible to reduce the total length while maintaining excellent optical performance. Further, it is more desirable that the following conditional formula (3-1) is satisfied to further enhance this effect. It is even more desirable that the following conditional formula (3-2) is satisfied. Further, it is desirable that focal length f1 of first lens L1 and focal length f4 of fourth lens L4 satisfy the following conditional formula (3-3) in addition to one of conditional formulas (3), (3-1) and (3-2). That is because if the value is lower than the lower limit of conditional formula (3-3), correction of curvature of field tends to become difficult:

$$f4/f1 < 0.80 \quad (3\text{-}1);$$

$$f4/f1 < 0.60 \quad (3\text{-}2); \text{ and}$$

$$0.20 < f4/f1 \quad (3\text{-}3).$$

Further, it is desirable that focal length f2 of second lens L2 and focal length f3 of third lens L3 satisfy the following conditional formula (4):

$$0.50 < f3/f2 \quad (4).$$

If the value is lower than the lower limit of conditional formula (4), a longitudinal chromatic aberration increases. Therefore, when a relationship between the focal length of second lens L2 and the focal length of third lens L3 satisfies the condition of formula (4), it is possible to suppress deterioration of a longitudinal chromatic aberration, and to more excellently correct the longitudinal chromatic aberration. Further, it is more desirable that the relationship between the focal length of second lens L2 and the focal length of third lens L3 satisfies the following conditional formula (4-1) to further enhance this effect. It is even are desirable that the following conditional formula (4-2) is satisfied:

$$0.70 < f3/f2 \quad (4\text{-}1); \text{ and}$$

$$0.80 < f3/f2 \quad (4\text{-}2).$$

Further, it is desirable that focal length f of the entire system and focal length f1 of first lens L1 satisfy the following conditional formula (5):

$$0.5 < f/f1 < 1 \quad (5).$$

If the value is lower than the lower limit of conditional formula (5), the refractive power of first lens L1 becomes too weak, compared with the refractive power of the entire system. Therefore, it becomes difficult to reduce the total length. If the value exceeds the upper limit of conditional formula (5), the refractive power of first lens L1 becomes too strong, compared with the refractive power of the entire system. Therefore, correction of a spherical aberration becomes difficult. Further, it becomes difficult to achieve a small F-number. Hence, when conditional formula (5) is satisfied, it is possible to achieve a small F-number and to excellently correct a spherical aberration while reducing the total length. Further, it is more desirable that conditional formula (5-1) is satisfied to further enhance this effect:

$$0.6 < f/f1 < 0.95 \quad (5\text{-}1).$$

Further, it is desirable that focal, length f of the entire system and focal length f2 of second lens L2 satisfy the following conditional formula (6):

$$-0.8 < f/f2 < -0.1 \quad (6).$$

If the value is lower than the lower limit of conditional formula (6), the refractive power of second lens L2 becomes too strong, compared with the refractive power of the entire system. Therefore, correction of a longitudinal chromatic aberration becomes difficult. If the value exceeds the upper limit of conditional formula (6), the refractive power of second lens L2 becomes too weak, compared with the refractive power of the entire system. Therefore, it becomes difficult to reduce the total length. Therefore, when conditional formula (6) is satisfied, it is possible to excellently correct a longitudinal chromatic aberration while appropriately reducing the total length. Further, it is more desirable that conditional formula (6-1) is satisfied to further enhance this effect:

$$-0.65 < f/f2 < -0.15 \quad (6\text{-}1).$$

Further, it is desirable that focal length f of the entire system and focal length f3 of third lens L3 satisfy the following conditional formula (7):

$$-0.6 < f/f3 < 0 \quad (7).$$

If the value is lower than the lower limit of conditional formula (7), the refractive power of third lens L3 becomes too strong, compared with the refractive power of the entire system. Therefore, it becomes difficult to reduce the total length. Further, it becomes difficult to correct both of a longitudinal chromatic aberration and a lateral chromatic aberration in a well-balanced manner. If the value exceeds the upper limit of conditional formula (7), the refractive power of third lens L3 becomes too weak, compared with the refractive power of the entire system. Therefore, correction of a lateral chromatic aberration becomes difficult. Therefore, when conditional formula (7) is satisfied, it is possible to excellently correct both of the longitudinal chromatic aberration and the lateral chromatic aberration, while reducing the total length. Further, it is more desirable that conditional formula (7-1) is satisfied to further enhance this effect:

$$-0.5 < f/f3 < 0 \quad (7\text{-}1).$$

Further, it is desirable that focal length f of the entire system and focal length f4 of fourth lens L4 satisfy the following conditional formula (8):

$$1 < f/f4 < 2.7 \quad (8).$$

If the value is lower than the lower limit of conditional formula (8), the refractive power of fourth lens L4 becomes too weak, compared with the refractive power of the entire system. Therefore, it becomes difficult to reduce the total length. If the value exceeds the upper limit of conditional formula (8), the refractive rower of fourth lens L4 becomes too strong, compared with the refractive power of the entire system. Therefore, correction of curvature of field and a lateral chromatic aberration becomes difficult. Hence, when conditional formula (8) is satisfied, it is possible to excellently correct curvature of field and a lateral chromatic aberration while reducing the total length. Further, it is more desirable that focal length f of the entire system and focal length f4 of fourth lens L4 satisfy conditional formula (8-1) to further enhance this effect:

$$1.2<f/f4<2.3 \tag{8-1}$$

Further, it is desirable that focal length f of the entire system and focal length f5 of fifth lens L5 satisfy the following conditional formula (9):

$$-2.2<f/f5<-0.8 \tag{9}$$

If the value is lower than the lower limit of conditional formula (9), the refractive power of fifth lens L5 becomes too strong, compared with the refractive power of the entire system. Therefore, curvature of field tends to be excessively corrected. Further, the telecentricity deteriorates, and the angle of incidence of rays entering a peripheral portion of the imaging device tends to become too large. Therefore, a conversion efficiency in the peripheral portion of the imaging device tends to drop, and color mixture tends to occur. It the value exceeds the upper limit of conditional formula (9), the refractive power of fifth lens L5 becomes too weak, compared with the refractive power of the entire system. Therefore, correction of curvature of field tends to be insufficient. Hence, when formula (9) is satisfied, it is possible to excellently correct curvature of field. Further, since the telecentricity is appropriately maintained, and it is possible to prevent the angle of incidence of rays entering the peripheral portion of the imaging device from becoming large, the conversion efficiency in the peripheral portion of the imaging device does not tend to drop, and color mixture does not tend to occur. Further, it is more desirable that conditional formula (9-1) is satisfied to further enhance this effect:

$$-2.1<f/f5<-1 \tag{9-1}$$

Further, it is desirable that paraxial curvature radius R3 of an object-side surface of second lens L2 and paraxial curvature radius R4 of an image-side surface of second lens L2 satisfy the following conditional formula (10):

$$-0.1<(R3-R4)/(R3+R4)<0.6 \tag{10}$$

If the value is lower than the lower limit of conditional formula (10), astigmatism tends to increase. If the value exceeds the upper limit of conditional formula (10), correction of a spherical aberration becomes difficult. Therefore, when conditional formula (10) is satisfied, it is possible to excellently correct astigmatism and a spherical aberration. Especially, it is more desirable that paraxial curvature radius R3 of the object-side surface of second lens L2 and paraxial curvature radius R4 of the image-side surface of second lens L2 satisfy the following conditional formula:

$$0.15<(R3-R4)/(R3+R4)<0.55 \tag{10-1}$$

It is desirable that paraxial curvature radius R5 of an object-side surface of third lens L3 and paraxial curvature radius R6 of an image-side surface of third lens 13 satisfy the following conditional formula (11):

$$-0.1<(R5-R6)/(R5+R6)<0.7 \tag{11}$$

If the value is lower than the lower limit of conditional formula (11), it becomes difficult to reduce the total length. If the value exceeds the upper limit of conditional formula (11), astigmatism tends to increase. Therefore, when conditional formula (11) is satisfied, it is possible to excellently correct astigmatism while reducing the total length. Further, it is more desirable that conditional formula (11-1) is satisfied to further enhance this effect:

$$0<(R5-R6)/(R5+R6)<0.65 \tag{11-1}$$

As described above, according to imaging lens L of an embodiment of the present invention, the structure of each lens element is optimized in a lens structure of five lenses in total. Therefore, it is possible to achieve a lens system having a small. F-number while the total length is reduced. It is possible to achieve the lens system having excellent image formation performance from a center of an angle of view through a peripheral portion of the angle of view, in which especially a longitudinal chromatic aberration and a lateral chromatic aberration are excellently corrected.

Further, when a desirable condition or conditions are appropriately satisfied, a product is appropriate for production, and more excellent image formation performance is achievable. Further, an imaging apparatus according to an embodiment of the present invention outputs imaging signals based on an optical image formed by high performance imaging lens L according to an embodiment of the present invention. Therefore, it is possible to obtain a photography image with high resolution from a center of an angle of view through a peripheral portion of the angle of view.

Next, specific numerical value examples of imaging lenses according to embodiments of the present invention will be described. Plural numerical value examples will be described collectively.

Table 1 and Table 14, which will be given later in this specification, show specific lens data corresponding to the structure of the imaging lens illustrated in FIG. 1. Specifically, Table 1 shows basic lens data, and Table 14 shows data about aspherical surfaces. In the lens data shown in Table 1, the column of surface number Si shows the surface number of the i-th surface for the imaging lens of Example 1. The most-object-side surface of the lens elements is the first surface (aperture stop St is the 0th surface), and surface numbers sequentially increase toward the image side. The column of curvature radius Ri shows the value (mm) of the curvature radius of the i-th surface from the object side, which corresponds to sign Ri assigned in FIG. 1. Similarly, the column of surface distance Di shows a distance (mm) on an optical axis between the i-th surface Si and the (i+1) th surface Si+1 from the object side. The column of Ndj shows the value of a refractive index of a j-th optical element from the object side for d-line (587.56 nm). The column of vdj shows the value of an Abbe number of the j-th optical element from the object side for d-line.

In the imaging lens of Example 1, both surfaces of all of first lens L1 through fifth lens L5 are aspherical. The basic lens data of Table 1 show, as the curvature radius of each of the aspherical surfaces, the numerical value of a curvature radius in the vicinity of the optical axis (paraxial curvature radius).

Table 14 shows aspherical surface data in the imaging lens of Example 1. In the numerical values indicated as the aspherical surface data, the sign "E" represents that a number after the sign "E" is an "exponent" using 10 as a base, and that a value before the sign "E" is multiplied by a numerical value represented by the exponential function using 10 as the base. For example, "1.0E-02" means "1.00×10$^{-2}$".

As aspherical surface data, values of coefficients Ai and K in the aspherical surface equation represented by the following equation (A) are shown. Specifically, Z represents the length (mm) of a perpendicular from a point on an aspherical surface at height h from an optical axis to a plane that contacts with the vertex of the aspherical surface (the plane is perpendicular to the optical axis).

$$Z=C\cdot h^2/(1+(1-K\cdot C^2\cdot h^2)^{1/2}+\Sigma Ai\cdot h^i \quad (A),\text{ where}$$

Z: the depth of the aspherical surface (mm),
h: a distance (height) from the optical axis to the lens surface (mm),
C: a paraxial curvature=1/R (R: a paraxial curvature radius),
Ai: the i-th order aspherical coefficient (i is an integer greater than or equal to 3), and
K: an aspherical coefficient.

In a similar manner to the imaging lens of Example 1, as described above, Table 2 and Table 15 show, as Example 2, specific lens data corresponding to the structure of an imaging lens illustrated in FIG. 2. Similarly, Table 3 through Table 13 and Table 16 through Table 26 show, as Example 3 through Example 13, specific lens data corresponding the structure of imaging lenses illustrated in FIG. 3 through FIG. 13. Similarly, Table 28 through Table 32 and Table 33 through Table 37 show, as Example 14 through Example 18, specific lens data corresponding the structure of imaging lenses illustrated in FIG. 29 through FIG. 33. In the imaging lenses of Examples 2 through 18, both surfaces of all of first lens L1 through fifth lens L5 are aspherical.

Table 27 collectively shows values about the aforementioned conditional formulas for each example. Table 27 shows, as various kinds of data, F-number Fno, and focal length f (mm) of the entire system. In the lens data of each example shown in the following tables 1 through 18, mm is used as the unit of length. However, since an optical system can be used by proportionally enlarging or reducing the optical system, other appropriate units may be used.

FIG. 14, Section A through Section C illustrate a spherical aberration, astigmatism (curvature of field) and distortion (distortion aberration; in the imaging lens of Example 1, respectively. Each aberration diagram illustrates an aberration when d-line (wavelength 587.56 nm) is a reference wavelength. The diagram of the spherical aberration and the diagram of the astigmatism also illustrate aberrations for g-line (wavelength 435.83 nm) and C-line (wavelength 656.27 nm). In the diagram of astigmatism, an aberration in sagittal direction (S) is indicated by a solid line, and an aberration in tangential direction (T) is indicated by a broken line. Further, Fno. represents an E-number, and Y represents image height (Y).

Figure 16:
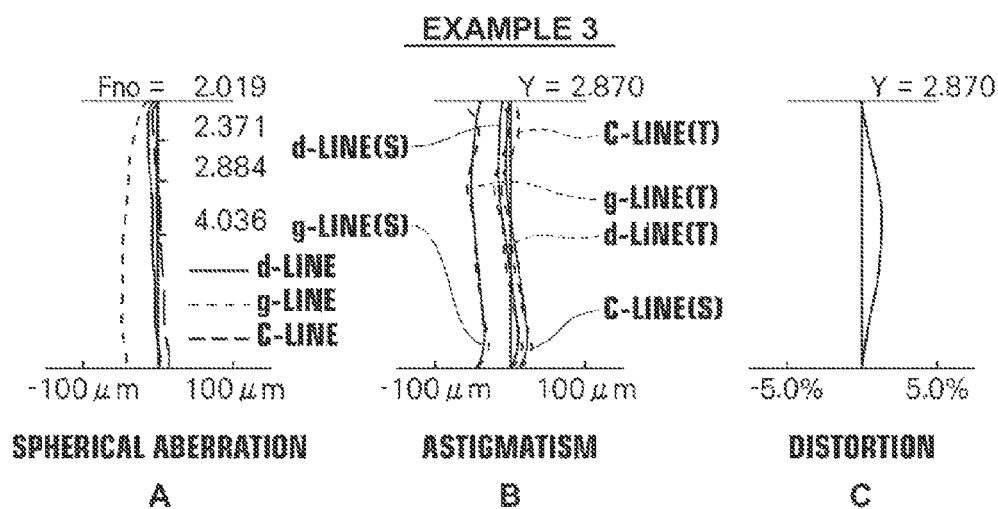
FIG. 16 is aberration diagrams illustrating various aberrations of an imaging lens in Example 3 of the present invention, and Section A illustrates a spherical aberration, and Section B illustrates astigmatism (curvature of field), and Section C illustrates distortion.
Figure 17:
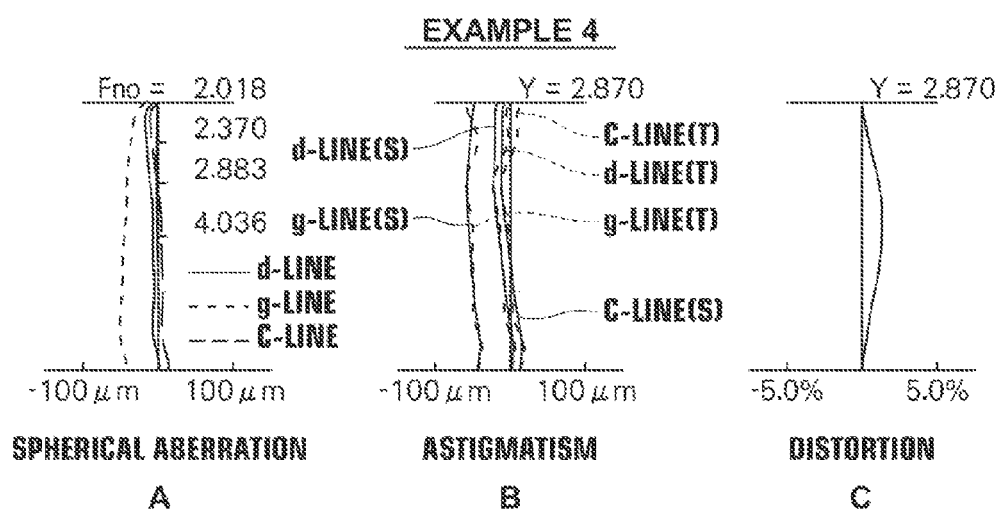
FIG. 17 is aberration diagrams illustrating various aberrations of an imaging lens in Example 4 of the present invention, and Section A illustrates a spherical aberration, and Section B illustrates astigmatism (curvature of field), and Section C illustrates distortion.
Figure 18:
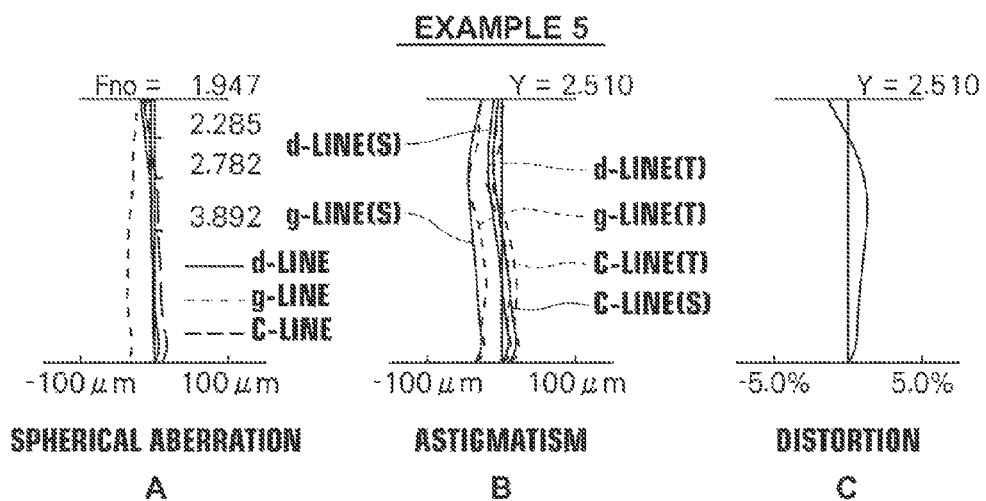
FIG. 18 is aberration diagrams illustrating various aberrations of an imaging lens in Example 5 of the present invention, and Section A illustrates a spherical aberration, and Section B illustrates astigmatism (curvature of field), and Section C illustrates distortion.
Figure 19:
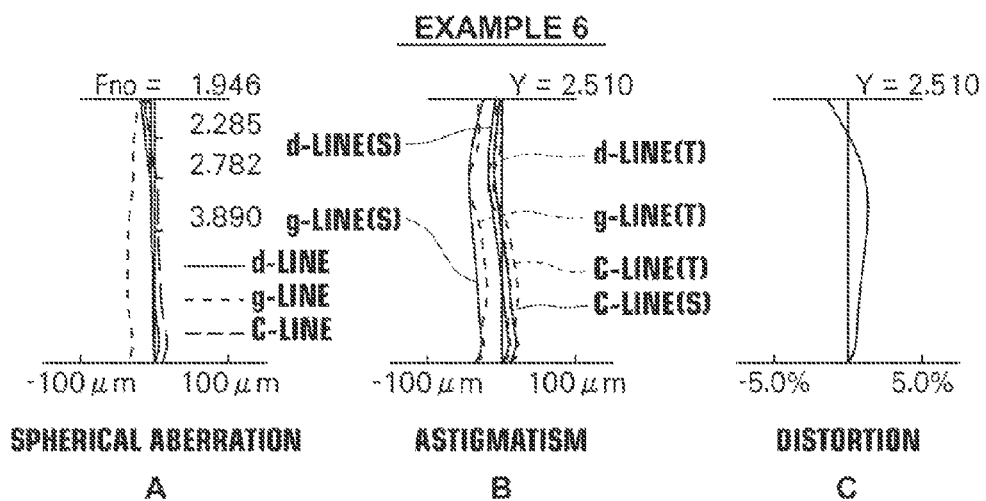
FIG. 19 is aberration diagrams illustrating various aberrations of an imaging lens in Example 6 of the present invention, and Section A illustrates a spherical aberration, and Section B illustrates astigmatism (curvature of field), and Section C illustrates distortion.
Figure 20:
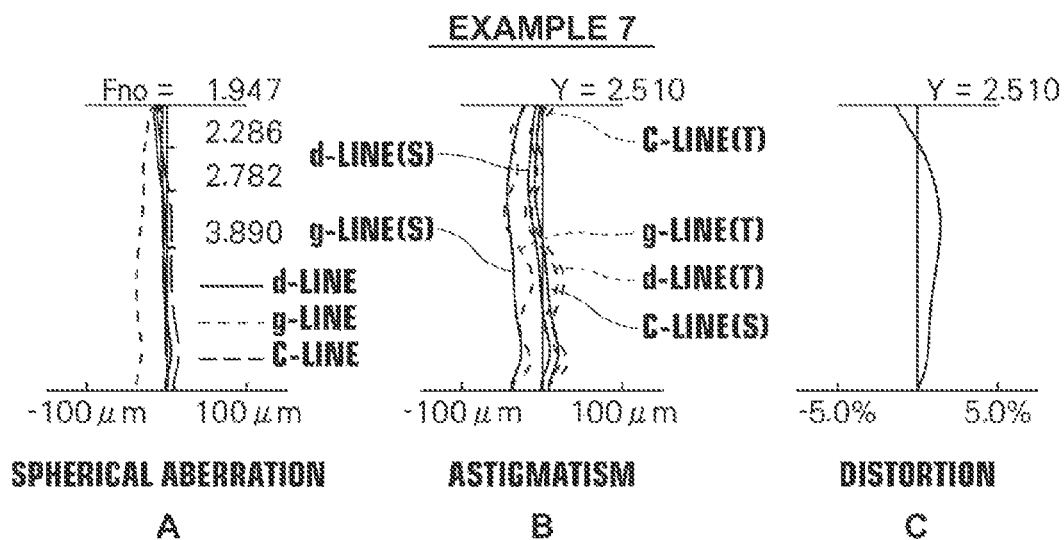
FIG. 20 is aberration diagrams illustrating various aberrations of an imaging lens in Example 7 of the present invention, and Section A illustrates a spherical aberration, and Section B illustrates astigmatism (curvature of field), and Section C illustrates distortion.
Figure 21:
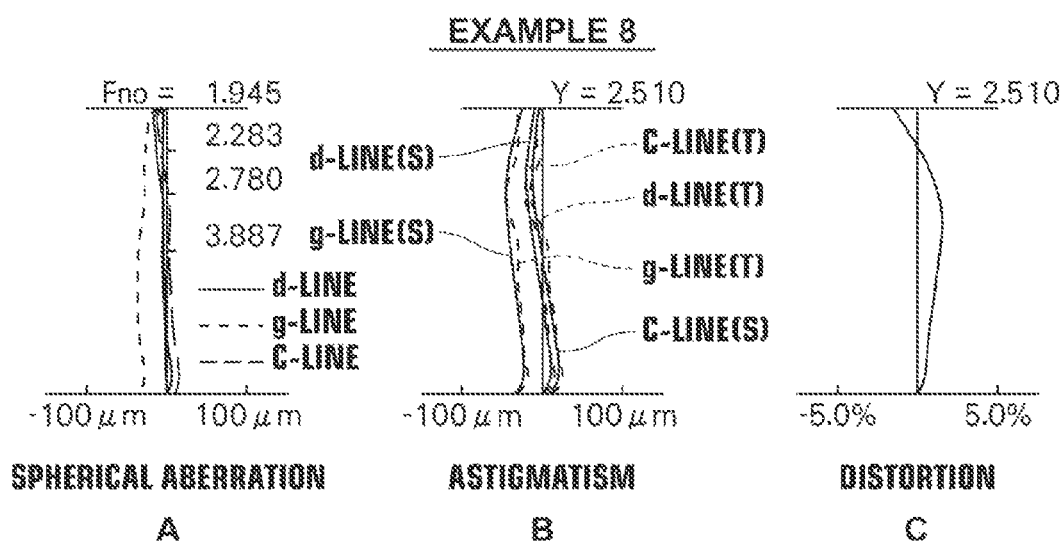
FIG. 21 is aberration diagrams illustrating various aberrations of an imaging lens in Example 8 of the present invention, and Section A illustrates a spherical aberration, and Section B illustrates astigmatism (curvature of field), and Section C illustrates distortion.
Figure 24:
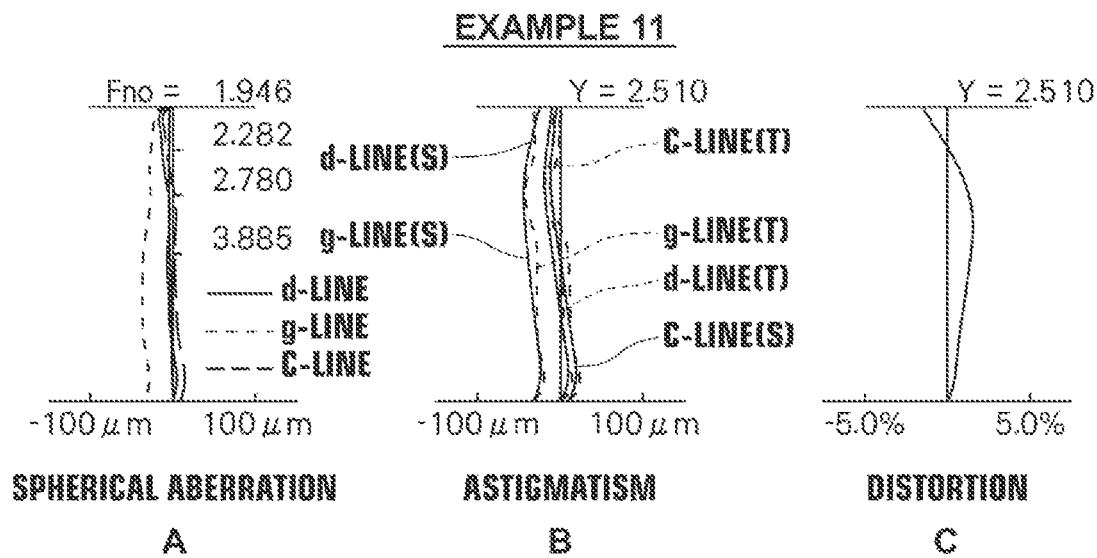
FIG. 24 is aberration diagrams illustrating various aberrations of an imaging lens in Example 11 of the present invention, and Section A illustrates a spherical aberration, and Section B illustrates astigmatism (curvature of field), and Section C illustrates distortion.
Figure 25:
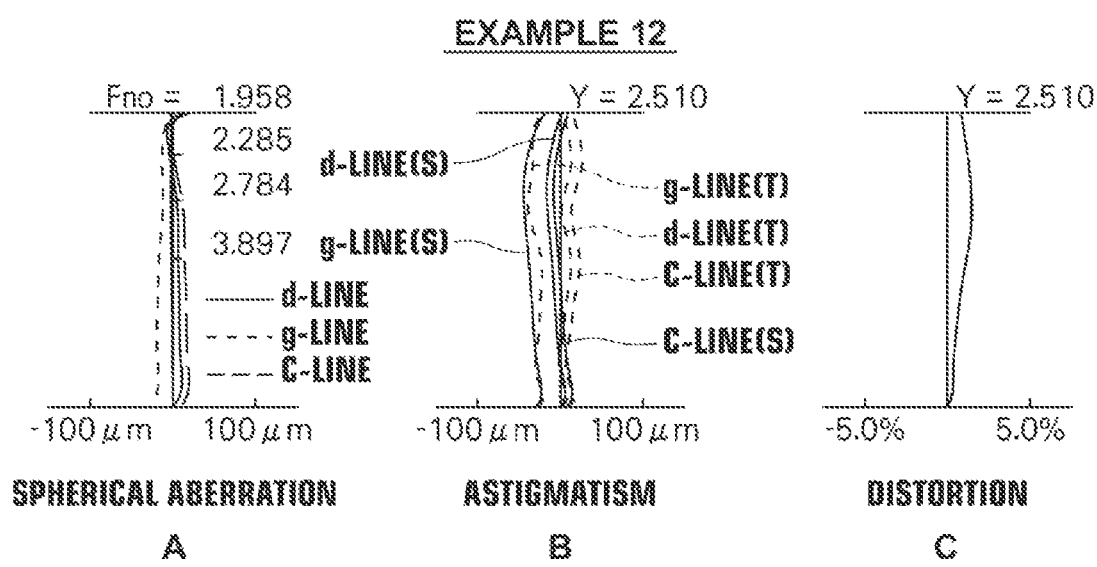
FIG. 25 is aberration diagrams illustrating various aberrations of an imaging lens in Example 12 of the present invention, and Section A illustrates a spherical aberration, and Section B illustrates astigmatism (curvature of field), and Section C illustrates distortion.
Figure 26:
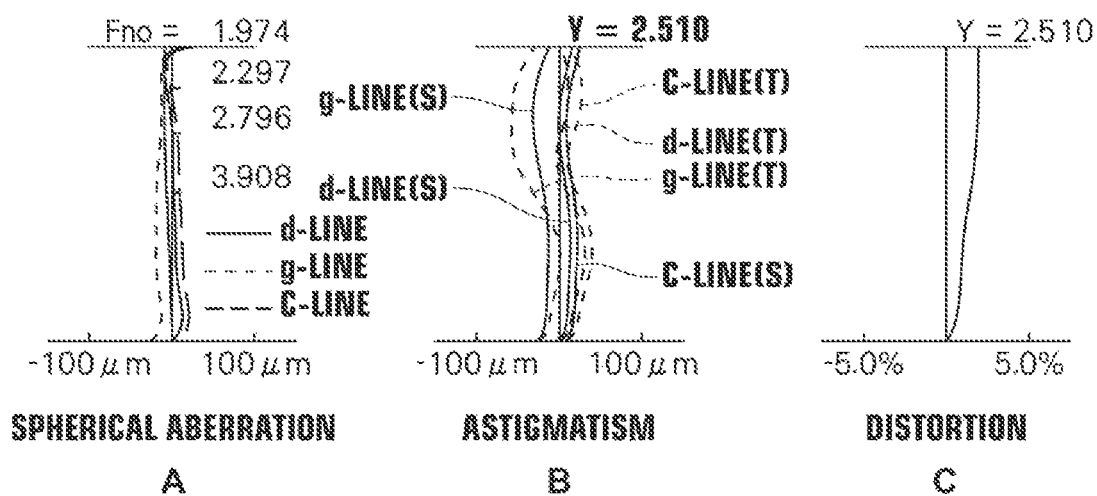
FIG. 26 is aberration diagrams illustrating various aberrations of an imaging lens in Example 13 of the present invention, and Section A illustrates a spherical aberration, and Section B illustrates astigmatism (curvature of field), and Section C illustrates distortion.
Figure 34:
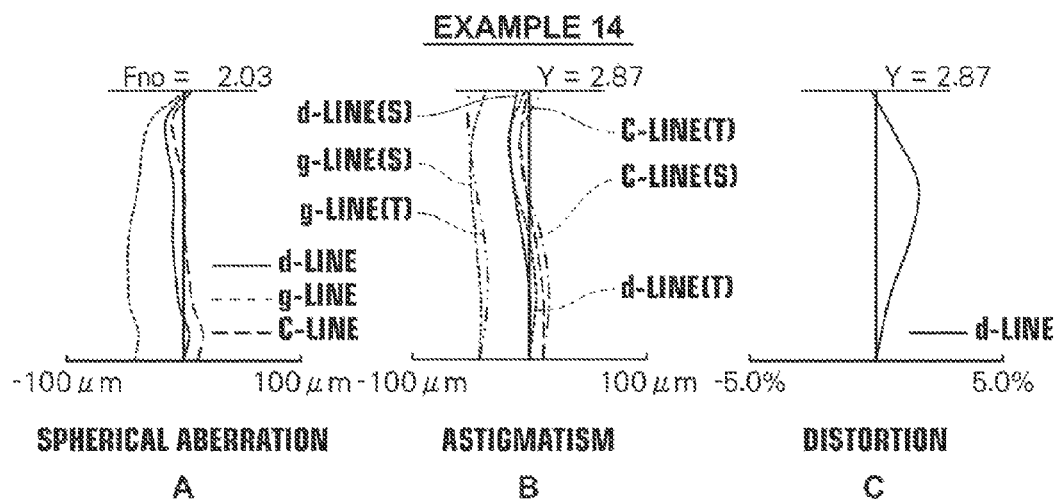
FIG. 34 is aberration diagrams illustrating various aberrations of an imaging lens in Example 14 of the present invention, and Section A illustrates a spherical aberration, and Section B illustrates astigmatism (curvature of field), and Section C illustrates distortion.
Figure 35:
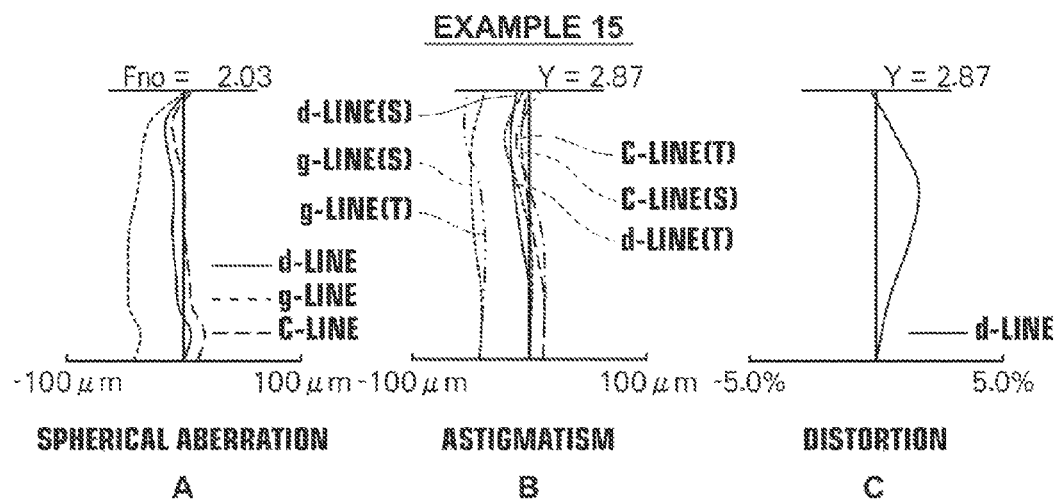
FIG. 35 is aberration diagrams illustrating various aberrations of an imaging lens in Example 15 of the present invention, and Section A illustrates a spherical aberration, and Section B illustrates astigmatism (curvature of field), and Section C illustrates distortion.
Figure 36:
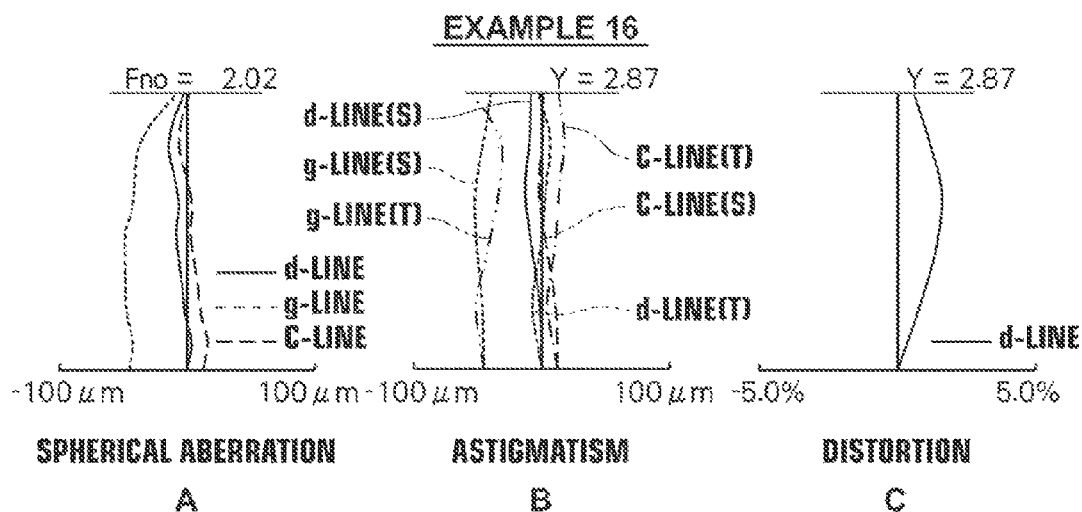
FIG. 36 is aberration diagrams illustrating various aberrations of an imaging lens in Example 16 of the present invention, and Section A illustrates a spherical aberration, and Section B illustrates astigmatism (curvature of field), and Section C illustrates distortion.
Figure 37:
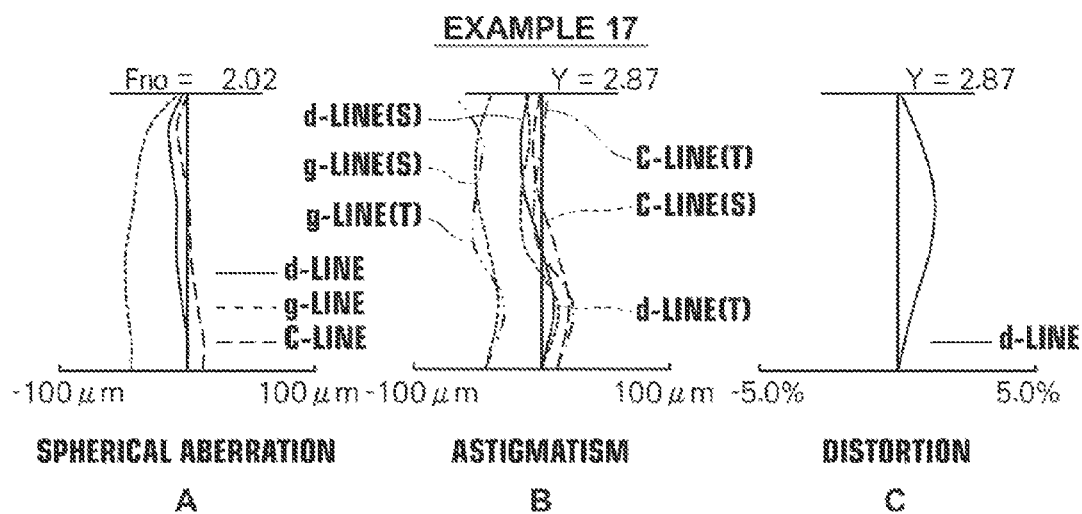
FIG. 37 is aberration diagrams illustrating various aberrations of an imaging lens in Example 17 of the present invention, and Section A illustrates a spherical aberration, and Section B illustrates astigmatism (curvature of field), and Section C illustrates distortion.
Figure 38:
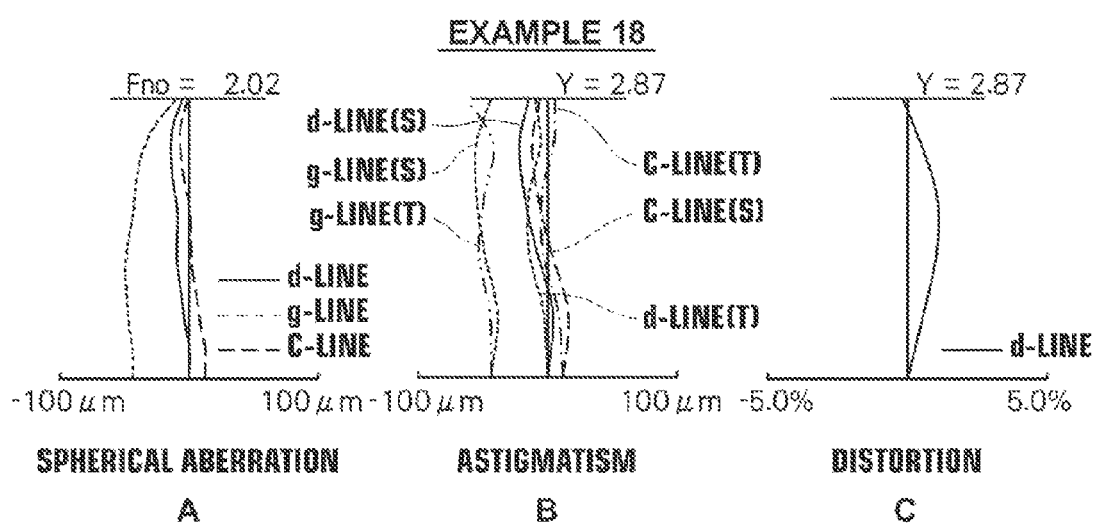
FIG. 38 is aberration diagrams illustrating various aberrations of an imaging lens in Example 18 of the present invention, and Section A illustrates a spherical aberration, and Section B illustrates astigmatism (curvature of field), and Section C illustrates distortion.

Similarly, FIG. 15, Section A through Section C illustrate various aberrations for the imaging lens of Example 2. Similarly, FIG. 16, Section A through Section C through FIG. 26, Section A through Section C illustrate various aberrations for the imaging lenses of Example 3 through Example 13. FIG. 34, Section A through Section C through FIG. 38, Section A through Section C illustrate various aberrations for the imaging lenses of Example 14 through Example 18.

As the numerical value data and the aberration diagrams show, each example achieves high image formation performance while reducing the total length.

The present invention is not limited to the aforementioned embodiments nor examples, and various modifications are possible. For example, values of a curvature radius, a distance between surfaces, a refractive index, an Abbe number and an aspherical coefficient of each lens element are not limited to the values in the aforementioned examples of numerical values, but may be other values.

In the description of each of all the examples, use of the imaging lens with fixed focus is assumed. Alternatively, the imaging lens may be structured in such a manner, that focus is adjustable. For example, the imaging lens may be structured in such a manner that autofocusing is possible by extending the whole lens system, or by moving, on an optical axis, a part of lenses.

TABLE 1

EXAMPLE 1 - BASIC LENS DATA

| Si | Ri | Di | Ndj | vdj |
|---|---|---|---|---|
| 0 | ∞ | −0.1800 | | |
| 1* | 1.8267 | 0.6937 | 1.533914 | 55.89 |
| 2* | 6.5563 | 0.2384 | | |
| 3* | 6.3730 | 0.4000 | 1.633506 | 23.63 |
| 4* | 3.1157 | 0.3183 | | |
| 5* | 6.6529 | 0.4959 | 1.533914 | 55.89 |
| 6* | 3.3108 | 0.2036 | | |
| 7* | 2.6081 | 0.7332 | 1.533914 | 55.89 |
| 8* | −2.1587 | 0.2271 | | |
| 9* | 2.3559 | 0.4078 | 1.533914 | 55.89 |
| 10* | 0.8740 | 0.6000 | | |
| 11 | ∞ | 0.1000 | 1.516330 | 64.14 |
| 12 | ∞ | 0.6961 | | |

*ASPHERICAL SURFACE

TABLE 2

EXAMPLE 2 - BASIC LENS DATA

| Si | Ri | Di | Ndj | vdj |
|---|---|---|---|---|
| 0 | ∞ | −0.1800 | | |
| 1* | 1.8809 | 0.7102 | 1.533914 | 55.89 |
| 2* | 8.1915 | 0.2659 | | |
| 3* | 9.3406 | 0.4000 | 1.633506 | 23.63 |
| 4* | 3.9217 | 0.3915 | | |
| 5* | 13.2098 | 0.4959 | 1.533914 | 55.89 |
| 6* | 3.5496 | 0.2073 | | |
| 7* | 1.6869 | 0.6989 | 1.533914 | 55.89 |
| 8* | −3.3006 | 0.1900 | | |
| 9* | 2.9599 | 0.4000 | 1.533914 | 55.89 |
| 10* | 0.9186 | 0.6000 | | |
| 11 | ∞ | 0.1000 | 1.516330 | 64.14 |
| 12 | ∞ | 0.6961 | | |

*ASPHERICAL SURFACE

TABLE 3

EXAMPLE 3 - BASIC LENS DATA

| Si | Ri | Di | Ndj | vdj |
|---|---|---|---|---|
| 0 | ∞ | −0.1800 | | |
| 1* | 1.8384 | 0.6723 | 1.533914 | 55.89 |
| 2* | 7.0548 | 0.2609 | | |
| 3* | 6.3381 | 0.4000 | 1.633506 | 23.63 |
| 4* | 3.0802 | 0.3276 | | |
| 5* | 7.0402 | 0.4959 | 1.533914 | 55.89 |
| 6* | 3.6063 | 0.2121 | | |
| 7* | 2.5534 | 0.7229 | 1.533914 | 55.89 |
| 8* | −2.3969 | 0.2008 | | |
| 9* | 2.3193 | 0.4314 | 1.533914 | 55.89 |
| 10* | 0.8723 | 0.6000 | | |
| 11 | ∞ | 0.1000 | 1.516330 | 64.14 |
| 12 | ∞ | 0.6961 | | |

*ASPHERICAL SURFACE

TABLE 4

EXAMPLE 4 · BASIC LENS DATA

| Si | Ri | Di | Ndj | vdj |
|---|---|---|---|---|
| 0 | ∞ | −0.1800 | | |
| 1* | 1.8360 | 0.6685 | 1.533914 | 55.89 |
| 2* | 6.8871 | 0.2834 | | |
| 3* | 6.8320 | 0.4000 | 1.633506 | 23.63 |
| 4* | 3.1576 | 0.3115 | | |
| 5* | 6.7540 | 0.4959 | 1.533914 | 55.89 |
| 6* | 4.2771 | 0.2463 | | |
| 7* | 2.6597 | 0.7058 | 1.533914 | 55.89 |
| 8* | −2.6137 | 0.1988 | | |
| 9* | 2.2331 | 0.4277 | 1.533914 | 55.89 |
| 10* | 0.8621 | 0.8000 | | |
| 11 | ∞ | 0.1000 | 1.516330 | 64.14 |
| 12 | ∞ | 0.6961 | | |

*ASPHERICAL SURFACE

TABLE 5

EXAMPLE 5 · BASIC LENS DATA

| Si | Ri | Di | Ndj | vdj |
|---|---|---|---|---|
| 0 | ∞ | −0.1800 | | |
| 1* | 1.6244 | 0.5495 | 1.533914 | 55.89 |
| 2* | 4.8707 | 0.2234 | | |
| 3* | 5.2299 | 0.3500 | 1.633506 | 23.63 |
| 4* | 2.4802 | 0.1940 | | |
| 5* | 3.8698 | 0.4337 | 1.533914 | 55.89 |
| 6* | 3.1263 | 0.1608 | | |
| 7* | 4.0067 | 0.7275 | 1.533914 | 55.89 |
| 8* | −0.9617 | 0.1724 | | |
| 9* | −9.7162 | 0.4281 | 1.533914 | 55.89 |
| 10* | 0.9668 | 0.5247 | | |
| 11 | ∞ | 0.1100 | 1.516330 | 64.14 |
| 12 | ∞ | 0.6087 | | |

*ASPHERICAL SURFACE

TABLE 6

EXAMPLE 6 · BASIC LENS DATA

| Si | Ri | Di | Ndj | vdj |
|---|---|---|---|---|
| 0 | ∞ | −0.1800 | | |
| 1* | 1.6277 | 0.5461 | 1.533914 | 55.89 |
| 2* | 4.9143 | 0.2245 | | |
| 3* | 5.4212 | 0.3500 | 1.633506 | 23.63 |
| 4* | 2.4951 | 0.1963 | | |
| 5* | 3.8202 | 0.4337 | 1.533914 | 55.69 |
| 6* | 3.1768 | 0.1621 | | |
| 7* | 4.3304 | 0.7076 | 1.533914 | 55.89 |
| 8* | −1.0216 | 0.2115 | | |
| 9* | −21.0742 | 0.4157 | 1.533914 | 55.89 |
| 10* | 0.9881 | 0.5247 | | |
| 11 | ∞ | 0.1100 | 1.516330 | 64.14 |
| 12 | ∞ | 0.6087 | | |

*ASPHERICAL SURFACE

TABLE 7

EXAMPLE 7 · BASIC LENS DATA

| Si | Ri | Di | Ndj | vdj |
|---|---|---|---|---|
| 0 | ∞ | −0.1800 | | |
| 1* | 1.6277 | 0.5454 | 1.533914 | 55.89 |
| 2* | 4.9464 | 0.2248 | | |
| 3* | 5.4587 | 0.3500 | 1.633506 | 23.63 |
| 4* | 2.4934 | 0.1965 | | |
| 5* | 3.8006 | 0.4337 | 1.533914 | 55.89 |

TABLE 7-continued

EXAMPLE 7 · BASIC LENS DATA

| Si | Ri | Di | Ndj | vdj |
|---|---|---|---|---|
| 6* | 3.1136 | 0.1622 | | |
| 7* | 4.3718 | 0.7008 | 1.533914 | 55.89 |
| 8* | −0.9814 | 0.2259 | | |
| 9* | −5.9923 | 0.4136 | 1.533914 | 55.89 |
| 10* | 1.0935 | 0.5247 | | |
| 11 | ∞ | 0.1100 | 1.516330 | 64.14 |
| 12 | ∞ | 0.6087 | | |

*ASPHERICAL SURFACE

TABLE 8

EXAMPLE 8 · BASIC LENS DATA

| Si | Ri | Di | Ndj | vdj |
|---|---|---|---|---|
| 0 | ∞ | −0.1800 | | |
| 1* | 1.6566 | 0.5429 | 1.533914 | 55.89 |
| 2* | 5.2718 | 0.2253 | | |
| 3* | 5.5522 | 0.3500 | 1.633506 | 23.63 |
| 4* | 2.4746 | 0.1876 | | |
| 5* | 3.5818 | 0.4337 | 1.533914 | 55.89 |
| 6* | 3.3710 | 0.1740 | | |
| 7* | 4.8550 | 0.6945 | 1.533914 | 55.89 |
| 8* | −1.2781 | 0.2140 | | |
| 9* | 3.1909 | 0.4252 | 1.533914 | 55.89 |
| 10* | 0.8354 | 0.5247 | | |
| 11 | ∞ | 0.1100 | 1.516330 | 64.14 |
| 12 | ∞ | 0.6087 | | |

*ASPHERICAL SURFACE

TABLE 9

EXAMPLE 9 · BASIC LENS DATA

| Si | Ri | Di | Ndj | vdj |
|---|---|---|---|---|
| 0 | ∞ | −0.1800 | | |
| 1* | 1.6611 | 0.5412 | 1.533914 | 55.89 |
| 2* | 5.3201 | 0.2257 | | |
| 3* | 5.5385 | 0.3500 | 1.633506 | 23.63 |
| 4* | 2.4632 | 0.1853 | | |
| 5* | 3.5743 | 0.4337 | 1.533914 | 55.89 |
| 6* | 3.4215 | 0.1764 | | |
| 7* | 4.9724 | 0.9614 | 1.533914 | 55.89 |
| 8* | −1.3337 | 0.2173 | | |
| 9* | 2.6608 | 0.4240 | 1.533914 | 55.89 |
| 10* | 0.8144 | 0.5247 | | |
| 11 | ∞ | 0.1100 | 1.516330 | 64.14 |
| 12 | ∞ | 0.6087 | | |

*ASPHERICAL SURFACE

TABLE 10

EXAMPLE 10 · BASIC LENS DATA

| Si | Ri | Di | Ndj | vdj |
|---|---|---|---|---|
| 0 | ∞ | −0.1800 | | |
| 1* | 1.6624 | 0.5419 | 1.533914 | 55.89 |
| 2* | 5.3387 | 0.2254 | | |
| 3* | 5.5077 | 0.3500 | 1.633506 | 23.63 |
| 4* | 2.4628 | 0.1851 | | |
| 5* | 3.5889 | 0.4337 | 1.533914 | 55.89 |
| 6* | 3.3412 | 0.1734 | | |
| 7* | 4.8111 | 0.6938 | 1.533914 | 55.89 |
| 8 | −1.3786 | 0.2160 | | |
| 9* | 2.3336 | 0.4211 | 1.533914 | 55.89 |
| 10* | 0.7943 | 0.5247 | | |

TABLE 10-continued

EXAMPLE 10 • BASIC LENS DATA

| Si | Ri | Di | Ndj | νdj |
|---|---|---|---|---|
| 11 | ∞ | 0.1100 | 1.516330 | 64.14 |
| 12 | ∞ | 0.6087 | | |

*ASPHERICAL SURFACE

TABLE 11

EXAMPLE 11 • BASIC LENS DATA

| Si | Ri | Di | Ndj | νdj |
|---|---|---|---|---|
| 0 | ∞ | −0.1800 | | |
| 1* | 1.6678 | 0.5412 | 1.533914 | 55.89 |
| 2* | 5.3810 | 0.2258 | | |
| 3* | 5.4233 | 0.3500 | 1.633506 | 23.83 |
| 4* | 2.4445 | 0.1851 | | |
| 5* | 3.5987 | 0.4337 | 1.533914 | 55.89 |
| 6* | 3.2502 | 0.1691 | | |
| 7* | 4.5467 | 0.6913 | 1.533914 | 55.89 |
| 8* | −1.4542 | 0.2272 | | |
| 9* | 2.1043 | 0.4206 | 1.533914 | 55.89 |
| 10* | 0.7857 | 0.5247 | | |
| 11 | ∞ | 0.1100 | 1.516330 | 64.14 |
| 12 | ∞ | 0.6087 | | |

*ASPHERICAL SURFACE

TABLE 12

EXAMPLE 12 • BASIC LENS DATA

| Si | Ri | Di | Ndj | νdj |
|---|---|---|---|---|
| 0 | ∞ | −0.1800 | | |
| 1* | 1.6146 | 0.6415 | 1.533914 | 55.89 |
| 2* | 6.6000 | 0.2263 | | |
| 3* | 6.4966 | 0.3500 | 1.633506 | 23.63 |
| 4* | 2.3462 | 0.1621 | | |
| 5* | 4.3718 | 0.4337 | 1.620000 | 30.00 |
| 6* | 3.2756 | 0.1529 | | |
| 7* | 5.2934 | 0.6187 | 1.533914 | 55.89 |
| 8* | −1.2338 | 0.2812 | | |
| 9* | 2.7474 | 0.3601 | 1.533914 | 55.89 |
| 10* | 0.8245 | 0.5247 | | |
| 11 | ∞ | 0.1100 | 1.516330 | 64.14 |
| 12 | ∞ | 0.6087 | | |

*ASPHERICAL SURFACE

TABLE 13

EXAMPLE 13 • BASIC LENS DATA

| Si | Ri | Di | Ndj | νdj |
|---|---|---|---|---|
| 0 | ∞ | −0.1800 | | |
| 1* | 1.6221 | 0.6766 | 1.533914 | 55.89 |
| 2* | 7.3376 | 0.2125 | | |
| 3* | 5.5416 | 0.3500 | 1.633506 | 23.63 |
| 4* | 2.3989 | 0.1990 | | |
| 5* | 5.7500 | 0.4337 | 1.633508 | 23.63 |
| 6* | 2.9818 | 0.1516 | | |
| 7* | 5.0510 | 0.6057 | 1.533914 | 55.89 |
| 8* | −0.9244 | 0.2510 | | |
| 9* | −10.1557 | 0.3500 | 1.533914 | 55.89 |
| 10* | 1.0159 | 0.5247 | | |
| 11 | ∞ | 0.1100 | 1.516330 | 64.14 |
| 12 | ∞ | 0.6087 | | |

*ASPHERICAL SURFACE

TABLE 14

EXAMPLE 1 • ASPHERICAL SURFACE DATA

| SURFACE NUMBER | K | A3 | A4 | A5 | A6 |
|---|---|---|---|---|---|
| 1 | 1.527123E+00 | −2.737569E−02 | 2.738342E−01 | −1.366279E+00 | 3.014393E+00 |
| 2 | 1.289311E+01 | −2.652151E−02 | 7.034708E−02 | −2.638122E−01 | −2.919722E−01 |
| 3 | −4.452340E+01 | 1.506584E−02 | −3.249770E−01 | 1.485885E+00 | −5.333154E+00 |
| 4 | −1.121990E+00 | −1.572063E−02 | −1.010756E−01 | 7.064353E−01 | −2.075745E+00 |
| 5 | −2.344359E+00 | −8.635369E−02 | 1.340355E−01 | −4.488436E−01 | 4.488560E−01 |
| 6 | −6.928009E+01 | 2.976227E−02 | −3.798821E−01 | 7.313272E−01 | −9.457300E−01 |
| 7 | −2.873543E+01 | 4.426524E−02 | −9.161077E−02 | 2.075125E−01 | −1.405562E−01 |
| 8 | −4.301708E+00 | −4.543710E−02 | 3.794614E−02 | 1.964628E−01 | −3.558491E−01 |
| 9 | −2.149852E+01 | −2.526052E−02 | −4.500067E−01 | 2.815529E−01 | 1.661837E−01 |
| 10 | −4.127815E+00 | 6.619052E−02 | −3.486592E−01 | 2.889889E−01 | −1.314642E−01 |

| | A7 | A8 | A9 | A10 | A11 |
|---|---|---|---|---|---|
| 1 | −2.122489E+00 | −2.655099E+00 | 3.448838E+00 | 3.152556E+00 | −4.505414E+00 |
| 2 | 1.852043E+0 | −2.043392E+00 | −1.934709E+00 | 5.740029E+00 | −3.537256E+00 |
| 3 | 1.038503E+01 | −1.055011E+01 | 5.618219E+00 | −7.412974E+00 | 1.546978E+01 |
| 4 | 2.803998E+00 | −1.781765E+00 | 2.378154E+00 | −6.553564E+00 | 6.655195E+00 |
| 5 | 1.616272E−01 | −1.127021E−01 | −7.410458E−01 | 3.930332E−01 | 6.077471E−01 |
| 6 | 4.183373E−01 | −9.731509E−02 | 9.822466E−01 | −1.576653E+00 | 7.010872E−01 |
| 7 | −1.548675E−01 | 1.831056E−01 | −7.807774E−04 | −2.901314E−02 | −2.248509E−02 |
| 8 | 4.279839E−01 | −2.443769E−01 | −2.297172E−02 | 6.536557E−02 | −1.769579E−02 |
| 9 | −1.573527E−01 | −6.639616E−02 | 1.259260E−01 | −5.077310E−02 | 7.693703E−03 |
| 10 | 9.733901E−02 | −5.630970E−02 | −2.987591E−02 | 5.864014E−02 | −2.923511E−02 |

| | A12 | A13 | A14 | A15 | A16 |
|---|---|---|---|---|---|
| 1 | −1.182872E+00 | −1.309508E−01 | 5.236577E+00 | −3.919008E+00 | 7.422906E−01 |
| 2 | 1.694934E−01 | −1.120722E+00 | 2.647129E+00 | −1.541555E+00 | 2.693976E−01 |
| 3 | −1.270194E+01 | 2.430263E+00 | −8.872502E−01 | 3.184150E+00 | −1.500979E+00 |
| 4 | 1.088823E+00 | −6.255058E+00 | 3.567720E+00 | −2.147781E−01 | −2.231975E−01 |

TABLE 14-continued

EXAMPLE 1 • ASPHERICAL SURFACE DATA

| | | | | | |
|---|---|---|---|---|---|
| 5 | −1.075680E−02 | −9.467007E−01 | 5.377033E−01 | 2.072992E−04 | −5.436593E−02 |
| 6 | 1.653399E−01 | −4.458190E−02 | −2.008728E−01 | 1.260976E−01 | −2.237012E−02 |
| 7 | −7.337038E−03 | 2.323788E−02 | −1.481415E−03 | −4.884811E−03 | 1.159375E−03 |
| 8 | 7.949418E−03 | −3.544406E−02 | −1.913945E−03 | 1.485898E−03 | −2.369471E−04 |
| 9 | −8.711082E−03 | 2.503946E−02 | −4.511282E−04 | −5.204188E−05 | 1.585194E−05 |
| 10 | 3.232571E−03 | 2.561098E−03 | −1.180859E−03 | 2.039317E−04 | −1.319888E−05 |

TABLE 15

EXAMPLE 2 • ASPHERICAL SURFACE DATA

| SURFACE NUMBER | K | A3 | A4 | A5 | A6 |
|---|---|---|---|---|---|
| 1 | 1.591849E+00 | −2.042278E−02 | 2.867445E−01 | −2.099862E+00 | 7.850114E+00 |
| 2 | 1.377664E+01 | −2.770815E−02 | 7.973203E−02 | −2.253541E−01 | −6.008902E−01 |
| 3 | −4.219934E+01 | 2.350565E−02 | −3.882342E−01 | 1.676728E+00 | −5.666559E+00 |
| 4 | −1.122220E+01 | 2.648061E−02 | −2.428650E−01 | 8.596652E−01 | −1.875900E+00 |
| 5 | −5.030537E+00 | −5.940689E−02 | 1.049972E−02 | −2.875689E−01 | 5.934185E−01 |
| 6 | −8.922968E+01 | 6.781445E−02 | −6.010489E−01 | 6.073520E−01 | 1.688131E−02 |
| 7 | −2.169625E+01 | 1.389708E−01 | −2.290600E−02 | 1.942192E−02 | −2.816350E−01 |
| 8 | −3.678151E+00 | 1.381575E−02 | 6.948267E−02 | 2.997315E−01 | −5.326952E−01 |
| 9 | −2.625953E+01 | 1.097973E−02 | −4.769580E−01 | 1.195238E−01 | 2.816037E−01 |
| 10 | −4.838203E+00 | 1.552148E−01 | −6.400852E−01 | 7.807424E−01 | −8.896982E−01 |

| | A7 | A8 | A9 | A10 | A11 |
|---|---|---|---|---|---|
| 1 | −1.492338E+01 | 1.307646E+00 | 6.771751E+01 | −1.784616E+02 | 2.212262E+02 |
| 2 | 2.864356E+00 | −4.401287E+00 | 2.665843E+00 | −1.771204E+00 | 6.020894E+00 |
| 3 | 1.031723E+01 | −5.992359E+00 | −1.823928E+01 | 5.872489E+01 | −9.698785E+01 |
| 4 | 2.085715E+00 | −7.087175E−01 | −4.925937E−01 | 1.450412E−01 | −5.323068E−01 |
| 5 | −1.710457E−01 | −4.294628E−01 | 2.078170E−01 | 5.873876E−02 | 1.757438E−01 |
| 6 | −1.149767E+00 | 1.544204E+00 | −4.932509E−01 | −4.545949E−01 | 3.046788E−01 |
| 7 | 2.603857E−01 | 6.011950E−01 | −2.110424E−01 | 7.698698E−02 | 3.129630E−02 |
| 8 | 3.940365E−01 | −2.182175E−01 | 9.184594E−02 | −8.855776E−03 | −1.474972E−02 |
| 9 | −9.768401E−02 | −6.208453E−02 | 2.489312E−02 | 5.345582E−03 | −3.729961E−04 |
| 10 | 1.033531E+00 | −7.852822E−01 | 2.761498E−01 | 1.950476E−02 | −4.441847E−02 |

| | A12 | A13 | A14 | A15 | A16 |
|---|---|---|---|---|---|
| 1 | −1.018690E+02 | −8.434187E+01 | 1.504322E+02 | −8.487798E+01 | 1.772840E+01 |
| 2 | −9.181769E+00 | 5.404879E+00 | −3.344551E−01 | −8.273818E−01 | 2.276615E−01 |
| 3 | 1.107053E+02 | −8.588203E+00 | 3.919413E+01 | −7.325519E+00 | −2.968950E−01 |
| 4 | 2.289736E+00 | −2.067885E+00 | −2.998112E−02 | 7.948257E−01 | −2.740597E−01 |
| 5 | −9.145033E−02 | −1.865600E−01 | 1.01.121E−01 | 4.032857E−02 | −2.529993E−02 |
| 6 | −2.857055E−02 | 1.358225E−01 | −1.695323E−01 | 8.485618E−02 | −7.716962E−03 |
| 7 | −2.352456E−02 | 2.546573E−03 | 6.751426E−04 | 1.168858E−04 | −8.828027E−05 |
| 8 | 5.929596E−03 | 2.747274E−03 | −3.055304E−03 | 9.700999E−04 | −1.076364E−04 |
| 9 | −1.677556E−03 | 6.216504E−05 | 3.013191E−04 | −9.414591E−05 | 8.999637E−05 |
| 10 | 4.575776E−00 | 6.595617E−03 | −2.978739E−03 | 5.177136E−04 | −3.369276E−05 |

TABLE 16

EXAMPLE 3 • ASPHERICAL SURFACE DATA

| SURFACE NUMBER | K | A3 | A4 | A5 | A6 |
|---|---|---|---|---|---|
| 1 | 1.536155E+00 | −2.031607E−02 | 2.035177E−01 | −9.907116E−01 | 1.678461E+00 |
| 2 | 1.303463E+01 | −3.244042E−02 | 8.135265E−02 | −1.229554E−01 | −1.248708E+00 |
| 3 | −2.098152E+01 | 1.915895E−02 | −3.201365E−01 | 1.049795E+00 | −2.564909E+00 |
| 4 | −1.110004E+01 | 2.273624E−03 | −1.521175E−01 | 7.595713E−01 | −2.197397E+00 |
| 5 | 5.865265E+00 | −8.716759E−02 | 1.233187E−01 | −4.582668E−01 | 8.743787E−01 |
| 6 | −7.702064E+01 | 1.244985E−02 | −3.758715E−01 | 5.806249E−01 | −1.177811E−01 |
| 7 | −2.662853E+01 | 2.811230E−02 | −8.074052E−02 | 2.251513E−01 | −1.653833E−01 |
| 8 | −4.284324E+00 | −6.233015E−02 | 4.915067E−02 | 8.855559E−02 | 1.023712E−01 |
| 9 | −3.040409E+01 | −9.716196E−03 | −5.140525E−01 | 4.968549E−01 | −2.857353E−01 |
| 10 | −4.287157E+00 | 6.943093E−02 | −3.338703E−01 | 2.227106E−01 | −6.451286E−02 |

| | A7 | A8 | A9 | A10 | A11 |
|---|---|---|---|---|---|
| 1 | 1.665830E+00 | −1.099737E+01 | 1.441081E+01 | −1.645973E−01 | −1.408414E+01 |
| 2 | 4.933545E+00 | −8.099293E+00 | 4.998591E+00 | 3.632454E+00 | −8.635904E+00 |
| 3 | 5.787115E−01 | 1.224572E+01 | −2.975608E+01 | 2.553164E+01 | 7.190985E+00 |
| 4 | 3.557254E+00 | −3.737992E+00 | 4.320778E+00 | −6.862073E+00 | 4.011523E+00 |

TABLE 16-continued

EXAMPLE 3 • ASPHERICAL SURFACE DATA

| | | | | | |
|---|---|---|---|---|---|
| 5 | −1.237815E+00 | 1.541794E+00 | −5.455873E−01 | −1.846578E+00 | 1.853865E+00 |
| 6 | −1.438834E+00 | 2.040593E+00 | −8.037534E−02 | −2.080565E+00 | 2.117708E+00 |
| 7 | −1.741222E−01 | 2.277009E−01 | −1.930718E−02 | −5.084977E−02 | 1.817493E−02 |
| 8 | −3.448819E−01 | 4.220961E−01 | −3.270025E−01 | 1.079138E−01 | 1.806564E−02 |
| 9 | 3.684832E−01 | −3.724139E−01 | 1.330106E−01 | 4.315371E−02 | −3.465166E−02 |
| 10 | 1.285849E−01 | −2.429283E−01 | 2.053381E−01 | −9.245439E−02 | 1.626166E−02 |

| | A12 | A13 | A14 | A15 | A16 |
|---|---|---|---|---|---|
| 1 | 6.796123E+00 | 6.487326E+00 | −6.271128E+00 | 9.960184E−01 | 2.487426E−01 |
| 2 | 4.285001E+00 | 3.396233E+00 | −5.593366E+00 | 2.755920E+00 | −4.562891E−01 |
| 3 | −3.439366E+01 | 3.420197E+01 | −2.148552E+01 | 1.000993E+01 | −2.434884E+00 |
| 4 | 2.921664E+00 | −6.278536E+00 | 3.204517E+00 | −1.810161E−01 | −1.885610E−01 |
| 5 | 1.807771E+00 | −4.268461E+00 | 2.998794E+00 | −9.207753E−01 | 9.944749E−02 |
| 6 | −1.285071E+00 | 8.475631E−01 | −5.138037E−01 | 1.750803E−01 | −2.331246E−02 |
| 7 | −4.135514E−02 | 4.175002E−02 | −8.465017E−03 | −3.193353E−03 | 9.640229E−04 |
| 8 | −1.553250E−02 | −9.556149E−04 | 8.882378E−04 | 2.802524E−04 | −3.783850E−05 |
| 9 | −1.213873E−02 | 1.726245E−02 | −6.433816E−03 | 1.072316E−03 | −6.846438E−05 |
| 10 | 6.484280E−03 | −5.397809E−03 | 1.708292E−03 | −2.755178E−04 | 1.861144E−05 |

TABLE 17

EXAMPLE 4 • ASPHERICAL SURFACE DATA

| SURFACE NUMBER | K | A3 | A4 | A5 | A6 |
|---|---|---|---|---|---|
| 1 | 1.546182E+00 | −2.118926E−02 | 2.399568E−01 | −1.493369E+00 | 4.739783E+00 |
| 2 | 1.288569E+01 | −2.771931E−02 | 8.329601E−02 | −8.603371E+01 | −8.603371E+01 |
| 3 | −2.134656E+01 | 2.236926E−02 | −3.380424E−01 | 1.056062E+00 | −2.436079E−00 |
| 4 | −1.107469E+01 | 2.512279E−03 | −1.704111E−01 | 7.786089E−01 | −1.992894E+00 |
| 5 | 6.278218E+00 | −6.626084E−02 | 7.087820E−02 | −3.185895E−01 | 3.190070E+01 |
| 6 | −7.206591E+01 | 1.714949E−02 | −4.106487E−02 | 6.663418E−01 | −3.987427E−01 |
| 7 | −2.527860E+01 | 2.362623E−02 | −4.790472E−02 | 2.575387E−01 | −4.346652E−01 |
| 8 | −4.961702E+00 | −6.751628E−02 | 3.503437E−02 | 2.124749E−01 | −1.117550E−01 |
| 9 | −3.777130E+01 | −1.379074E−02 | −4.288293E−01 | 2.582847E−01 | 1.883904E−01 |
| 10 | −4.578191E+00 | 7.638515E−02 | −3.014231E−01 | 7.989517E−02 | 2.942803E−01 |

| | A7 | A8 | A9 | A10 | A11 |
|---|---|---|---|---|---|
| 1 | −8.603658E+00 | 8.250367E+00 | −1.131028E+00 | −1.081098E+01 | 2.288704E+01 |
| 2 | 4.019496E+00 | −7.204795E+00 | 5.828014E+00 | −1.261205E−01 | −5.433924E−00 |
| 3 | 1.324363E+00 | 5.314495E+00 | −8.347452E+00 | −8.263489E+00 | 3.081938E+01 |
| 4 | 2.312119E+00 | 5.409654E−02 | −2.842419E+00 | 1.998131E+00 | 4.743858E−01 |
| 5 | 1.587431E−01 | −1.156424E−01 | −5.786898E−01 | 5.252774E−01 | 6.595169E−03 |
| 6 | −9.287627E−01 | 1.895413E+00 | −1.040918E+00 | −1.679899E−01 | 1.481162E−01 |
| 7 | 3.455111E−01 | −2.209124E−01 | 6.596905E−02 | 1.054109E−01 | −1.001256E−01 |
| 8 | −4.689116E−02 | 1.540715E−02 | 6.728962E−03 | 1.174376E−03 | 1.841582E−03 |
| 9 | −2.539001E−01 | 5.605071E−02 | 4.595825E−02 | −1.904765E−02 | −4.112749E−03 |
| 10 | −3.714637E−01 | 2.207362E−01 | −6.355889E−02 | −5.970448E−03 | 1.488455E−02 |

| | A12 | A13 | A14 | A15 | A16 |
|---|---|---|---|---|---|
| 1 | −2.236473E+01 | 2.187899E+00 | 1.619313E+01 | −1.367113E+01 | 3.554707E+00 |
| 2 | 9.655622E+00 | −1.206879E+01 | 9.749490E+00 | −4.301116E+00 | 7.820787E−01 |
| 3 | −2.440455E+01 | −3.031083E+00 | 1.354820E+01 | −5.967813E+00 | 5.775602E−01 |
| 4 | −7.346399E−01 | 7.667180E−01 | −1.794997E+00 | 1.556086E+00 | −4.313837E−01 |
| 5 | 2.271369E−01 | −5.265478E−01 | 2.093094E−01 | 6.093740E−02 | −3.798453E−02 |
| 6 | 2.165521E−01 | −7.542308E−02 | −1.017089E−01 | 6.603471E−02 | −1.097033E−02 |
| 7 | −3.949433E−02 | 8.972615E−02 | −4.537809E−02 | 9.582612E−03 | −7.397537E−04 |
| 8 | −1.629352E−03 | −2.710290E−04 | 1.353453E−04 | 6.116985E−05 | −1.695921E−05 |
| 9 | 8.753422E−04 | 1.126773E−03 | −7.788396E−05 | −1.476904E−04 | 2.794050E−06 |
| 10 | −6.542458E−03 | 1.187857E−03 | 7.693561E−05 | −6.747958E−05 | 7.986144E−06 |

TABLE 18

EXAMPLE 5 • ASPHERICAL SURFACE DATA

| SURFACE NUMBER | K | A3 | A4 | A5 | A6 |
|---|---|---|---|---|---|
| 1 | 1.386387E+00 | −6.457833E−02 | 4.821356E−01 | −1.718082E+00 | 1.734358E+00 |
| 2 | 4.588716E+00 | −6.803729E−02 | 3.225744E−01 | −9.289882E−01 | −2.228074E+00 |
| 3 | −4.322011E+01 | 2.891318E−02 | −6.090606E−01 | 3.052842E+00 | −1.212492E+01 |
| 4 | −1.308578E+01 | −2.961487E−03 | −2.245496E−01 | 1.235228E+00 | −3.743952E+00 |

TABLE 18-continued

EXAMPLE 5 • ASPHERICAL SURFACE DATA

|  |  |  |  |  |  |
|---|---|---|---|---|---|
| 5 | −4.143224E+00 | −3.893483E−02 | −4.966641E−02 | −4.035351E−01 | 1.183670E+00 |
| 6 | −7.794206E+01 | 2.512699E−02 | −3.591691E−01 | 9.295737E−01 | −1.843525E+00 |
| 7 | −5.569642E+00 | 2.254917E−02 | −3.309500E−01 | 2.740731E−01 | 2.011400E−01 |
| 8 | −3.522487E+00 | 2.633236E−02 | −2.372790E−01 | 2.333719E−01 | 2.593124E−01 |
| 9 | −2.532047E+01 | 6.115955E−02 | −4.499230E−01 | 4.055112E−01 | 6.978590E−02 |
| 10 | −6.096793E+00 | 1.217545E−01 | −4.307528E−01 | 4.343132E−01 | −2.287921E−01 |

|  | A7 | A8 | A9 | A10 | A11 |
|---|---|---|---|---|---|
| 1 | 4.214306E+00 | −1.102765E+01 | 1.368431E+00 | 1.565168E+01 | −1.395436E+01 |
| 2 | 1.884227E+01 | −5.705141E+01 | 1.134952E+02 | −1.690793E+02 | 1.627435E+02 |
| 3 | 2.760156E+01 | −3.509303E+01 | 1.742545E+01 | 7.366352E+00 | −1.451128E+01 |
| 4 | 5.526469E+00 | −2.432803E+00 | −2.155623E+00 | −1.569893E+00 | 8.514541E+00 |
| 5 | −4.980911E−01 | −1.716987E+00 | 1.937701E+00 | 1.131760E−01 | −5.292612E−01 |
| 6 | 1.117643E+00 | 2.439834E+00 | −4.771273E+00 | 2.042221E+00 | 7.413582E−02 |
| 7 | −3.810638E−01 | 8.391856E−02 | 7.967757E−02 | 5.539075E−02 | −1.840841E−01 |
| 8 | −9.503210E−01 | 1.507864E+00 | −1.223185E+00 | 3.227248E−01 | 2.623413E−01 |
| 9 | −1.920139E−01 | −2.166409E−01 | 3.384509E−01 | −4.893265E−02 | −8.679099E−02 |
| 10 | 4.823879E−02 | 5.316540E−02 | −1.164915E−01 | 1.078760E−01 | −4.341334E−02 |

|  | A12 | A13 | A14 | A15 | A16 |
|---|---|---|---|---|---|
| 1 | 1.542720E+01 | −2.872040E+01 | 7.928188E+00 | 2.230789E+01 | −1.381972E+01 |
| 2 | −2.799958E+01 | −1.556444E+02 | 2.042095E+02 | −1.088136E+02 | 2.199825E+01 |
| 3 | 1.898899E+01 | −2.043438E+01 | −3.416457E+00 | 2.148240E+01 | −1.014697E+01 |
| 4 | −6.851859E+00 | 2.231879E+00 | −6.466235E+00 | 7.349081E+00 | −2.442955E+00 |
| 5 | −5.532162E−02 | −9.227178E−01 | 1.485446E+00 | −6.345505E−01 | 5.369213E−02 |
| 6 | 1.944219E+00 | −2.486500E+00 | 1.711390E−01 | 8.393405E−01 | −2.942106E−01 |
| 7 | 6.915224E−02 | 1.225485E−02 | 6.236963E−02 | −6.843105E−02 | 1.730640E−02 |
| 8 | −3.061973E−01 | 1.567133E−01 | −4.959468E−02 | 9.516284E−03 | −8.358873E−04 |
| 9 | 3.526845E−02 | −4.071460E−03 | 3.657348E−03 | −2.013286E−03 | 2.852550E−04 |
| 10 | −3.609262E−03 | 1.147373E−02 | −5.087963E−03 | 1.043373E−03 | −8.762424E−05 |

TABLE 19

EXAMPLE 6 • ASPHERICAL SURFACE DATA

| SURFACE NUMBER | K | A3 | A4 | A5 | A6 |
|---|---|---|---|---|---|
| 1 | 1.491225E+00 | −6.278447E−02 | 4.913015E−01 | −2.122965E+00 | 5.272321E+00 |
| 2 | 7.926132E+00 | −6.875292E−02 | 3.652201E−01 | −1.566451E+00 | 1.949332E+00 |
| 3 | −4.743376E+01 | 3.252833E−02 | −7.372149E−01 | 4.437604E+00 | −1.983309E+01 |
| 4 | −1.332061E+01 | −1.037184E−02 | −1.629431E+00 | 9.625154E−01 | −3.217492E+00 |
| 5 | −4.104299E+00 | −4.455240E−02 | −1.709023E−03 | −5.896645E−01 | 1.457608E+00 |
| 6 | −8.548480E+01 | 3.142376E−02 | −4.319901E−01 | 1.848699E+00 | −5.974347E+00 |
| 7 | −4.512078E+00 | 7.885028E−03 | −2.512764E−01 | 2.564749E−01 | −7.587122E−02 |
| 8 | −3.832673E+00 | 6.656486E−03 | −2.202017E−01 | 3.707022E−01 | −3.610100E−01 |
| 9 | −1.737156E+01 | 5.530308E−02 | −4.511877E−01 | 3.268627E−01 | 3.692447E−01 |
| 10 | −6.364655E+00 | 1.265892E−01 | −3.676057E−01 | 2.488504E−01 | 2.108329E−02 |

|  | A7 | A8 | A9 | A10 | A11 |
|---|---|---|---|---|---|
| 1 | −1.216483E+01 | 3.489694E+01 | −7.823507E+01 | 9.385983E+01 | −3.875055E+01 |
| 2 | 3.613672E+00 | −2.394039E+01 | 7.119849E+01 | −1.425660E+02 | 1.668908E+02 |
| 3 | 5.160091E+01 | −6.952803E+01 | 4.009139E+00 | 1.481619E+02 | −2.332381E+02 |
| 4 | 5.227842E+00 | −2.517186E+00 | −3.533060E+00 | 3.847098E+00 | −8.229070E−01 |
| 5 | −.9.471061E−01 | −2.888956E−01 | −9.133051E−01 | 2.477163E+00 | −2.608430E−01 |
| 6 | 1.104261E+01 | −1.169578E+01 | 8.361413E+00 | −1.153573E+01 | 2.556538E+01 |
| 7 | 2.065524E−01 | −4.282374E−01 | 2.451929E−01 | −3.633857E−02 | 1.229430E−02 |
| 8 | 4.010841E−01 | −1.951165E−01 | −1.776078E−02 | 7.858090E−02 | −1.254227E−01 |
| 9 | −7.397543E−01 | 3.197454E−01 | 1.168670E−01 | −1.068673E−01 | 1.621666E−02 |
| 10 | −1.355723E−01 | 8.523137E−02 | −2.108421E−02 | −2.998390E−03 | 5.240842E−03 |

|  | A12 | A13 | A14 | A15 | A16 |
|---|---|---|---|---|---|
| 1 | −1.195638E+01 | −8.469095E+00 | 2.473448E+01 | −1.644527E+00 | −5.828340E+00 |
| 2 | −5.514420E+01 | −1.178851E+02 | 1.680999E+02 | −8.811985E+01 | 1.697166E+01 |
| 3 | 1.000412E+02 | 1.521381E+02 | −2.638435E+02 | 1.680710E+02 | −4.139813E+01 |
| 4 | 5.123367E+00 | −3.381883E+00 | 1.497589E+00 | 3.652076E+00 | −1.696936E+00 |
| 5 | −1.608183E+00 | −4.004726E−01 | 1.673461E+00 | −6.259427E−01 | −9.701265E−03 |
| 6 | −3.887306E+01 | 3.612610E+01 | −2.392098E+01 | 8.753755E+00 | −1.409035E+00 |
| 7 | −4.639320E−02 | 4.015260E−02 | 9.781960E−03 | −2.206049E−02 | 6.006853E−03 |
| 8 | 9.669474E−02 | −8.516856E−03 | −2.503803E−02 | 1.202389E−02 | −1.692814E−03 |

TABLE 19-continued

EXAMPLE 6 • ASPHERICAL SURFACE DATA

| | | | | | |
|---|---|---|---|---|---|
| 9 | −6.170980E−03 | −4.487019E−05 | 5.969621E−03 | −2.991218E−03 | 4.209498E−04 |
| 10 | −2.089757E−03 | 8.864789E−05 | 1.213364E−04 | −3.023648E−06 | −5.232311E−06 |

TABLE 20

EXAMPLE 7 • ASPHERICAL SURFACE DATA

| SURFACE NUMBER | K | A3 | A4 | A5 | A6 |
|---|---|---|---|---|---|
| 1 | 1.484091E+00 | −8.501534E−02 | 4.766714E−01 | −1.762635E+00 | 2.448558E+00 |
| 2 | 8.052813E+00 | −6.689381E−02 | 2.865931E−01 | −7.762094E−01 | −1.735637E+00 |
| 3 | −4.681641E+01 | 2.480568E−02 | −5.308194E−01 | 2.202369E+00 | −7.035059E+00 |
| 4 | −1.328269E+01 | −1.221456E−02 | −1.312366E−01 | 5.535681E−01 | −1.678583E+00 |
| 5 | −4.065648E+00 | 2.959827E−02 | −1.933071E+00 | 1.866779E+01 | −1.018749E+02 |
| 6 | −8.091058E+01 | 2.034443E−02 | −3.275254E−01 | 9.749013E−01 | −2.308282E+00 |
| 7 | −4.168147E+00 | 7.429991E−03 | −2.316562E−01 | −1.265073E−01 | 1.406079E+00 |
| 8 | −3.770873E+00 | 1.739005E−02 | −2.408889E−01 | 3.167281E−01 | −1.313247E−01 |
| 9 | −2.460452E+01 | 9.305840E−02 | −1.156856E−01 | 5.476196E−01 | −5.403614E−01 |
| 10 | −7.575693E+00 | 1.450687E−01 | −2.847753E−01 | −7.838951E−02 | 8.962797E−01 |

| | A7 | A8 | A9 | A10 | A11 |
|---|---|---|---|---|---|
| 1 | 7.029319E−01 | −2.738914E+00 | −8.079365E+00 | 1.824899E+01 | −9.752501E+00 |
| 2 | 1.087590E+01 | −1.655238E+01 | −5.090783E+00 | 4.326847E+01 | −4.149867E+01 |
| 3 | 9.507474E+00 | 5.361442E+00 | −3.251868E+01 | 2.111838E+01 | 4.724720E+01 |
| 4 | 9.586514E−01 | 3.129568E+00 | −2.127584E+00 | −1.229880E+01 | 1.890406E+01 |
| 5 | 3.261448E+02 | −6.093341E+02 | 5.569676E+02 | 1.079745E+02 | −8.786769E+02 |
| 6 | 2.338885E+00 | 7.477754E−01 | −3.303992E+00 | 1.100858E+00 | 8.494085E−01 |
| 7 | −2.834934E+00 | 3.614651E+00 | −3.205236E+00 | 1.533848E+00 | −2.655071E−01 |
| 8 | 7.493356E−02 | 5.777288E−02 | −8.904825E−02 | −1.884323E−02 | −6.721006E−04 |
| 9 | 7.351050E−01 | −1.061296E+00 | 8.189623E−01 | −1.421304E−01 | −1.689576E−01 |
| 10 | −1.052159E+00 | 9.843518E−01 | −5.108584E−01 | 2.175943E−01 | −9.742031E−02 |

| | A12 | A13 | A14 | A15 | A16 |
|---|---|---|---|---|---|
| 1 | 1.506065E+01 | −3.911155E+01 | 2.435575E+01 | 1.009486E+01 | −1.005671E+01 |
| 2 | −1.650584E+01 | 7.154846E+01 | −7.394217E+01 | 3.910867E+01 | −9.017734E+00 |
| 3 | −9.749098E+01 | 8.638388E+01 | −6.085488E+01 | 3.872361E+01 | −1.232334E+01 |
| 4 | 6.250587E+00 | −3.434242E+01 | 2.935360E+01 | −9.389671E+00 | 5.977462E−01 |
| 5 | 9.366754E+02 | −3.692410E+02 | −6.509789E+01 | 1.024355E+02 | −2.482305E+01 |
| 6 | 1.140404E+00 | −1.564876E+00 | −7.176253E−01 | 1.324526E+00 | −3.987214E−01 |
| 7 | 3.781219E−01 | −7.508517E−01 | 5.633980E−01 | −1.948838E−01 | 2.629897E−02 |
| 8 | 5.709845E−02 | −3.102269E−02 | −1.841526E−03 | 4.463135E−03 | −7.882754E−04 |
| 9 | 8.155661E−02 | 7.448539E−03 | −1.289322E−02 | 3.040742E−03 | −2.255128E−04 |
| 10 | 5.304073E−02 | −2.423642E−02 | 7.016535E−03 | −1.093566E−03 | 6.820303E−05 |

TABLE 21

EXAMPLE 8 • ASPHERICAL SURFACE DATA

| SURFACE NUMBER | K | A3 | A4 | A5 | A6 |
|---|---|---|---|---|---|
| 1 | 1.464539E+00 | −4.758199E−02 | 3.841540E−01 | −1.545520E+00 | 1.932628E+00 |
| 2 | 8.319879E+00 | −5.581435E−02 | 2.386275E−01 | −7.841293E−01 | −6.977734E−01 |
| 3 | −4.023935E+01 | 1.863572E−02 | −5.246365E−01 | 2.549359E+00 | −9.757626E+00 |
| 4 | −1.345785E+01 | −1.061035E−02 | −1.675133E−01 | 8.655912E−01 | −2.421004E+00 |
| 5 | −3.826581E+00 | −4.869543E−02 | 3.160243E−02 | −6.039007E−01 | 8.839463E−01 |
| 6 | −9.158203E+01 | 3.447048E−02 | −3.202334E−01 | 1.089281E+00 | −3.111828E+00 |
| 7 | −4.546853E+00 | 5.020045E−03 | −1.620384E−01 | 1.945834E−01 | −3.654403E−01 |
| 8 | −4.198571E+00 | −2.879053E−02 | −2.139481E−01 | 3.171986E−01 | −3.100586E−01 |
| 9 | −3.817700E+01 | 1.954424E−01 | −7.521001E−01 | 5.032388E−01 | 7.497900E−01 |
| 10 | −4.604649E+00 | 1.173537E−01 | −5.137729E−01 | 4.536884E−01 | −8.090179E−02 |

| | A7 | A8 | A9 | A10 | A11 |
|---|---|---|---|---|---|
| 1 | 3.801484E+00 | −1.486640E+01 | 1.723353E+01 | −1.391748E+01 | 2.400635E+01 |
| 2 | 6.601763E+00 | −1.067429E+01 | 2.226452E+00 | 5.971572E+00 | 2.249749E+00 |
| 3 | 1.937784E+01 | −1.479354E+01 | −9.165020E+00 | 1.281933E+01 | 2.116970E+01 |
| 4 | 3.183416E+00 | −1.141649E+00 | 5.450139E−01 | −7.561197E+00 | 1.261933E+01 |
| 5 | 1.231919E+00 | −3.665309E+00 | 1.139417E+00 | 3.029848E+00 | −1.525175E+00 |
| 6 | 4.479258E+00 | −3.048557E+00 | 2.390997E+00 | −5.953845E+00 | 7.393788E+00 |
| 7 | 7.828323E−01 | −9.337193E−01 | 7.151202E−01 | −4.784799E−01 | 1.667267E−01 |
| 8 | −2.148859E−01 | 2.522698E−01 | 4.427060E−03 | −2.105921E−01 | 1.675954E−01 |

TABLE 21-continued

EXAMPLE 8 • ASPHERICAL SURFACE DATA

| | | | | | |
|---|---|---|---|---|---|
| 9 | −1.070847E+00 | 1.490646E−01 | 3.620385E−01 | −1.445923E−01 | 3.709430E−03 |
| 10 | −4.206901E−02 | −8.114489E−02 | 1.074496E−01 | −2.503560E−02 | −2.233274E−02 |

| | A12 | A13 | A14 | A15 | A16 |
|---|---|---|---|---|---|
| 1 | −2.643375E+01 | 7.356121E+00 | −8.644737E+00 | 2.253806E+01 | −1.197760E+01 |
| 2 | 5.909066E−01 | −3.166254E+01 | 4.685118E+01 | −2.627494E+01 | 5.229894E+00 |
| 3 | −3.352315E+01 | 1.133380E+01 | −1.190137E+01 | 2.268503E+01 | −1.046881E+01 |
| 4 | −1.796204E+00 | −1.087703E+01 | 8.206130E+00 | −7.087568E−01 | −6.638547E−01 |
| 5 | −1.839187E+00 | 1.519032E+00 | −5.816808E−01 | 6.492108E−01 | −3.017526E−01 |
| 6 | −3.110346E+00 | 1.354039E−01 | −9.541798E−01 | 1.232116E+00 | −3.663487E−01 |
| 7 | 5.869336E−02 | −6.309960E−02 | 2.538580E−02 | −1.149565E−02 | 2.674294E−03 |
| 8 | −8.572445E−02 | 4.877627E−02 | −2.059923E−02 | 3.983599E−03 | −1.840481E−04 |
| 9 | −2.721586E−02 | 1.642477E−02 | 3.470656E−03 | −3.455159E−03 | 5.269217E−04 |
| 10 | 1.917256E−02 | −7.501788E−03 | 1.919338E−03 | −3.113568E−04 | 2.288542E−05 |

TABLE 22

EXAMPLE 9 • ASPHERICAL SURFACE DATA

| SURACE NUMBER | K | A3 | A4 | A5 | A6 |
|---|---|---|---|---|---|
| 1 | 1.481538E+00 | −4.592896E−02 | 3.854963E−01 | −1.659501E+00 | 2.740773E+00 |
| 2 | 8.097734E+00 | −5.438727E−02 | 2.437495E−01 | −8.951642E−01 | −7.708361E−02 |
| 3 | −4.233807E+01 | 1.768525E−02 | −4.983829E−01 | 2.279266E+01 | −8.090164E+00 |
| 4 | −1.334044E+01 | −1.202503E−02 | −1.288346E−01 | 4.549770E−01 | −7.408017E−02 |
| 5 | −3.892629E+00 | −5.062395E−02 | 5.420270E−02 | −7.413448E−01 | 1.413659E+00 |
| 6 | −9.588842E+01 | 2.674490E−02 | −1.949201E−01 | 1.136849E+00 | 1.432245E+00 |
| 7 | −4.198640E+00 | −9.383249E−04 | −1.410873E−01 | 1.387753E−01 | −1.745307E−01 |
| 8 | −4.058891E+00 | −4.555994E−02 | −1.136681E−01 | −3.263920E−01 | 2.247579E+00 |
| 9 | −3.813954E+01 | 2.277762E−02 | −7.895489E−01 | 6.723343E−01 | 2.647956E−01 |
| 10 | −4.630615E+00 | 1.276278E−01 | −5.252569E−01 | 4.168659E−01 | 2.189438E−02 |

| | A7 | A8 | A9 | A10 | A11 |
|---|---|---|---|---|---|
| 1 | 6.266612E−01 | −6.390467E+00 | 7.379118E−01 | 1.002559E+01 | −2.906289E+00 |
| 2 | 4.702478E+00 | −6.489751E+00 | −5.863810E+00 | 1.881327E+01 | −9.679081E+00 |
| 3 | 1.310389E+01 | 6.573590E−02 | −3.075029E+01 | 2.960104E+01 | 1.785501E+01 |
| 4 | −5.074747E+00 | 1.784911E+01 | −2.825937E+01 | 1.952775E+01 | 1.185846E+00 |
| 5 | −3.449867E−02 | −2.070264E+00 | 1.070974E+00 | 1.786937E+00 | 1.972025E+00 |
| 6 | −8.608072E+00 | 2.049591E+01 | −2.315833E+00 | 8.181594E+00 | 6.877361E+00 |
| 7 | 2.037092E−01 | 1.087024E−01 | −3.597283E−01 | 1.198607E−01 | 7.655733E−02 |
| 8 | −4.632027E+00 | 5.817454E+00 | −3.759737E+00 | 6.108953E−01 | 9.336045E−01 |
| 9 | −2.956751E−01 | −4.892687E−01 | 5.087243E−01 | 5.628198E−02 | −1.893941E−01 |
| 10 | −1.495624E−01 | −3.741217E−02 | 1.294352E−01 | −6.603618E−02 | 2.116722E−03 |

| | A12 | A13 | A14 | A15 | A16 |
|---|---|---|---|---|---|
| 1 | −8.060290E−01 | −1.435654E+01 | 5.567149E+00 | 1.705962E+01 | −1.115542E−01 |
| 2 | 4.944394E−01 | −1.824486E+01 | 3.271703E+01 | −2.914095E+01 | 4.276399E+00 |
| 3 | −3.490577E+01 | 4.171396E+00 | 6.529689E−01 | 1.517756E+01 | −8.860429E+00 |
| 4 | −8.507665E+00 | 2.966641E+00 | −1.677864E+00 | 2.829172E+00 | −1.210031E+00 |
| 5 | −1.937368E+00 | −1.881532E+00 | 2.749882E+00 | −7.148064E−01 | −8.999847E−02 |
| 6 | −5.039368E+00 | −2.324960E+00 | 3.011683E+00 | −6.949048E−01 | −3.262623E−02 |
| 7 | −4.762035E−02 | 9.709314E−03 | 1.347407E−02 | −1.587222E−02 | 4.159758E−03 |
| 8 | −7.290753E−01 | 1.520600E−01 | 5.966052E−02 | −3.749064E−02 | 5.755029E−03 |
| 9 | 2.068098E−02 | 4.066057E−02 | −1.720057E−02 | 2.307820E−03 | −6.826619E−05 |
| 10 | 1.327935E−02 | −8.402319E−03 | 2.899010E−03 | −5.578448E−04 | 4.511635E−05 |

TABLE 23

EXAMPLE 10 • ASPHERICAL SURFACE DATA

| SURACE NUMBER | K | A3 | A4 | A5 | A6 |
|---|---|---|---|---|---|
| 1 | 1.481196E+00 | −4.492365E−02 | 3.639910E−01 | −1.578985E+00 | 2.895923E+00 |
| 2 | 8.268787E+00 | −5.108860E−02 | 1.851611E−01 | −3.155340E−01 | −3.383188E+00 |
| 3 | −4.220241E+01 | 1.731400E−02 | −4.869733E−01 | 2.135529E+01 | −7.028502E+00 |
| 4 | −1.333359E+01 | −1.004130E−02 | −1.594007E−01 | 7.302002E−01 | −1.487678E+00 |
| 5 | −3.911109E+00 | −5.819510E−02 | 4.189556E−02 | −6.327558E−01 | 8.550247E−01 |
| 6 | −9.320053E+01 | 3.257181E−02 | −3.110895E−01 | 1.157631E+00 | −3.504560E+00 |
| 7 | −4.411078E+00 | −4.657272E−03 | −1.352895E−01 | 1.346494E−01 | −1.429235E−01 |
| 8 | −3.985912E+00 | −5.208891E−02 | −2.104492E−01 | 2.916660E−01 | 3.137923E−01 |

TABLE 23-continued

EXAMPLE 10 • ASPHERICAL SURFACE DATA

| | | | | | |
|---|---|---|---|---|---|
| 9 | −3.553509E+01 | 1.783299E−02 | −7.620533E−01 | 5.211087E−01 | 6.951447E−01 |
| 10 | −4.704895E+00 | 1.382845E−01 | −5.336231E−01 | 3.873195E−01 | 1.086449E−01 |

| | A7 | A8 | A9 | A10 | A11 |
|---|---|---|---|---|---|
| 1 | −6.515752E−02 | −4.318192E+00 | −2.643886E+00 | 1.053850E+01 | 5.376173E+00 |
| 2 | 1.579538E+01 | −2.709774E+01 | 6.923355E+00 | 4.662832E+01 | −7.830994E+01 |
| 3 | 8.579690E+00 | 1.141258E+01 | −4.645491E+01 | 3.802171E+01 | 2.024377E+01 |
| 4 | −5.084138E−01 | 8.220770E+00 | −1.502885E+01 | 8.594174E+00 | 4.184398E+00 |
| 5 | 1.614736E+00 | −4.811986E+00 | 3.134443E+00 | 7.375681E−01 | 2.430951E−01 |
| 6 | 5.383567E+00 | −3.850736E+00 | 1.000300E+00 | −2.123875E−01 | −1.446802E+00 |
| 7 | 1.203505E−01 | 1.471962E−01 | −2.292062E−01 | −1.216905E−01 | 2.473285E−01 |
| 8 | −1.003157E+00 | 9.985851E−01 | −2.846777E−01 | −1.807693E−01 | 8.992989E−02 |
| 9 | −1.028556E+00 | 2.457548E−01 | 1.570235E−01 | 1.849592E−02 | −6.787181E−02 |
| 10 | −2.895585E−01 | 1.260127E−01 | 4.090512E−05 | −8.704017E−03 | −1.623570E−04 |

| | A12 | A13 | A14 | A15 | A16 |
|---|---|---|---|---|---|
| 1 | −1.493734E+01 | −5.811346E+00 | 6.168592E+00 | 1.425216E+01 | −1.030266E+01 |
| 2 | 5.171032E+01 | −4.746159E+00 | −1.641084E+01 | 1.194795E+01 | −3.064052E+00 |
| 3 | −2.695826E+01 | −3.215651E+01 | 4.819794E+01 | −1.049093E+01 | −3.222622E+00 |
| 4 | −3.768182E+00 | −4.239695E+00 | 3.352203E+00 | 1.008029E+00 | −9.183971E−01 |
| 5 | −2.815992E+00 | 2.139229E+00 | −1.149347E+00 | 1.003725E+00 | −3.907235E−01 |
| 6 | 4.240981E+00 | −2.989256E+00 | −6.426065E−01 | 1.467610E+00 | −4.333544E−01 |
| 7 | −6.259253E−02 | −6.099394E−02 | 7.142768E−02 | −3.580482E−02 | 6.814359E−03 |
| 8 | 8.238702E−02 | −1.155265E−01 | 7.107720E−02 | −2.361162E−02 | 3.236761E−03 |
| 9 | −3.410996E−03 | 7.311364E−03 | 6.640474E−03 | −4.078257E−02 | 5.744641E−04 |
| 10 | −1.203483E−04 | 1.961833E−05 | 3.289139E−04 | −1.404655E−04 | 1.612803E−05 |

TABLE 24

EXAMPLE 11 • ASPHERICAL SURFACE DATA

| SURACE NUMBER | K | A3 | A4 | A5 | A6 |
|---|---|---|---|---|---|
| 1 | 1.482838E+00 | −4.603154E−02 | 4.341331E−01 | −2.281499E+00 | 5.538455E+00 |
| 2 | 7.796697E+00 | −6.936763E−02 | 5.773613E−01 | −5.645047E+00 | 2.694218E+01 |
| 3 | −4.081066E+01 | 1.658024E−02 | −4.643572E+01 | 1.905331E+00 | −5.778989E+00 |
| 4 | −1.338156E+01 | −9.878738E−03 | −1.836046E−01 | 1.000566E+00 | −2.913651E+00 |
| 5 | −3.848868E+00 | −5.080933E−02 | 1.475799E−02 | −3.777359E−01 | −3.931866E−01 |
| 6 | −9.359409E+01 | 3.458354E−02 | −2.771857E+01 | 9.075359E−01 | −2.543992E+00 |
| 7 | −4.762109E+00 | −8.892113E−03 | −1.376727E−01 | 1.717472E+00 | −2.862670E−01 |
| 8 | −3.919140E+00 | −5.787960E−02 | −2.276729E+00 | 4.149005E−01 | −3.200725E−02 |
| 9 | −2.945440E+01 | 2.068321E−02 | −7.822343E−01 | 5.457289E−01 | 5.735727E−01 |
| 10 | −4.673962E+00 | 1.329468E−01 | −4.272787E−01 | −1.079609E−01 | 1.228577E+00 |

| | A7 | A8 | A9 | A10 | A11 |
|---|---|---|---|---|---|
| 1 | −1.256125E+01 | 1.871807E+01 | −1.370778E+01 | −3.265648E+01 | 9.582243E+01 |
| 2 | −7.982277E+01 | 1.141766E+02 | 7.294943E+01 | −6.304880E+02 | 1.144405E+03 |
| 3 | 4.417552E+00 | 2.000514E+01 | −5.652048E+01 | 4.160934E+01 | 2.764565E+01 |
| 4 | 3.980163E+00 | −1.944580E−01 | −7.193436E+00 | 9.163086E+00 | −3.683966E+00 |
| 5 | 5.252619E+00 | −1.102214E+01 | 8.320421E+00 | 1.391554E+00 | −4.938345E+00 |
| 6 | 3.108476E+00 | −8.643891E−01 | −2.144193E−02 | −3.215477E+00 | 3.564023E+00 |
| 7 | 4.271739E+00 | −2.381773E+00 | 2.411966E−03 | −7.711936E−02 | 1.024039E−01 |
| 8 | −3.717412E−01 | 2.581132E−01 | 1.733606E−01 | −2.152654E−01 | −3.453544E−04 |
| 9 | −8.783547E−01 | −2.829872E−01 | 6.681672E−01 | −3.306369E−01 | 1.045239E−01 |
| 10 | −1.754985E+00 | 1.278467E+00 | −5.481459E−01 | 2.135875E−01 | −1.946099E−01 |

| | A12 | A13 | A14 | A15 | A16 |
|---|---|---|---|---|---|
| 1 | −5.403442E+01 | −9.138583E+01 | 1.464346E+02 | −7.001975E+01 | 8.757717E+00 |
| 2 | −8.712759E+02 | −5.905847E+01 | 6.133810E+02 | −4.258522E+02 | 9.950728E+01 |
| 3 | −4.025597E+01 | −2.070950E+01 | 3.939920E+01 | −7.618264E+00 | −3.831900E+00 |
| 4 | −1.251557E+00 | 4.858371E+00 | −8.476560E+00 | 6.892660E+00 | −2.916790E+00 |
| 5 | −3.195716E−01 | 5.360977E+00 | −5.791570E+00 | 3.271465E+00 | −7.994876E−01 |
| 6 | 1.186958E+00 | −2.878605E+00 | 2.478552E+00 | 9.968745E−01 | −3.525857E−01 |
| 7 | −4.224927E−02 | 3.524646E−02 | −1.450463E−02 | −4.593365E−03 | 2.424619E−03 |
| 8 | 3.691311E−02 | 7.521221E−03 | −5.601845E−03 | −2.255535E−03 | 9.123461E−04 |
| 9 | −6.491605E−02 | 2.435151E−02 | 2.294812E−03 | −3.136876E−03 | 4.710151E−04 |
| 10 | 1.819158E−01 | −1.029975E−01 | 3.382988E−02 | −6.026109E−03 | 4.521403E−04 |

TABLE 25

EXAMPLE 12 • ASPHERICAL SURFACE DATA

| SURFACE NUMBER | K | A3 | A4 | A5 | A6 |
|---|---|---|---|---|---|
| 1 | 1.369332E+00 | −5.562701E−02 | 4.161226E−01 | −1.906800E+00 | 5.405316E+00 |
| 2 | 8.188057E+00 | −7.187209E−02 | 2.781573E−01 | −6.841513E−01 | −1.092498E+00 |
| 3 | −4.189144E+01 | 3.001482E−03 | −5.321539E−01 | 2.701030E+00 | −9.861361E+00 |
| 4 | −1.262111E+01 | −1.038184E−02 | −1.965318E−01 | 1.444493E+00 | −5.381459E+00 |
| 5 | −4.153716E+00 | −4.475435E−02 | −4.857731E−03 | −6.978841E−01 | 1.934320E+00 |
| 6 | −8.611786E+01 | −2.443372E−04 | −2.604016E−01 | 1.070988E+00 | −3.252312E+00 |
| 7 | −2.877770E+00 | −8.944162E−03 | −1.238262E−01 | −4.511052E−02 | 7.053827E−01 |
| 8 | −4.414733E+00 | −2.492675E−02 | −1.942222E−01 | 1.883917E−01 | 4.325225E−01 |
| 9 | −3.948382E+01 | −3.362223E−03 | −5.304023E−01 | −4.593750E−01 | 3.576383E+00 |
| 10 | −4.559931E+00 | 8.587847E−02 | −5.190941E−01 | 4.363548E−01 | 9.921571E−02 |

| | A7 | A8 | A9 | A10 | A11 |
|---|---|---|---|---|---|
| 1 | −1.224482E+01 | 2.400132E+01 | −3.224495E+01 | 1.369876E+01 | 1.938924E+01 |
| 2 | 5.892417E+00 | −6.635432E+00 | −4.039728E+00 | 1.280730E+01 | −4.186072E+00 |
| 3 | 1.799702E+01 | −1.335047E+01 | −2.052169E+00 | −1.085868E+00 | 1.312209E+01 |
| 4 | 1.187927E+01 | −1.634825E+01 | 1.339742E+01 | −2.841052E+00 | −1.291882E+01 |
| 5 | −2.115083E+00 | 2.556011E+00 | −5.916678E+00 | 6.879822E+00 | −8.804122E−01 |
| 6 | 5.041612E+00 | −3.840641E+00 | 1.990756E+00 | −2.716734E+00 | 1.816198E+00 |
| 7 | −1.731752E+00 | 2.955108E+00 | −3.328738E+00 | 1.908326E+00 | −1.881073E−01 |
| 8 | −1.107587E+00 | 1.376254E+00 | −8.062192E−01 | 1.015016E−03 | 2.094465E−01 |
| 9 | −6.201190E+00 | 5.847752E+00 | −3.437244E+00 | 1.237491E+00 | −2.060280E−01 |
| 10 | −8.451074E−01 | 1.499503E−01 | 3.070128E+02 | −4.598071E−02 | 2.502159E−02 |

| | A12 | A13 | A14 | A15 | A16 |
|---|---|---|---|---|---|
| 1 | −1.997749E+00 | −6.134544E+01 | 7.624145E+01 | −3.330753E+01 | 3.828091E+00 |
| 2 | −5.109933E+00 | −4.866335E+00 | 1.755311E+01 | −1.354925E+01 | 3.515512E+00 |
| 3 | 1.557213E+01 | −5.577773E+01 | 4.234648E+01 | −6.625452E+00 | −2.643443E+00 |
| 4 | 2.624276E+01 | −2.243435E+01 | 4.906448E+00 | 4.380414E+00 | −2.132401E+00 |
| 5 | −2.705378E+00 | −1.254423E+00 | 3.580619E+00 | −1.512328E+00 | 1.006467E−01 |
| 6 | 2.166784E+00 | −2.789439E+00 | −9.680415E−02 | 1.138524E+00 | −3.689124E−01 |
| 7 | −2.318660E−01 | −7.956572E−02 | 1.808596E−01 | −7.514318E−02 | 9.968118E−03 |
| 8 | −3.346659E−02 | −7.095967E−02 | 5.217085E−02 | −1.586881E−02 | 1.916284E−03 |
| 9 | 4.018158E−02 | −9.383326E−02 | 7.074147E−02 | −2.165717E−02 | 2.440199E−03 |
| 10 | −1.562883E−02 | 6.989160E−03 | −1.398744E−03 | 3.988026E−05 | 1.354706E−05 |

TABLE 26

EXAMPLE 13 • ASPHERICAL SURFACE DATA

| SURFACE NUMBER | K | A3 | A4 | A5 | A6 |
|---|---|---|---|---|---|
| 1 | 1.361765E+00 | −6.985362E−02 | 4.710119E−01 | −1.539943E+00 | 1.623804E+00 |
| 2 | 6.062932E+00 | −8.573736E−02 | 2.974491E−01 | −6.882673E−01 | −1.251078E+00 |
| 3 | −4.696923E+01 | 1.940968E−03 | −5.339202E−01 | 2.844917E+00 | −9.753070E+00 |
| 4 | −1.236620E+01 | −1.258446E−02 | −1.604570E−01 | 1.670120E+00 | −7.599840E+00 |
| 5 | −3.633688E+00 | −4.259440E−02 | −9.903559E−02 | −2.889957E−01 | 1.061147E+00 |
| 6 | −8.402099E+01 | −2.438925E−02 | −1.951351E−01 | 1.040710E+00 | −3.100961E+00 |
| 7 | −3.669410E+00 | −1.542463E−02 | −2.734893E−01 | 3.055198E−01 | 1.766530E−02 |
| 8 | −3.560887E+00 | 5.670173E−03 | −2.763339E−01 | 3.559866E−01 | −1.192460E−01 |
| 9 | −2.953444E+01 | 1.885294E−02 | −3.755177E−01 | 2.950732E−01 | 5.810019E−01 |
| 10 | −6.206617E+00 | 9.259369E−02 | −4.536434E−01 | 4.173776E−01 | −2.430434E−03 |

| | A7 | A8 | A9 | A10 | A11 |
|---|---|---|---|---|---|
| 1 | 1.843787E+00 | −4.499024E+00 | −1.212547E+00 | 4.760748E+00 | 1.963116E+00 |
| 2 | 6.665249E+00 | −9.111049E+00 | −6.456607E−01 | 1.350175E+01 | −8.675131E+00 |
| 3 | 1.600001E+01 | −9.302830E+00 | −6.119732E+00 | 5.767791E+00 | 5.761415E+00 |
| 4 | 1.960700E+01 | −3.103873E+01 | 3.021421E+01 | −1.605975E+01 | 7.958553E−02 |
| 5 | −8.353512E−01 | −5.306694E−01 | 5.147548E−01 | 1.192219E+00 | −8.916110E−01 |
| 6 | 3.783137E+00 | 3.208715E−01 | −6.972188E+00 | 1.137584E+01 | −1.432005E+01 |
| 7 | 3.376783E−01 | −1.015871E+00 | 5.927456E−01 | 1.704872E−01 | −2.230474E−01 |
| 8 | 1.708376E−01 | −5.157882E−02 | −9.791698E−02 | −2.689044E−02 | 7.216433E−02 |
| 9 | −1.263161E+00 | 7.979428E−01 | −2.659087E−01 | −1.683749E−01 | 8.291757E−02 |
| 10 | −2.459992E−01 | 1.169245E−01 | 3.818581E−02 | −4.140161E−02 | 8.989014E−03 |

| | A12 | A13 | A14 | A15 | A16 |
|---|---|---|---|---|---|
| 1 | 2.881877E+00 | −1.497855E+01 | 1.705420E+00 | 1.518921E+01 | −8.282705E+00 |
| 2 | −1.032698E+01 | 1.672523E+01 | −5.031538E+00 | −3.503608E+00 | 1.929425E+00 |
| 3 | −1.968812E+00 | −3.695947E+00 | −5.457501E+00 | 9.679939E+00 | −3.466860E+00 |
| 4 | 3.508344E+00 | 1.077148E+01 | −2.447977E+01 | 1.840473E+01 | −4.912287E+00 |

TABLE 26-continued

EXAMPLE 13 • ASPHERICAL SURFACE DATA

| | | | | | |
|---|---|---|---|---|---|
| 5 | −1.146885E+00 | 1.061630E+00 | 1.031635E−01 | −1.895415E−01 | 2.967682E−05 |
| 6 | 1.521145E+01 | −9.976264E+00 | 2.533521E+00 | 5.067502E−01 | −2.938084E−01 |
| 7 | 5.966980E−02 | −6.771985E−02 | 6.539058E−02 | −2.021209E−02 | 1.243398E−03 |
| 8 | −9.502355E−04 | −4.413454E−03 | −1.551229E−02 | 9.916864E−03 | −1.662055E−03 |
| 9 | −2.696268E−02 | −3.409894E−03 | 1.184879E−02 | −5.139041E−03 | 6.928777E−04 |
| 10 | −2.671522E−03 | 2.350140E−03 | −5.923251E−04 | −3.624658E−05 | 1.893445E−05 |

TABLE 27

VALUES RELATED TO CONDITIONAL FORMULAS

| FORMULA NUMBER | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| (1) | vd2 | 23.6 | 23.6 | 23.6 | 23.6 | 23.6 | 23.6 | 23.6 |
| (2) | vd5 | 55.9 | 55.9 | 55.9 | 55.9 | 55.9 | 55.9 | 55.9 |
| (3) | f4/f1 | 0.52 | 0.50 | 0.55 | 0.58 | 0.35 | 0.38 | 0.37 |
| (4) | f3/f2 | 1.29 | 0.84 | 1.47 | 2.43 | 4.88 | 6.03 | 5.45 |
| (5) | f/f1 | 0.85 | 0.95 | 0.85 | 0.95 | 0.74 | 0.74 | 0.75 |
| (6) | f/f2 | −0.38 | −0.34 | −0.38 | −0.39 | −0.41 | −0.42 | −0.42 |
| (7) | f/f3 | −0.30 | −0.41 | −0.26 | −0.16 | −0.08 | −0.07 | −0.08 |
| (8) | f/f4 | 1.64 | 1.71 | 1.55 | 1.46 | 2.09 | 1.97 | 2.04 |
| (9) | f/f5 | −1.40 | −1.41 | −1.29 | −1.28 | −1.97 | −1.82 | −1.89 |
| (10) | (R3 − R4)/(R3 + R4) | 0.34 | 0.41 | 0.35 | 0.37 | 0.35 | 0.37 | 0.37 |
| (11) | (R5 − R6)/(R5 + R6) | 0.34 | 0.58 | 0.32 | 0.22 | 0.11 | 0.09 | 0.10 |
| | Fno | 2.02 | 2.01 | 2.02 | 2.02 | 1.95 | 1.95 | 1.95 |
| | f | 3.84 | 3.76 | 3.78 | 3.79 | 3.20 | 3.20 | 3.20 |

| FORMULA NUMBER | | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|---|
| (1) | vd2 | 23.6 | 23.6 | 23.6 | 23.6 | 23.6 | 23.6 | 23.5 |
| (2) | vd5 | 55.9 | 55.9 | 55.9 | 55.9 | 55.9 | 55.9 | 55.9 |
| (3) | f4/f1 | 0.46 | 0.48 | 0.49 | 0.50 | 0.51 | 0.40 | 0.54 |
| (4) | f3/f2 | 51.26 | 1698.57 | 31.54 | 15.44 | 4.73 | 1.76 | 1.38 |
| (5) | f/f1 | 0.74 | 0.74 | 0.74 | 0.74 | 0.85 | 0.86 | 0.82 |
| (6) | f/f2 | −0.43 | −0.44 | −0.43 | −0.43 | −0.54 | −0.46 | −0.39 |
| (7) | f/f3 | −0.01 | 0.00 | −0.01 | −0.03 | −0.11 | −0.26 | −0.28 |
| (8) | f/f4 | 1.62 | 1.56 | 1.53 | 1.49 | 1.68 | 2.12 | 1.54 |
| (9) | f/f5 | −1.41 | −1.34 | −1.28 | −1.21 | −1.38 | −1.88 | −1.21 |
| (10) | (R3 − R4)/(R3 + R4) | 0.38 | 0.38 | 0.38 | 0.38 | 0.47 | 0.40 | 0.36 |
| (11) | (R5 − R6)/(R5 + R6) | 0.03 | 0.02 | 0.04 | 0.05 | 0.14 | 0.32 | 0.30 |
| | Fno | 1.95 | 1.95 | 1.95 | 1.95 | 1.96 | 1.97 | 2.03 |
| | f | 3.20 | 3.19 | 3.19 | 3.19 | 3.26 | 3.21 | 3.73 |

| FORMULA NUMBER | | EXAMPLE 15 | EXAMPLE 16 | EXAMPLE 17 | EXAMPLE 18 |
|---|---|---|---|---|---|
| (1) | vd2 | 23.6 | 23.6 | 23.5 | 23.5 |
| (2) | vd5 | 55.9 | 55.9 | 55.9 | 55.9 |
| (3) | f4/f1 | 0.54 | 0.51 | 0.54 | 0.54 |
| (4) | f3/f2 | 1.38 | 1.30 | 1.54 | 1.66 |
| (5) | f/f1 | 0.82 | 0.84 | 0.85 | 0.83 |
| (6) | f/f2 | −0.39 | −0.37 | −0.38 | −0.37 |
| (7) | f/f3 | −0.28 | −0.28 | −0.25 | −0.22 |
| (8) | f/f4 | 1.54 | 1.63 | 1.57 | 1.55 |
| (9) | f/f5 | −1.21 | −1.38 | −1.33 | −1.34 |
| (10) | (R3 − R4)/(R3 + R4) | 0.36 | 0.34 | 0.35 | 0.35 |
| (11) | (R5 − R6)/(R5 + R6) | 0.30 | 0.34 | 0.31 | 0.28 |
| | Fno | 2.00 | 2.02 | 2.02 | 2.02 |
| | f | 3.73 | 3.78 | 3.78 | 3.74 |

TABLE 28

EXAMPLE 14

| Si | Ri | Di | Ndj | vdj |
|---|---|---|---|---|
| 0(APERTURE STOP) | ∞ | −0.179 | | |
| 1* | 1.8329 | 0.655 | 1.53391 | 55.89 |
| 2* | 6.6357 | 0.235 | | |
| 3* | 6.4580 | 0.400 | 1.63351 | 23.63 |
| 4* | 3.0715 | 0.305 | | |
| 5* | 5.8415 | 0.496 | 1.53391 | 55.89 |
| 6* | 3.1228 | 0.187 | | |
| 7* | 2.6878 | 0.762 | 1.53391 | 55.89 |
| 8* | −2.2598 | 0.288 | | |
| 9* | 2.5920 | 0.435 | 1.53391 | 55.89 |

TABLE 28-continued

EXAMPLE 14

| Si | Ri | Di | Ndj | vdj |
|---|---|---|---|---|
| 10* | 0.9467 | 0.600 | | |
| 11 | ∞ | 0.100 | 1.51633 | 64.14 |
| 12 | ∞ | 0.398 | | |
| 13(IMAGE PLANE) | ∞ | | | |

*ASPHERICAL SURFACE

TABLE 29

EXAMPLE 15

| Si | Ri | Di | Ndj | vdj |
|---|---|---|---|---|
| 0(APERTURE STOP) | ∞ | −0.179 | | |
| 1* | 1.8329 | 0.655 | 1.53391 | 55.89 |
| 2* | 6.6357 | 0.235 | | |
| 3* | 6.4580 | 0.400 | 1.63351 | 23.63 |
| 4* | 3.0715 | 0.305 | | |
| 5* | 5.8415 | 0.496 | 1.53391 | 55.89 |
| 6* | 3.1228 | 0.187 | | |
| 7* | 2.6878 | 0.762 | 1.53391 | 55.89 |
| 8* | −2.2598 | 0.288 | | |
| 9* | 2.5920 | 0.435 | 1.53391 | 55.89 |
| 10* | 0.9467 | 0.600 | | |
| 11 | ∞ | 0.100 | 1.51633 | 64.14 |
| 12 | ∞ | 0.398 | | |
| 13(IMAGE PLANE) | ∞ | | | |

*ASPHERICAL SURFACE

TABLE 30

EXAMPLE 16

| Si | Ri | Di | Ndj | vdj |
|---|---|---|---|---|
| 0(APERTURE STOP) | ∞ | −0.179 | | |
| 1* | 1.8275 | 0.702 | 1.53391 | 55.89 |
| 2* | 6.6038 | 0.242 | | |
| 3* | 6.2548 | 0.400 | 1.63351 | 23.63 |
| 4* | 3.1081 | 0.321 | | |
| 5* | 6.9924 | 0.496 | 1.53391 | 55.89 |
| 6* | 3.4472 | 0.214 | | |
| 7* | 2.5614 | 0.726 | 1.53391 | 55.89 |
| 8* | −2.1414 | 0.223 | | |
| 9* | 2.5159 | 0.404 | 1.53391 | 55.89 |
| 10* | 0.8734 | 0.600 | | |
| 11 | ∞ | 0.100 | 1.51633 | 64.14 |

TABLE 30-continued

EXAMPLE 16

| Si | Ri | Di | Ndj | vdj |
|---|---|---|---|---|
| 12 | ∞ | 0.432 | | |
| 13(IMAGE PLANE) | ∞ | | | |

*ASPHERICAL SURFACE

TABLE 31

EXAMPLE 17

| Si | Ri | Di | Ndj | vdj |
|---|---|---|---|---|
| 0(APERTURE STOP) | ∞ | −0.179 | | |
| 1* | 1.8367 | 0.689 | 1.53391 | 55.89 |
| 2* | 6.9959 | 0.245 | | |
| 3* | 6.5524 | 0.400 | 1.63351 | 23.63 |
| 4* | 3.1266 | 0.321 | | |
| 5* | 6.7804 | 0.496 | 1.53391 | 55.89 |
| 6* | 3.6014 | 0.215 | | |
| 7* | 2.6005 | 0.728 | 1.53391 | 55.89 |
| 8* | −2.2925 | 0.201 | | |
| 9* | 2.4259 | 0.428 | 1.53391 | 55.89 |
| 10* | 0.8759 | 0.600 | | |
| 11 | ∞ | 0.100 | 1.51633 | 64.14 |
| 12 | ∞ | 0.438 | | |
| 13(IMAGE PLANE) | ∞ | | | |

*ASPHERICAL SURFACE

TABLE 32

EXAMPLE 18

| Si | Ri | Di | Ndj | vdj |
|---|---|---|---|---|
| 0(APERTURE STOP) | ∞ | −0.179 | | |
| 1* | 1.8356 | 0.683 | 1.53391 | 55.89 |
| 2* | 6.8415 | 0.245 | | |
| 3* | 6.5563 | 0.400 | 1.63351 | 23.63 |
| 4* | 3.1632 | 0.315 | | |
| 5* | 6.6465 | 0.496 | 1.53391 | 55.89 |
| 6* | 3.7165 | 0.215 | | |
| 7* | 2.5900 | 0.705 | 1.53391 | 55.89 |
| 8* | −2.3105 | 0.203 | | |
| 9* | 2.4271 | 0.425 | 1.53391 | 55.89 |
| 10* | 0.8675 | 0.500 | | |
| 11 | ∞ | 0.250 | 1.51633 | 64.14 |
| 12 | ∞ | 0.431 | | |
| 13(IMAGE PLANE) | ∞ | | | |

*ASPHERICAL SURFACE

TABLE 33

EXAMPLE 14 • ASPHERICAL SURFACE DATA

| SURACE NUMBER | KA | A3 | A4 | A5 | A6 |
|---|---|---|---|---|---|
| 1 | 1.497647E+00 | −3.108400E−02 | 2.849504E−01 | −1.423850E+00 | 3.587532E+00 |
| 2 | 1.241475E+01 | −2.605989E−02 | 5.160561E−02 | −2.644401E−01 | 1.473642E−01 |
| 3 | −4.307906E+01 | 1.222443E−02 | −3.050532E−01 | 1.187503E+00 | −3.618509E+00 |
| 4 | −1.131747E+01 | −1.833679E−02 | −8.336462E−02 | 6.728793E−01 | −2.214440E+00 |
| 5 | −2.67377E+00 | −7.688574E−02 | 9.166433E−02 | −2.821178E−01 | −5.967894E−02 |
| 6 | −4.906128E+00 | 2.589865E−02 | −3.974942E−01 | 7.509929E−01 | −9.907063E−01 |
| 7 | −3.115963E+01 | 3.991555E−02 | −1.177844E−01 | 2.183170E−01 | −1.080760E−01 |
| 8 | −4.136747E+00 | −5.116556E−02 | 5.765151E−02 | 1.808513E−02 | 2.224663E−01 |
| 9 | −2.062039E+01 | −1.937724E−02 | −4.352936E−01 | 3.067742E−01 | 2.013301E−01 |
| 10 | −4.541915E+00 | 7.527775E−02 | −2.938922E−01 | 2.034613E−01 | −3.407885E−02 |

| | A7 | A8 | A9 | A10 | A11 |
|---|---|---|---|---|---|
| 1 | −4.699816E+00 | 2.883477E+00 | −1.555445E+00 | 1.792663E+00 | 1.570704E+00 |
| 2 | 1.018915E−01 | 6.140163E−01 | −1.797120E+00 | −2.086560E−01 | 3.268952E+00 |

TABLE 33-continued

EXAMPLE 14 • ASPHERICAL SURFACE DATA

|  | | | | | |
|---|---|---|---|---|---|
| 3 | 4.958394E+00 | −4.022545E−01 | −5.550417E+00 | −4.337483E−02 | 9.301158E+00 |
| 4 | 3.159758E+00 | −6.293579E−01 | −3.905127E+00 | 5.036792E+00 | −2.722433E+00 |
| 5 | 1.307977E+00 | −1.695058E+00 | 3.044455E−01 | 5.071329E−01 | 1.917801E−01 |
| 6 | 6.771622E−01 | −1.696955E−01 | −8.902538E−02 | 4.739232E−01 | −6.779850E−01 |
| 7 | −1.461332E−01 | 1.035059E−01 | 7.609126E−02 | −4.753690E−02 | −4.571381E−02 |
| 8 | −6.656642E−01 | 1.095462E+00 | −1.125741E+00 | 7.145720E−01 | −3.374718E−01 |
| 9 | −3.253450E−01 | 7.807287E−02 | 5.898815E−02 | −2.017679E−02 | −1.179468E−02 |
| 10 | 1.876451E−03 | −2.363616E−02 | 1.104883E−02 | 4.402067E−03 | −3.114234E−03 |

|  | A12 | A13 | A14 | A15 | A16 | A17 |
|---|---|---|---|---|---|---|
| 1 | −2.905498E+00 | −6.164376E+00 | 1.285887E+01 | −7.421121E+00 | 9.350122E−01 | 2.451284E−01 |
| 2 | −1.831080E−01 | −4.143413E+00 | −2.135164E−01 | 6.497063E+00 | −5.291122E+00 | 1.333032E+00 |
| 3 | −1.065225E+00 | −1.264772E+01 | 9.159063E+00 | 1.680016E−01 | −1.333336E+00 | 5.191738E−02 |
| 4 | 1.049755E+00 | −3.148670E−01 | 8.837946E−02 | −7.459109E−01 | 8.979108E−01 | −2.940270E−01 |
| 5 | −5.019459E−01 | 1.924233E−01 | −1.517887E−01 | 1.371428E−01 | −1.319820E−02 | −1.420855E−02 |
| 6 | 5.891251E−01 | −3.186698E−03 | −8.700231E−02 | −6.709575E−02 | 7.095508E−02 | −1.577770E−02 |
| 7 | 1.471373E−02 | 1.7638527E−02 | −2.436621E−03 | −3.739281E−03 | 5.225142E−04 | 1.532210E−04 |
| 8 | 1.555436E−01 | −4.943574E−02 | −4.717152E−03 | 1.028116E−02 | −3.225343E−03 | 3.417115E−04 |
| 9 | 6.765866E−03 | −1.143694E−03 | 7.883880E−05 | 9.458581E−05 | −5.940209E−05 | 9.192803E−06 |
| 10 | −5.183118E−04 | 5.525324E−04 | 4.175320E−05 | −9.700765E−05 | 2.513806E−05 | −2.125558E−06 |

TABLE 34

EXAMPLE 15 • ASPHERICAL SURFACE DATA

| SURACE NUMBER | KA | A3 | A4 | A5 | A6 |
|---|---|---|---|---|---|
| 1 | 1.497647E+00 | −3.072097E−02 | 2.757469E−01 | −1.330910E+00 | 3.097776E+00 |
| 2 | 1.241475E+01 | −2.602348E−02 | 4.949839E−02 | −2.326016E−01 | −7.195935E−02 |
| 3 | −4.307906E+01 | 1.401059E−03 | −1.272296E−01 | 2.147625E−01 | −2.649255E+00 |
| 4 | −1.131747E+01 | −1.78083E−02 | −9.001265E−02 | 7.122426E−01 | −2.352420E+00 |
| 5 | −2.567377E+00 | −7.730697E−02 | 9.948377E−02 | −3.413315E−01 | 1.806301E−01 |
| 6 | −4.906128E+01 | 2.663676E−02 | −4.074728E−01 | 8.008049E−01 | −1.094733E+00 |
| 7 | −3.115963E+01 | 3.968477E−02 | −1.127304E−01 | 1.806688E−01 | 1.025398E−02 |
| 8 | −4.136747E+00 | −4.927098E−02 | 2.072801E−02 | 1.737332E−01 | −2.666521E−01 |
| 9 | −2.062039E+01 | −2.145304E−02 | −4.200529E−01 | 2.644855E−01 | 2.574173E−01 |
| 10 | −4.541915E+00 | 7.513916E−02 | −2.923532E−01 | 1.972754E−01 | −2.218075E−02 |

|  | A7 | A8 | A9 | A10 | A11 |
|---|---|---|---|---|---|
| 1 | −3.262985E+00 | 7.420243E−01 | −1.015817E+00 | 4.569933E+00 | 7.241762E−03 |
| 2 | 8.950806E−01 | −8.288637E−01 | −1.187300E+00 | 2.152353E+00 | −6.369767E−01 |
| 3 | 1.640777E+01 | −5.531488E+01 | 1.015227E+02 | −7.953762E+01 | −4.279835E+01 |
| 4 | 3.573598E+00 | −1.894699E+00 | −9.211671E−01 | 9.484434E−01 | −7.097650E−01 |
| 5 | 7.402249E+00 | −9.245629E−01 | −1.967446E+00 | 5.095818E−01 | 2.590837E−01 |
| 6 | 6.945347E−01 | 1.405393E−01 | −5.651447E−01 | 4.448564E−01 | −1.106680E−01 |
| 7 | −3.463652E−01 | 2.435023E−01 | 1.395872E−01 | −2.305921E−01 | 5.685009E−02 |
| 8 | 2.699485E−01 | −5.849633E−02 | −1.688684E−01 | 1.350083E−01 | −4.106567E−02 |
| 9 | −3.620506E−01 | 9.628560E−02 | 3.232014E−02 | 1.249066E−02 | −2.895427E−02 |
| 10 | −9.052269E−03 | −2.145713E−02 | 1.536119E−02 | 1.250624E−03 | −3.285150E−03 |

|  | A12 | A13 | A14 | A15 | A16 | A17 |
|---|---|---|---|---|---|---|
| 1 | −1.026178E+01 | 8.888375E+00 | 4.167281E−01 | −2.897609E+00 | 7.071980E−01 | 5.393539E−02 |
| 2 | 6.342884E−01 | −1.907689E+00 | −1.618794E−01 | 3.044418E+00 | −2.430680E+00 | 5.945957E−01 |
| 3 | 1.361115E+02 | −7.153256E+01 | −5.257944E+01 | 7.934550E+01 | −3.377276E+01 | 4.580785E+00 |
| 4 | 2.940502E+00 | −2.454394E+00 | −1.092824E+00 | 2.226950E+00 | −8.561785E−01 | 6.503408E−02 |
| 5 | −2.303319E−01 | −1.797090E−01 | −3.453064E−02 | 2.084775E−01 | −7.327978E−02 | −1.908237E−03 |
| 6 | −2.257454E−01 | 2.389085E−01 | 7.339123E−02 | −2.253947E−01 | 1.209604E−01 | −2.138528E−02 |
| 7 | 3.187585E−02 | −2.117584E−02 | 6.447444E−03 | 1.153045E−03 | −2.255612E−03 | 5.500530E−04 |
| 8 | 1.750486E−02 | −6.741205E−03 | −2.888105E−03 | 2.694169E−03 | −5.861937E−04 | 3.321785E−05 |
| 9 | 7.448304E−03 | 1.918778E−03 | −1.002580E−03 | 8.215789E−05 | 7.764910E−06 | −2.889874E−07 |
| 10 | 3.378531E−04 | 4.137981E−04 | −1.424029E−04 | 9.492726E−06 | 2.115518E−06 | −2.670558E−07 |

TABLE 35

EXAMPLE 16 • ASPHERICAL SURFACE DATA

| SURFACE NUMBER | KA | A3 | A4 | A5 | A6 |
|---|---|---|---|---|---|
| 1 | 1.557118E+00 | 1.071477E−02 | −4.684707E−01 | 4.970006E+00 | −2.637419E+01 |
| 2 | 1.316744E+01 | −3.047536E−02 | 9.316457E−02 | −3.091515E−01 | −3.112475E−01 |

TABLE 35-continued

EXAMPLE 16 • ASPHERICAL SURFACE DATA

|   | | | | | |
|---|---|---|---|---|---|
| 3 | −4.274794E+01 | 1.333307E−02 | −2.851737E−01 | 1.065939E+00 | −3.156829E+00 |
| 4 | −1.104027E+01 | −9.885719E−02 | −1.419600E−01 | 9.202438E−01 | −2.921785E+00 |
| 5 | −2.329282E+00 | −8.913597E−02 | 1.316161E−01 | −3.620831E−01 | 6.440333E−02 |
| 6 | −7.585243E+01 | 2.266605E−02 | −3.174311E−01 | 3.173875E−01 | 4.797704E−01 |
| 7 | −2.843605E+01 | 4.487620E−02 | −7.925824E−02 | 1.872600E−01 | −1.422625E−01 |
| 8 | −4.349834E+00 | −4.953819E−02 | 3.117260E−02 | 2.254320E−01 | −3.196765E−01 |
| 9 | −2.367270E+01 | −4.645146E−02 | −4.957169E−01 | 3.940250E−01 | 5.653736E−02 |
| 10 | −4.427272E+00 | 6.700279E−02 | 3.454543E−01 | 2.164244E−01 | 3.512699E−02 |

|   | A7 | A8 | A9 | A10 | A11 |
|---|---|---|---|---|---|
| 1 | 7.662733E+01 | −1.192625E+02 | 7.215427E+01 | 3.639641E+01 | −3.970117E+01 |
| 2 | 2.099538E+00 | −2.724149E+00 | −6.173124E−02 | 1.895047E+00 | 5.614039E−01 |
| 3 | 3.875678E+00 | 1.454241E+00 | −7.908163E+00 | 7.466867E−01 | 1.188958E+01 |
| 4 | 4.788342E+00 | −3.705236E+00 | 7.367816E−01 | −4.794629E−01 | 2.135916E+00 |
| 5 | 8.622909E−01 | −2.436902E−01 | −2.423497E+00 | 3.205522E+00 | −4.515623E+00 |
| 6 | −2.446375E+00 | 3.082348E+00 | −4.277671E−01 | −2.007848E+00 | 9.032281E−01 |
| 7 | −1.163319E−01 | 1.076824−01 | 8.071719E−02 | −6.919644E−02 | −3.165413E−02 |
| 8 | 2.1750171E−01 | 6.282632E−02 | −2.147175E−01 | 7.245567E−02 | 4.457168E−02 |
| 9 | −8.820734E−02 | −6.821896E−02 | 6.291612E−02 | 6.294902E−03 | −1.736350E−02 |
| 10 | −5.489575E−02 | −1.903811E−02 | 2.204951E−02 | 5.949950E−04 | −3.746297E−03 |

|   | A12 | A13 | A14 | A15 | A16 | A17 |
|---|---|---|---|---|---|---|
| 1 | −3.889203E+01 | −4.948251E+01 | 2.712614E+02 | −3.159603E+02 | 1.598391E+02 | −3.115859E+01 |
| 2 | −1.805005E+00 | −3.440017E−02 | −4.444785E−01 | 2.386246E+00 | −1.859006E+00 | 4.352579E−01 |
| 3 | −5.353775E+00 | −9.969152E+00 | 8.113087E+00 | 1.235732E+00 | −2.222227E+00 | 3.014515E−01 |
| 4 | −1.659900E+00 | 4.643637E−01 | −3.868797E−01 | 5.746993E−02 | 3.456247E−01 | −1.652016E−01 |
| 5 | −1.901534E+00 | 1.459150E+00 | −5.232968E−02 | −5.228924E−01 | 3.480160E−01 | −8.025193E−02 |
| 6 | 8.739338E−01 | −3.447619E−01 | −8.014006E−01 | 8.003348E−01 | −2.910023E−01 | 3.923870E−02 |
| 7 | 1.584242E−02 | 1.381685E−02 | −3.467195E−03 | −2.114906E−03 | 3.609190E−04 | 7.204201E−05 |
| 8 | −2.487521E−02 | −1.345626E−03 | 1.147108E−03 | 5.746701E−04 | −2.500539E−04 | 1.758021E−05 |
| 9 | 4.307537E−03 | −2.519016E−04 | 3.600112E−04 | −1.707441E−04 | 1.614846E−05 | 1.209876E−06 |
| 10 | 7.540037E−05 | 4.877285E−04 | −1.071771E−05 | −6.751295E−05 | 1.782672E−05 | −1.389354E−06 |

TABLE 36

EXAMPLE 17 • ASPHERICAL SURFACE DATA

| SURFACE NUMBER | KA | A3 | A4 | A5 | A6 |
|---|---|---|---|---|---|
| 1 | 1.552696E+00 | −2.065076E−02 | 2.302918E−01 | −1.284988E+00 | 3.334397E+00 |
| 2 | 1.110518E+01 | −3.464309E−02 | 9.513154E−02 | −1.926175E−01 | −1.091405E+00 |
| 3 | −2.611907E+01 | 3.527053E−02 | −7.264371E−01 | 4.913524E+00 | −2.170418E+01 |
| 4 | −1.116747E+01 | −1.623336E−03 | −1.480156E−01 | 7.850409E−01 | −2.291960E+00 |
| 5 | 7.142664E+00 | −9.651696E−02 | 1.343637E−01 | −3.551349E−01 | 2.421547E−01 |
| 6 | −8.310791E+01 | 1.650219E−02 | −3.990216E−01 | 7.987775E−01 | −9.055273E−01 |
| 7 | −2.676846E+01 | 3.132291E−02 | −9.384408E−02 | 2.284145E−01 | −1.375707E−01 |
| 8 | −4.299946E+00 | −6.063030E−02 | 4.882640E−02 | 1.544812E−01 | −1.776517E−01 |
| 9 | −3.073419E+01 | −1.945574E−02 | −43.60657E−01 | 1.917746E−01 | 3.199278E−01 |
| 10 | −4.272573E+00 | 6.968673E−02 | −3.336976E−01 | 1.903629E−01 | 6.233836E−02 |

|   | A7 | A8 | A9 | A10 | A11 |
|---|---|---|---|---|---|
| 1 | −3.833980E+00 | −1.762009E−02 | 2.568489E+00 | 2.169492E+00 | −4.187161E+00 |
| 2 | 5.013856E+00 | −1.025573E+01 | 1.373380E+01 | −1.442184E+01 | 8.566855E+00 |
| 3 | 5.436820E+01 | −7.059608E+01 | 1.909238E+01 | 6.215780E+01 | −4.298112E+01 |
| 4 | 3.502656E+00 | −2.173027E+00 | 1.354632E+00 | −1.610678E+00 | 8.387807E+01 |
| 5 | 2.805020E−01 | −4.215233E−02 | −8.277296E−01 | 5.440464E−01 | 3.427814E−01 |
| 6 | −5.015681E−02 | 1.038625E+00 | −7.918520E−01 | 3.790681E−01 | −6.561867E−01 |
| 7 | −1.954621E−01 | 1.870512E−01 | 5.703425E−02 | −7.475217E−02 | −3.020446E−02 |
| 8 | 1.3963205E−01 | −2.901947E−02 | −7.552521E−02 | 2.508350E−02 | 2.672420E−02 |
| 9 | −3.129516E−01 | 7.500156E−02 | −1.447714E−02 | 3.778324E−02 | −1.688884E−02 |
| 10 | −8.490667E−02 | 5.400985E−03 | 1.520831E−02 | −3.035162E−03 | −1.368315E−03 |

|   | A12 | A13 | A14 | A15 | A16 | A17 |
|---|---|---|---|---|---|---|
| 1 | −2.461466E+00 | 3.552997E+00 | 3.080231E+00 | −4.324778E+00 | 1.024098E+00 | 1.283172E−01 |
| 2 | 8.224192E+00 | −2.563465E+01 | 2.703970E+01 | −1.494670E+01 | 4.296782E+00 | −5.005017E−01 |
| 3 | −7.856024E+01 | 1.238776E+02 | −3.029172E+01 | −5.480062E+01 | 4.647715E+01 | −1.139068E+01 |
| 4 | 2.191246E+00 | −2.690390E+00 | 1.718921E−01 | 8.643263E−01 | −2.340073E−01 | −3.997253E−02 |
| 5 | −1.010800E−01 | −3.837415E−01 | 1.207774E−01 | 1.322397E−01 | −6.081529E−02 | 5.252722E−04 |
| 6 | 6.743553E−01 | −2.236704E−01 | 2.379386E−02 | −5.843130E−02 | 4.395617E−02 | −8.754133E−03 |
| 7 | 2.1541417E−02 | 6.736618E−03 | 7.024391E−04 | −2.841043E−03 | 6.555281E−05 | 1.700963E−04 |
| 8 | −1.049973E−02 | −1.520356E−03 | −6.885673E−04 | 1.014403E−03 | −1.893231E−04 | 5.368667E−07 |

TABLE 36-continued

EXAMPLE 17 • ASPHERICAL SURFACE DATA

| | | | | | | |
|---|---|---|---|---|---|---|
| 9 | −5.647094E−03 | 3.334596E−03 | 1.757274E−03 | −1.505340E−03 | 3.728718E−04 | −3.242320E−05 |
| 10 | 4.007105E−04 | 2.596633E−05 | −1.159983E−06 | −3.088701E−06 | −7.220151E−07 | 2.362852E−07 |

TABLE 37

EXAMPLE 18 • ASPHERICAL SURFACE DATA

| SURFACE NUMBER | KA | A3 | A4 | A5 | A6 |
|---|---|---|---|---|---|
| 1 | 1.542962E+00 | −1.973260E−02 | 2.124785E−01 | −1.190014E+00 | 2.900481E+00 |
| 2 | 1.112978E+01 | −3.327331E−02 | 7.410108E−02 | 4.586221E−01 | −6.572895E+00 |
| 3 | −2.626654E+01 | 1.183971E−02 | −2.491098E−01 | 7.259651E−01 | −1.705528E+00 |
| 4 | −1.110582E+01 | −6.537019E−03 | −1.210622E−01 | 5.623439E−01 | −1.089005E+00 |
| 5 | 7.122449E+00 | −9.365376E−02 | 1.241584E−01 | −3.020487E−01 | 4.671178E−02 |
| 6 | −8.7489873E+01 | 1.664350E−02 | −4.346837E−01 | 9.946618E−01 | −1.662780E+00 |
| 7 | −2.675230E+01 | 3.285429E−02 | −1.034508E−01 | 2.565694E−01 | −2.111134E−01 |
| 8 | −4.344694E+00 | −5.134108E−02 | 3.850426E−03 | 3.805224E−01 | −6.961744E−01 |
| 9 | −3.323233E+01 | −9.004415E−03 | −4.461493E−01 | 2.628984E−01 | 1.741196E−01 |
| 10 | −4.408815E+00 | 9.057320E−02 | −3.408868E−01 | 1.664896E−01 | 1.035598E−01 |

| | A7 | A8 | A9 | A10 | A11 |
|---|---|---|---|---|---|
| 1 | −2.385774E+00 | −3.185912E+00 | 7.099000E+00 | −2.312952E+00 | −1.381266E+00 |
| 2 | 2.668532E+01 | −5.431999E+01 | 5.022860E+01 | 4.713172E+00 | −4.042986E+01 |
| 3 | −2.997139E−01 | 8.641394E+00 | −1.204682E+01 | −5.634465E+00 | 2.106773E+01 |
| 4 | −2.364997E−01 | 4.096733E+00 | −5.795269E+00 | 2.456346E+00 | −9.454539E−01 |
| 5 | 7.563306E−01 | −7.770373E−01 | −2.554666E−01 | 4.390714E−01 | 1.761107E−01 |
| 6 | 1.779445E+00 | −1.625558E+00 | 1.577860E+00 | −1.164601E+00 | 7.176399E−01 |
| 7 | −7.678264E−02 | 1.073418E−01 | 3.874581E−02 | −3.016021E−02 | −2.695825E−02 |
| 8 | 7.905856E−01 | −4.800739E−01 | 4.649574E−02 | 6.504979E−02 | 5.732962E−04 |
| 9 | −1.836234E−01 | 5.828621E−04 | 4.162313E−02 | −3.275750E−04 | −8.608082E−03 |
| 10 | −1.146341E−01 | 1.229769E−02 | 1.867808E−02 | −3.949783E−03 | −8.297714E−03 |

| | A12 | A13 | A14 | A15 | A16 | A17 |
|---|---|---|---|---|---|---|
| 1 | −4.370543E−01 | −8.880410E+00 | 1.902077E+01 | −1.686910E+01 | 6.108397E+00 | −7.128207E−01 |
| 2 | 1.957055E−01 | 2.106042E+01 | 5.614222E+01 | −1.199990E+02 | 8.113726E+01 | −1.944903E+01 |
| 3 | −2.490589E−02 | −2.322035E+01 | 5.925897E+00 | 1.746616E+01 | −1.369104E+01 | 2.904691E+00 |
| 4 | 3.977295E−00 | −2.538743E+00 | −2.962665E+00 | 5.881573E+00 | −2.726892E+00 | 4.254902E−01 |
| 5 | 2.513424E−02 | −3.772583E−01 | 3.417727E+02 | 2.097638E−01 | −8.977572E−02 | 4.111284E−03 |
| 6 | −8.300370E−01 | 7.778219E−01 | −1.813972E−01 | −1.967898E−01 | 1.350282E−01 | −2.460989E−02 |
| 7 | −2.826816E−03 | 1.169036E−02 | 9.499892E−03 | −9.451979E−03 | 2.021515E−03 | −6.096570E−05 |
| 8 | −1.892918E−02 | 5.737339E−03 | 5.040450E−04 | −1.097575E−03 | 4.579034E−04 | −6.638278E−05 |
| 9 | −8.068099E−04 | 2.154616E−03 | −3.398316E−04 | −1.022323E−04 | 2.802136E−05 | −1.179153E−06 |
| 10 | 1.596494E−03 | 2.123603E−05 | −2.266440E−04 | 8.884621E−05 | −1.525925E−05 | 1.318262E−06 |

What is claimed is:

1. An imaging lens substantially consisting of five lenses of:
a first lens having positive power and a meniscus shape with its convex surface facing an object side, and at least one of the surfaces of which is an aspherical surface;
a second lens having negative power and a concave surface facing an image side, and at least one of the surfaces of which is an aspherical surface;
a third lens having negative power and a convex surface facing the object side, and at least one of the surfaces of which is an aspherical surface;
a fourth lens having positive power and a convex surface facing the object side, and at least one of the surfaces of which is an aspherical surface; and
a fifth lens having negative power and a concave surface facing the image side, and at least one of the surfaces of which is an aspherical surface, which are in this order from the object side,
wherein the following conditional formula is further satisfied:

$$0.6 < f/f1 < 0.95 \quad (5\text{-}1), \text{ where}$$

f: a focal length of an entire system, and
f1: a focal length of the first lens.

2. The imaging lens, as defined in claim 1, wherein the following conditional formula is further satisfied:

$$f4/f1 < 1 \quad (3), \text{ where}$$

f1: a focal length of the first lens, and
f4: a focal length of the fourth lens.

3. The imaging lens, as defined in claim 1, wherein the following conditional formulas are further satisfied:

$$vd2 < 35 \quad (1);$$

$$50 < vd5 \quad (2); \text{ and}$$

$$f4/f1 < 1 \quad (3), \text{ where}$$

vd2: an Abbe number of the second lens for d-line,
vd5: an Abbe number of the fifth lens for d-line,
f1: a focal length of the first lens, and
f4: a focal length of the fourth lens.

4. The imaging lens, as defined in claim 1, wherein the following conditional formula is further satisfied:

$$0.50 < f3/f2 \quad (4), \text{ where}$$

f2: a focal length of the second lens, and
f3: a focal length of the third lens.

5. The imaging lens, as defined in claim 1, wherein a stop is arranged on the object side of the first lens.

6. The imaging lens, as defined in claim 1, wherein the following conditional formula is further satisfied:

$$-0.6 < f/f3 < 0 \qquad (7), \text{where}$$

f: a focal length of an entire system, and
f3: a focal length of the third lens.

7. The imaging lens, as defined in claim 1, wherein the following conditional formula is further satisfied:

$$1 < f/f4 < 2.7 \qquad (8), \text{where}$$

f: a focal length of an entire system, and
f4: a focal length of the fourth lens.

8. The imaging lens, as defined in claim 1, wherein the following conditional formula is further satisfied:

$$-2.2 < f/f5 < -0.8 \qquad (9), \text{where}$$

f: a focal length of an entire system, and
f5: a focal length of the fifth lens.

9. The imaging lens, as defined in claim 1, wherein the following conditional formula is further satisfied:

$$-0.1 < (R3-R4)/(R3+R4) < 0.6 \qquad (10), \text{where}$$

R3: a paraxial curvature radius of an object-side surface of the second lens, and
R4: a paraxial curvature radius of an image-side surface of the second lens.

10. The imaging lens, as defined in claim 1, wherein the following conditional formula is further satisfied:

$$-0.1 < (R5-R6)/(R5+R6) < 0.7 \qquad (11), \text{where}$$

R5: a paraxial curvature radius of an object-side surface of the third lens, and
R6: a paraxial curvature radius of an image-side surface of the third lens.

11. The imaging lens, as defined claim 1, wherein the following conditional formula is further satisfied:

$$0.70 < f3/f2 \qquad (4-1), \text{where}$$

f2: a focal length of the second lens, and
f3: a focal length of the third lens.

12. The imaging lens, as defined in claim 1, wherein the following conditional formula is further satisfied:

$$-0.5 < f/f3 < 0 \qquad (7-1), \text{where}$$

f: a focal length of an entire system, and
f3: a focal length of the third lens.

13. The imaging lens, as defined in claim 1, wherein the following conditional formula is further satisfied:

$$1.2 < f/f4 < 2.3 \qquad (8-1), \text{where}$$

f: a focal length of an entire system, and
f4: a focal length of the fourth lens.

14. The imaging lens, as defined in claim 1, wherein the following conditional formula is further satisfied:

$$-2.1 < f/f5 < -1 \qquad (9-1), \text{where}$$

f: a focal length of an entire system, and
f5: a focal length of the fifth lens.

15. An imaging apparatus comprising:
the imaging lens, as defined in claim 1.

16. The imaging lens, as defined in claim 1, wherein the following conditional formula is further satisfied:

$$-0.8 < f/f2 < -0.1 \qquad (6), \text{where}$$

f: a focal length of an entire system, and
f2: a focal length of the second lens.

17. The imaging lens, as defined in claim 16, wherein the following conditional formula is further satisfied:

$$-0.65 < f/f2 < -0.15 \qquad (6-1), \text{where}$$

f: a focal length of an entire system, and
f2: a focal length of the second lens.

18. An imaging lens substantially consisting of five lenses of:
a first lens having positive power and a meniscus shape with its convex surface facing an object side, and at least one of the surfaces of which is an aspherical surface;
a second lens having negative power and a concave surface facing an image side, and at least one of the surfaces of which is an aspherical surface;
a third lens having negative power and a convex surface facing the object side, and at least one of the surfaces of which is an aspherical surface;
a fourth lens having positive power and a convex surface facing the object side, and at least one of the surfaces of which is an aspherical surface; and
a fifth lens having negative power and a concave surface facing the image side, and at least one of the surfaces of which is an aspherical surface, which are in this order from the object side,
wherein the following conditional formula is further satisfied:

$$-0.65 < f/f2 < -0.15 \qquad (6-1), \text{where}$$

f: a focal length of an entire system, and
f2: a focal length of the second lens.

19. The imaging lens, as defined in claim 18, wherein the following conditional formula is further satisfied:

$$0.5 < f/f1 < 1 \qquad (5), \text{where}$$

f: a focal length of an entire system, and
f1: a focal length of the first lens.

20. An imaging apparatus comprising:
the imaging lens, as defined in claim 18.

* * * * *